(12) United States Patent
Myers et al.

(10) Patent No.: US 12,536,406 B2
(45) Date of Patent: Jan. 27, 2026

(54) DYNAMIC ARTIFICIAL INTELLIGENCE AGENT ORCHESTRATION USING A LARGE LANGUAGE MODEL GATEWAY ROUTER

(71) Applicant: Citibank, N.A., New York, NY (US)

(72) Inventors: James Myers, New York, NY (US); Ganesh Prasad Bhat, New Jersey, NJ (US); Sourabh Deb, Tampa, FL (US); Jason Engelbrecht, London (GB); Zheyu Wang, Shanghai (CN); Haolin Jin, Shanghai (CN)

( * ) Notice: Subject to any disclaimer, the term of this patent is extended or adjusted under 35 U.S.C. 154(b) by 0 days.

(21) Appl. No.: 19/279,103

(22) Filed: Jul. 24, 2025

(65) Prior Publication Data
US 2025/0348707 A1    Nov. 13, 2025

Related U.S. Application Data

(63) Continuation-in-part of application No. 18/812,913, filed on Aug. 22, 2024, which is a continuation-in-part of application No. 18/661,532, filed on May 10, 2024, now Pat. No. 12,111,747, which is a continuation-in-part of application No. 18/661,519, filed on May 10, 2024, now Pat. No. 12,106,205, and a continuation-in-part of application
(Continued)

(51) Int. Cl.
| G06F 11/36 | (2025.01) |
| G06F 8/41 | (2018.01) |
| G06N 3/042 | (2023.01) |
| G06N 20/00 | (2019.01) |

(52) U.S. Cl.
CPC .................................. *G06N 3/042* (2023.01)

(58) Field of Classification Search
CPC ........ G06N 3/042; G06N 20/00; G06N 3/043; G06N 3/045; G06F 16/338
See application file for complete search history.

(56) References Cited

U.S. PATENT DOCUMENTS

| 12,135,740 | B1 * | 11/2024 | Yu ........................ G06F 16/3329 |
| 12,345,713 | B2 * | 7/2025 | Gaylord ................. C08G 61/02 |
| 2024/0320251 | A1 * | 9/2024 | Hemington ........... G06F 16/338 |

(Continued)

*Primary Examiner* — Brandon S Cole
(74) *Attorney, Agent, or Firm* — Perkins Coie LLP

(57) ABSTRACT

The systems and methods disclosed herein orchestrate task execution among autonomous (or semi-autonomous) AI agentic models ("agents") using a gateway router that dynamically coordinates the agents based on prompt characteristics, user context, and/or real-time operational factors. Received inputs (e.g., prompts) are segmented into subcomponents (e.g., sub-queries), which are routed/mapped to candidate agents based on the output parameters of the subcomponent (e.g., performance thresholds, cost thresholds) and operational parameters (e.g., cost, performance metric values, user access restrictions, timing restrictions) of each agent. The gateway router maintains dynamic routing data structures for each agent that are continuously updated based on environmental stimuli (e.g., geo-political stimuli, sensor stimuli, agent stimuli). For example, the gateway router causes agents to dynamically switch between rule engines identified by the routing tables in response to detecting environmental stimuli. Responses from the candidate agents are aggregated into an output that is responsive to the input.

20 Claims, 21 Drawing Sheets

Related U.S. Application Data

No. 18/633,293, filed on Apr. 11, 2024, now Pat. No. 12,147,513.

(56) References Cited

U.S. PATENT DOCUMENTS

| | | | |
|---|---|---|---|
| 2024/0330579 A1* | 10/2024 | Saxena | G06F 40/106 |
| 2024/0420012 A1* | 12/2024 | Austin | G06N 20/00 |

* cited by examiner

| Performance Metric 1202 | Usage Value 1204 | Maximum Value 1206 | Threshold Metric Value 1208 |
|---|---|---|---|
| Central Processing Unit (CPU) Usage | 45% | 100% | 55% |
| Memory Usage | 12.30 GB | 50.00 GB | 37.70 GB |
| Hard Disk Space Usage | 93.2 TB | 100.0 TB | 68.0 TB |
| Number of Input Tokens | 150 | 200 | 50 |
| Cost Incurred | $5,203 | $12,000 | $6,797 |

*FIG. 12*

DYNAMIC ARTIFICIAL INTELLIGENCE AGENT ORCHESTRATION USING A LARGE LANGUAGE MODEL GATEWAY ROUTER

CROSS-REFERENCE TO RELATED APPLICATION(S)

This application is a continuation-in-part of U.S. patent application Ser. No. 18/812,913 entitled "DYNAMIC SYSTEM RESOURCE-SENSITIVE MODEL SOFTWARE AND HARDWARE SELECTION" and filed Aug. 22, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024. This application is related to U.S. patent application Ser. No. 18/653,858 entitled "VALIDATING VECTOR CONSTRAINTS OF OUTPUTS GENERATED BY MACHINE LEARNING MODELS" and filed May 2, 2024, and U.S. patent application Ser. No. 18/637,362 entitled "DYNAMICALLY VALIDATING AI APPLICATIONS FOR COMPLIANCE" filed on Apr. 16, 2024. The content of the foregoing applications is incorporated herein by reference in their entirety.

BACKGROUND

An artificial intelligence (AI) agentic model ("agent"), whether autonomous or semi-autonomous, refers to a persistent software entity characterized by a digitally encoded objective function. The objective function can instruct the agent to, for example, maximize task accuracy, minimize resource usage, comply with specified operational constraints, and the like. The degree of autonomy can range from semi-autonomous, where human intervention is occasionally used, to fully autonomous, where the agent operates independently within defined parameters. Agents use received data (e.g., an input, a prompt, a query) to autonomously trigger and manage actions such as application programming interface (API) invocations, outbound network requests, updates to internal or external datastores, and other computational tasks.

The actions autonomously executed by agents are responsive to their respective objective functions. For example, an agent's objective function may direct the agent to minimize task completion latency. During autonomous execution, the agent can determine a degree of expected utility of candidate actions by evaluating the actions against the agent's objective function and select executable actions that align with the agent's assigned objectives within the imposed operational constraints or boundaries set by the system the agent is interacting with. However, conventional agents typically operate under the assumption that returned data from external retrieval sources is exhaustive and comprehensive, which can lead to unreliable, incomplete, or diluted responses when the returned data lacks domain specificity, completeness, or compliance with privacy constraints.

BRIEF DESCRIPTION OF THE DRAWINGS

FIG. 12 shows a schematic of a data structure illustrating a system state and associated threshold metric values, in accordance with some implementations of the present technology.

Figure 1:
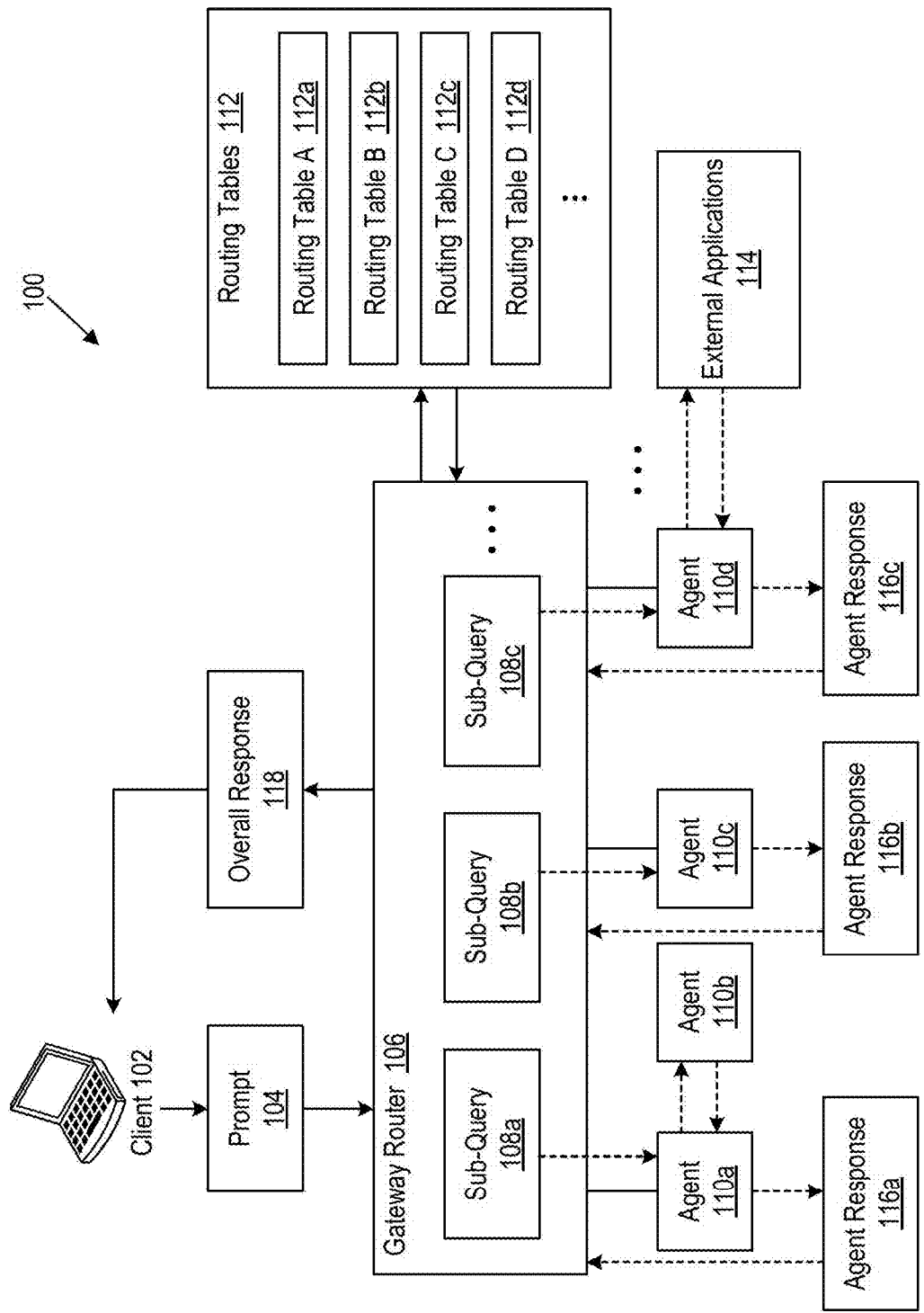
FIG. 1 shows a schematic illustrating an example environment of orchestrating semi-autonomous or autonomous agents, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional machine learning and large language models (LLMs) are typically designed as static, monolithic models. These models are trained on broad (i.e., general) datasets and, once deployed, respond to inputs strictly based on internal representations—that is, the way information, patterns, and relationships learned from training data are encoded and stored within the model's architecture as parameters, embeddings, and/or latent features. The internal representations enable the model to interpret and generate responses to new inputs by referencing what has been encoded during training. To update the internal representations, the models are retrained. In contrast, AI agents are persistent software entities characterized by objective functions and varying degrees of autonomy. Agents can perceive environments, make decisions, execute actions, and optimize their behavior with respect to defined objective functions. Autonomous or semi-autonomous agents can independently process incoming data, determine action plans, and dynamically invoke APIs, databases, other agents, or external services to execute tasks.

Conventional approaches of information retrieval include retrieval-augmented generation (RAG) and mixture-of-experts (MoE) architectures. RAG enables a model to retrieve additional context from external knowledge bases, thereby supplementing generic model capabilities with specialized (e.g., domain-specific) or up-to-date data. MoE architectures, meanwhile, route an input to specialized sub-models, also known as "experts," according to contextual cues or the nature of the input. MoE architectures are implemented as single, monolithic models in which multiple expert networks are embedded within a single framework that is typically coordinated by a gating network or gating function. The gating function determines, given an input, which subset of experts will be activated. Although each expert may be trained with specialization (such as domain expertise), all experts and the gating layer share the same underlying access to incoming data (e.g., the input) and model parameters during training and inference phases. The entire MoE architecture (i.e., the gating mechanism and experts) is typically trained jointly, and therefore all components within the shared architecture share the same context window.

A context window determines a maximum number of tokens (i.e., words, sentences, or data entries) that a model can process simultaneously, thereby directly limiting how much information about the query, conversation history, or source documents can be incorporated. Recent models have addressed this limitation by natively supporting larger context windows (i.e., using context window expansion), thereby accommodating increasingly lengthy user inputs, logs, or histories. In cases where the input exceeds the model's context window, additional strategies such as chunking or sliding window techniques can be used to split the input into smaller, overlapping segments that are processed sequentially and the responses subsequently merged together. For example, a user's request (e.g., "Provide a summary of a user's access activity over the past quarter") may be transformed into a retrieval query (such as in the format of a structured query language (SQL)), executed against available databases, and supplemented by RAG to provide additional evidence or by expert models for domain-specific summarization.

However, as real-world datasets become extremely large or span many distributed, sensitive repositories (e.g., health records, Internet of Things (IoT) telemetry across regulated environments), the effectiveness of RAG, MoE, or even expanded context windows greatly decreases. For example, if a prompt requires the aggregation and analysis of data from numerous sources, or if policy, privacy, or regulatory constraints prevent uploading all data to a centralized public cloud or external model, conventional approaches are unable to generate accurate responses. Typically, the retrieval operation assumes that whatever is retrieved from the source is both relevant and comprehensive, i.e., meaning the downstream model (LLM or agent) operates under the assumption that the dataset is complete and authoritative. However, in reality, data is often missing, fragmented, or inaccessible due to security constraints. For example, when a user requests client-specific analytics, conventional information retrieval systems may only query a subset of client-specific records based on static routing logic or incomplete mappings and return answers that are neither exhaustive nor correct. Yet, the model's outputs are unable to indicate such gaps.

Beyond missing data, large-scale MoE or RAG systems typically degrade in quality when presented with redundant or unrelated data, returning overly generic or even misleading outputs. The degradation is exacerbated as the context window enlarges. For example, models may "forget" or dilute the significance or weight of specific facts. In addition, since legal, privacy, and commercial risks mean that users often cannot or will not upload all proprietary or sensitive data into global models, even if such upload were technically feasible, traditional information retrieval workflows and context windows that are typically optimized for public data and open environments are unable to operate accurately using regulated, distributed, or privacy-sensitive workflows.

Attempting to create a system to orchestrate autonomous AI agents for output generation in view of the available conventional approaches created significant technological uncertainty, especially in environments comprised of large, distributed, and access-restricted datasets (such as those encountered in regulatory, industrial, or IoT deployments).

Creating such a system requires addressing several unknowns in conventional distributed data processing techniques, including the inflexibility, latency, and lack of contextual awareness in existing orchestration and data access solutions.

To overcome the technological uncertainties, the inventors systematically evaluated multiple design alternatives. For example, the inventors evaluated systems that relied on periodic polling, wherein agents scan data sources at fixed intervals, regardless of user intent, current operational needs, or evolving data availability. While this system offered an increased measure of data refresh, the system was inefficient and inflexible due to the increased latency (since the system may wait until the next polling cycle to react), increased network traffic (including a waste of resources by repeatedly querying when no new data is available), and often stale or irrelevant information. Another alternative relied on hard-coded, rule-based routing architectures, in which requests are segmented and routed to designated external agents or datasets according to pre-set rules. Although the segmentation of the request enabled a more focused context window (and thereby reducing the probability of a diluted response), the system was unable to adapt to changes in data topology, user roles, or other access policies, which are prevalent in environments governed by regulatory or organizational controls. For instance, if a user's request requires expertise from a newly added device/agent or if a particular agent becomes overloaded or offline, static routing is unable to adjust dynamically.

As such, the inventors have developed systems (hereinafter "model orchestration platform") and related methods to automatically generate context-aware outputs using a gateway router (e.g., an agent, an LLM) to manage a distributed network (e.g., a "constellation") of artificial intelligence (AI) agents. The gateway router receives an output generation request from a user interface or API endpoint, then decomposes the request/input into subcomponents (e.g., sub-queries) based on semantic intent, contextual metadata, privacy parameters, and/or policy requirements. Each subtask is dynamically routed to one or more specialized agents, with routing decisions informed by the agents' expertise (e.g., training dataset), near-real-time or real-time workload, permissible data domains, compliance status, and/or other contextual variables. Each agent can independently retrieve and process only the relevant slices of federated, privacy-controlled data within its authorization scope, thereby producing localized results. The model orchestration platform aggregates/synthesizes the agent-specific responses into an overall, contextually responsive output that is in compliance with access controls, operational boundaries, and regulatory constraints. In some implementations, the model orchestration platform displays a presentation (e.g., on a graphical user interface or command line interface) of the decomposition and reassembly operations to create an audit trail that identifies the routing history and/or data lineage.

By using a gateway router, the model orchestration platform is able to dynamically update the routing of portions of the input to different agents based upon changed environmental/contextual signals (e.g., from sensors, from other agents, and so forth). Unlike static or rigid rule-based approaches, the gateway router maintains a continuously updated and dynamic routing table that is updated based on data from contextual signals such as environmental sensors, internal agent status messages, and other contextual feedback. For instance, if a temperature sensor within an IoT network signals a rapid change in temperature, the gateway router can update the routing tables to prioritize different tasks (e.g., climate regulation) and/or adjust the routing of the input to different agents.

The agents in the network, of which can be a subject matter expert (SME) trained on specialized data (i.e., data sharing a common domain), can each access respective specialized data repositories or devices. When an input to the gateway router spans multiple domains, the gateway router can invoke hierarchies of agents, such as starting with generalists and cascading to deeper specialists as needed (e.g., as determined by the generalist agent), and/or enable the agents themselves to flag missing data, recommend delegation to peer experts, or identify additional data sources. Each agent can operate with an independent context window, can maintain its own workflow, and can communicate recommendations or missing points of failure (such as a lack of current sensor data or an unavailable device). The model orchestration platform thus enables a closed feedback loop where agent workflows may themselves evolve, ontologies and routing tables can be dynamically updated, and the agents can participate in voting or consensus workflows for particular tasks. The model orchestration platform does not depend on a single shared model or input pipeline (such as that of MoE architectures), but instead orchestrates a distributed, context-aware, and dynamically adaptable network of specialized agents.

Further, the model orchestration platform disclosed herein enables dynamic evaluation of machine learning prompts for agent selection, as well as validation of the resulting outputs, in order to improve the security, reliability, and modularity of data pipelines (e.g., software development systems). The model orchestration platform can receive a prompt from a user (e.g., a human-readable request relating to software development, such as code generation) and determine whether the user is authenticated based on an associated authentication token (e.g., as provided concurrently with the prompt). Based on the selected model, the model orchestration platform can determine a set of performance metrics (and/or corresponding values) associated with processing the requested prompt via the selected model. By doing so, the model orchestration platform can evaluate the suitability of the selected model (e.g., agent) for generating an output based on the received input or prompt. The model orchestration platform can validate and/or modify the user's prompt according to a prompt validation model. Based on the results of the prompt validation model, the model orchestration platform can modify the prompt such that the prompt satisfies any associated validation criteria (e.g., through the redaction of sensitive data or other details) thereby mitigating the effect of potential security breaches, inaccuracies, or adversarial manipulation associated with the user's prompt.

The inventors have also developed a system for dynamically selecting models (e.g., agents) for processing user prompts in a resource-sensitive manner. The system state can include a current CPU usage associated with processors of the model orchestration platform. Based on the system state, the model orchestration platform can calculate a threshold metric value that indicates an allotment of system resources available for generating an output based on the prompt. The model orchestration platform can determine the estimated performance metric value associated with generating the output using the user's selected machine learning model (e.g., agent). In response to determining that the estimated performance metric value satisfies the threshold metric value, the data generation platform can provide the prompt to the selected model (e.g., agent) for generation of the requested output and subsequent transmission to a system that enables the user to view the output. When the estimated performance metric value does not satisfy the threshold metric value, the data generation platform can determine another model (e.g., a second agent) for generation of the output.

To evaluate the model (e.g., agent) outputs, the inventors have developed a system that operates in an isolated environment to mitigate errors and security breaches. For example, the data generation platform determines whether an output from a machine learning model, such as an agent, includes particular types of data (e.g., including software-related information, such as a code sample, code snippet, or an executable program). In such cases, the data generation platform can provide the generated output to a parameter generation model (e.g., an LLM, another agent) configured to generate validation test parameters to validate the nature of the output data (e.g., the generated code). For example, using the parameter generation model, the platform generates compilation instructions for an appropriate programming language, where the compilation instructions identify or locate a compiler for compiling a set of executable instructions based on the generated code. The parameter generation model can generate a virtual machine configuration for testing the behavior of the executable instructions. The data generation platform can generate the virtual environment (e.g., within a virtual machine) according to the virtual machine configuration to enable compilation of the generated code within an isolated environment (e.g., a "sandcastle") for testing the code.

Further, the model orchestration platform can select, in response to an input, AI model(s) to generate an output and the infrastructure to run the one or more AI models. For example, the system receives an output generation request including an input for the generation of an output using one or more models from a plurality of models. The system can generate expected values for a set of output attributes (e.g., a type of the output generated from the input, a threshold response time of the generation of the output) of the output generation request. For each particular model in the plurality of models, the system can determine the capabilities of the particular model (e.g., estimated performance metric values for processing requests, system resource metric values indicating an estimated resource usage), and dynamically select a subset of models from the plurality of models. For the selected subset of models, the system can dynamically select a subset of available system resources to process the input included in the output generation request. The system generates the output by processing the input included in the output generation request using the selected subset of available system resources.

While the current description provides examples related to large language models (LLMs) and agents, one of skill in the art would understand that the disclosed techniques can apply to other forms of machine learning or algorithms, including unsupervised, semi-supervised, supervised, and reinforcement learning techniques. For example, the disclosed model orchestration platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Model Orchestration Platform

FIG. 1 shows a schematic illustrating an example environment 100 of orchestrating semi-autonomous or autonomous agents, in accordance with some implementations of the present technology. The environment 100 is implemented using components of example devices 200 and computing devices 302 illustrated and described in more detail with reference to FIG. 2 and FIG. 3, respectively. Implementations of example environment 100 can include different and/or additional components or can be connected in different ways.

The environment 100 includes a client 102, which may be any electronic device provisioned with digital computation and communication capability, such as a laptop, workstation, server endpoint, mobile processor, or embedded system, capable of generating, encoding, and transmitting semantically structured input data (e.g., prompts, search queries, command tokens) to the gateway router 106. The client 102 can be a personal computer, mobile device, or any other suitable computing device such as those with a user interface.

The gateway router 106 refers to an orchestration endpoint of the environment 100 that receives the prompt 104 from the client 102 and manages the distribution of processing tasks across multiple semi-autonomous or autonomous agents. The gateway router 106 can operate as a routing node and be implemented as a computer program executable on one or more processors of the client 102 or a different computing device. The gateway router 106 may, in some implementations, include a monolithic LLM. In some implementations, the gateway router can include a federated suite of models where each model can be specialized for different tasks (e.g., prompt segmentation, domain inference, agent selection) and the suite can operate under a meta-controller (potentially itself an LLM or other system) that arbitrates inter-model decisioning and delegates segmented tasks to the agent network. The gateway router 106 can include an active ensemble configuration, in which diverse models (e.g., transformer-based models, symbolic reasoners, reinforcement learning agents) run in coordinated or competitive execution, with routing decisions produced through model fusion and aggregation methods (e.g., MoE or majority/consensus voting).

In each case, the gateway router 106 partitions, segments, or otherwise decomposes the received prompt 104 into sub-queries 108 (e.g., a first sub-query 108a, a second sub-query 108b, a third sub-query 108c, and so forth). The sub-queries 108 each refer to a computational action unit that includes instructions such as data retrieval requests, each annotated with an output parameter set that can specify a user type (e.g., access-level), temporal context (timestamp), requested output modality (text, vector, file), performance requirements, system resource thresholds, and so forth.

The environment 100 includes multiple semi-autonomous or autonomous agents 110 (a first agent 110a, a second agent 110b, a third agent 110c, a fourth agent 110d, and so forth) that process the sub-queries 108 and generate agent responses 116 (e.g., a first agent response 116a, a second agent response 116b, a third agent response 116c, and so forth). The agents 110 refer to a persistent software entity that can be characterized by a digitally encoded objective function (e.g., maximization of task accuracy, minimization of resource usage, compliance with specified policy constraints). The instantiation of the objective function can be static (e.g., assigned at deployment) or dynamic, enabling runtime adaptation of the objective function in response to changes in environmental signals (such as resource state, input task complexity, geopolitical events, market data, user context, and the like). The agents 110 are enabled to receive unstructured, semi-structured, or structured environmental signals (e.g., prompt metadata, resource availability, inter-agent messages, contextual signals received from the gateway router 106), and use the environmental signals to autonomously trigger and manage actions such as application programming interface (API) invocations, outbound network requests, updates to internal or external datastores, and so forth.

The agents 110 can be structured as a network and/or a "constellation" of agents. For example, the agents 110 can be interconnected such that each agent operates as an autonomous or semi-autonomous node enabled to perform direct peer-to-peer interactions and/or hierarchical delegation. For example, a general agent can perform query parsing and context recognition, but subsequently route specialized sub-tasks to sub-agents with subject matter expertise (SMEs) (e.g., trained on a domain-specific dataset) in specific domains such as legal compliance, financial analysis, and so forth. Therefore, either the orchestrator agent can initially invoke only the general agent, which then further delegates sub-tasks, or the orchestrator agent can choose to directly identify and route work to the specialized sub-agent. For instance, in a financial services context, the gateway router can divide a trading query into segments for agents handling treasuries, equities, and derivatives, and then aggregate the results to produce an overall response.

The actions autonomously executed by the agents 110 can be responsive to a respective objective function of the agent. For example, an agent's objective function may direct it to maximize retrieval accuracy from a specific database, minimize task completion latency, or balance multiple criteria based on predefined weights. During autonomous execution, the agent 110 can determine a degree of expected utility of candidate actions by evaluating them against the agent's objective function and select executable actions that align with the agent's assigned objectives within any imposed operational constraints or boundaries set by the gateway router 106.

The agents 110 can vary in architecture. For example, the first agent 110a refers to a primary agent that receives sub-queries directly from the gateway router 106, and is enabled to autonomously communicate with the second agent 110b (e.g., spawn secondary sub-tasks or transfer execution context to other agents), which is not directly connected to the gateway router 106. The inter-agent communication enables collaborative problem-solving and knowledge sharing between different agents without direct orchestration from the gateway router 106. In another example, the third agent 110c refers to a directly connected agent that interfaces directly with the gateway router 106 for processing sub-queries. In yet another example, the fourth agent 110d refers to an agent enabled to autonomously connect to external applications 114, for example, via application programming interfaces (APIs) or other integration methods, to gather additional information or perform specific tasks to generate the third agent response 116c.

In some implementations, the gateway router 106 uses routing tables 112 to determine a candidate agent or combination of candidate agents to route the sub-query to. The routing tables 112 refer to data structures that store information associated with one or more respective agents 110, such as agent capabilities, knowledge bases connected to the agent, compliance status with certain guidelines (e.g., compliance with the EU AI Act, compliance with organizational guidelines), resources used by the agent, current workload, historical performance metrics, and so forth. The routing tables 112 can include multiple individual routing tables (such as a first routing table 112a, a second routing table 112b, a third routing table 112c, a fourth routing table 112d, and so forth) corresponding to different agents or agent types. Each routing table can include or otherwise indicate mappings between sub-query characteristics and agent capabilities, thereby enabling the gateway router 106 to use the information within the routing table when routing the sub-queries. The routing tables 112 can be dynamically updated based on agent performance and/or system feedback, as discussed further with reference to FIG. 4A and FIG. 4B.

The fourth agent 110d in FIG. 1 communicatively connects with one or more external applications 114. The external applications 114 refer to third-party software systems, databases, or services that can be accessed by the agents 110 to supplement their knowledge base or operations. These external applications 114 can include data sources, computational tools, domain-specific APIs, and so forth.

Each agent generates an agent response 116 (e.g., the first agent response 116a, the second agent response 116b, the third agent response 116c, and so forth) based on the assigned sub-query 108. The agent responses 116 refer to unstructured, semi-structured, or structured output data that includes or otherwise indicates the results of a respective agent responsive to the assigned sub-query 108. The agent responses 116 can include text, structured data, or references to external resources. For instance, the agent responses 116 may include natural language text (such as summaries or explanations), structured outputs like JSON or XML objects, tabular data, executable scripts, or uniform resource identifiers (URIs) referencing files or computational results stored elsewhere. The agent responses 116 can include pointers to large datasets or content retrieved via external APIs (e.g., the external applications 114).

The gateway router 106 is enabled to receive or otherwise obtain these individual agent responses 116 and synthesize the agent responses 116 into an overall response 118. The gateway router 106 can, for example, concatenate or merge the agent responses 116. In some implementations, the gateway router 106 combines overlapping results, filters redundancies, resolves conflicts based on agent confidence scores or reliability metrics, and so forth. The gateway router 106, in some implementations, uses majority voting to aggregate the agent responses 116 when multiple agents provide alternative answers to the same logical sub-task. The gateway router 106, in some implementations, weighs or re-prioritizes agent responses in response to known user preferences, system policies, or observed trustworthiness (e.g., via an assigned reputation score) of specific agent/application pairs. Further methods of aggregating the agent responses 116 are discussed in detail with reference to FIG.

6. The overall response 118 can be transmitted back to the client 102 (e.g., via the gateway router 106) for presentation to the user.

Suitable Computing Environments for the Model Orchestration Platform

Figure 2:
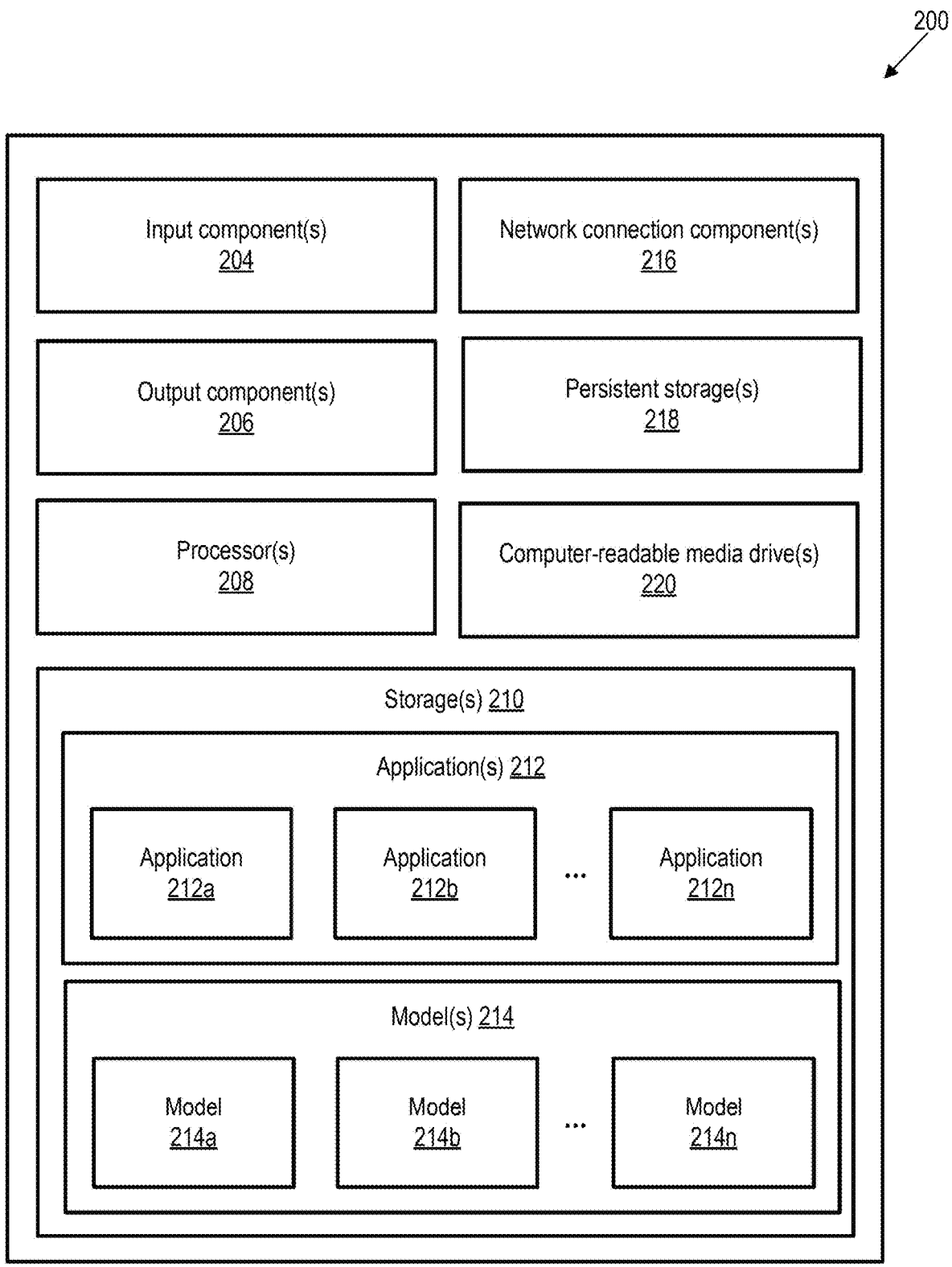
FIG. 2 shows a block diagram showing some of the components typically incorporated in at least some of the computer systems and other devices on which the disclosed system operates, in accordance with some implementations of the present technology.

FIG. 2 shows a block diagram showing some of the components typically incorporated in at least some of the computer systems and other devices 200 on which the disclosed system (e.g., the model orchestration platform) operates in accordance with some implementations of the present technology. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 206, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 208, including a CPU for executing computer programs, a GPU for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 3:
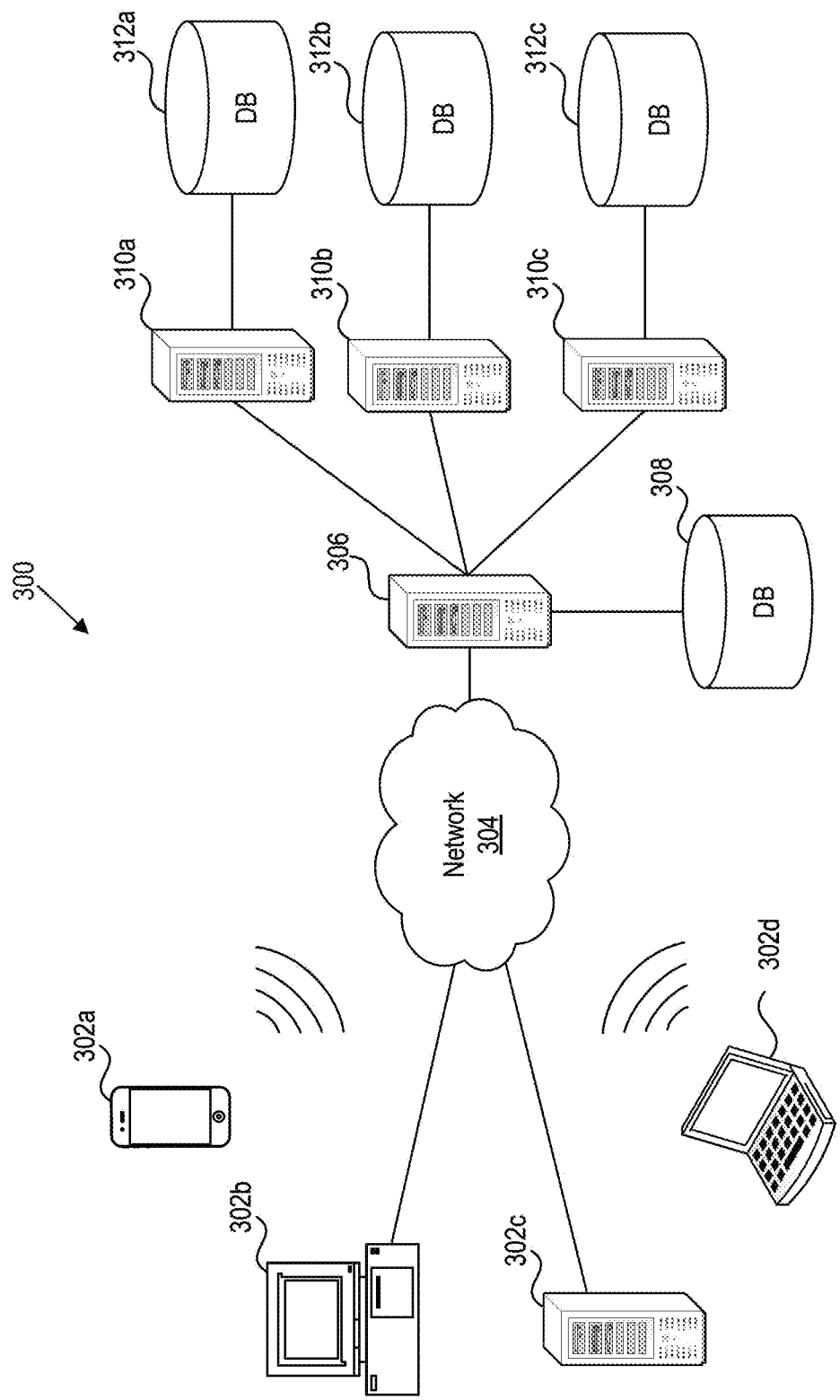
FIG. 3 is a system diagram illustrating an example of a computing environment in which the disclosed system operates, in accordance with some implementations of the present technology.

FIG. 3 is a system diagram illustrating an example of a computing environment 300 in which the disclosed system operates in some implementations of the present technology. In some implementations, environment 300 includes one or more client computing devices 302a-302d, examples of which can host graphical user interfaces associated with client devices. For example, one or more of the client computing devices 302a-302d includes user devices and/or devices associated with services requesting responses to queries from LLMs. Client computing devices 302 operate in a networked environment using logical connections through network 304 (e.g., the network 750) to one or more remote computers, such as a server computing device (e.g., a server system housing the model orchestration platform). In some implementations, client computing devices 302 can correspond to device 200 (FIG. 2).

In some implementations, server computing device 306 is an edge server that receives client requests and coordinates fulfillment of those requests through other servers, such as server computing devices 310a-310c. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310a-310c) connect to a corresponding database (308, 312a-312c). For example, the corresponding database includes a database stored within the data node 704 (e.g., a sensitive token database, an event database, or another suitable database). As discussed above, each server computing device 310 can correspond to a group of servers, and each of these servers can share a database or can have its own database (and/or interface with external databases, such as third-party databases 708a-708n). In addition to information described concerning the data node 704 of FIG. 7, databases 308 and 312 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 (e.g., corresponding to the network 750) can be a local area network (LAN) or a wide area network (WAN) but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of LAN, WAN, wired network, or wireless network, including network 304 or a separate public or private network.

Figure 4A:
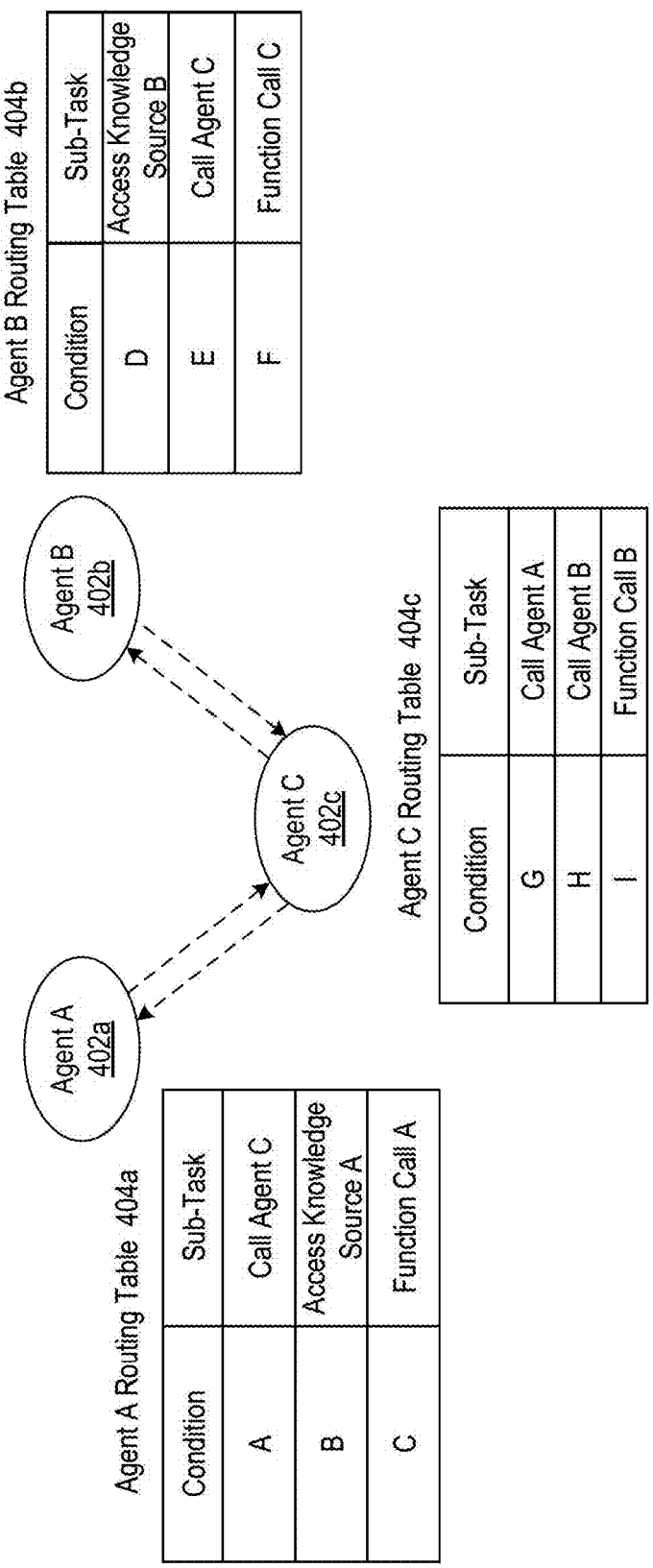
FIGS. 4A and 4B show schematics illustrating dynamic changes in routing table(s) of semi-autonomous or autonomous agent(s) orchestrated by the model orchestration platform in response to a contextual signal, in accordance with some implementations of the present technology.
Figure 4B:
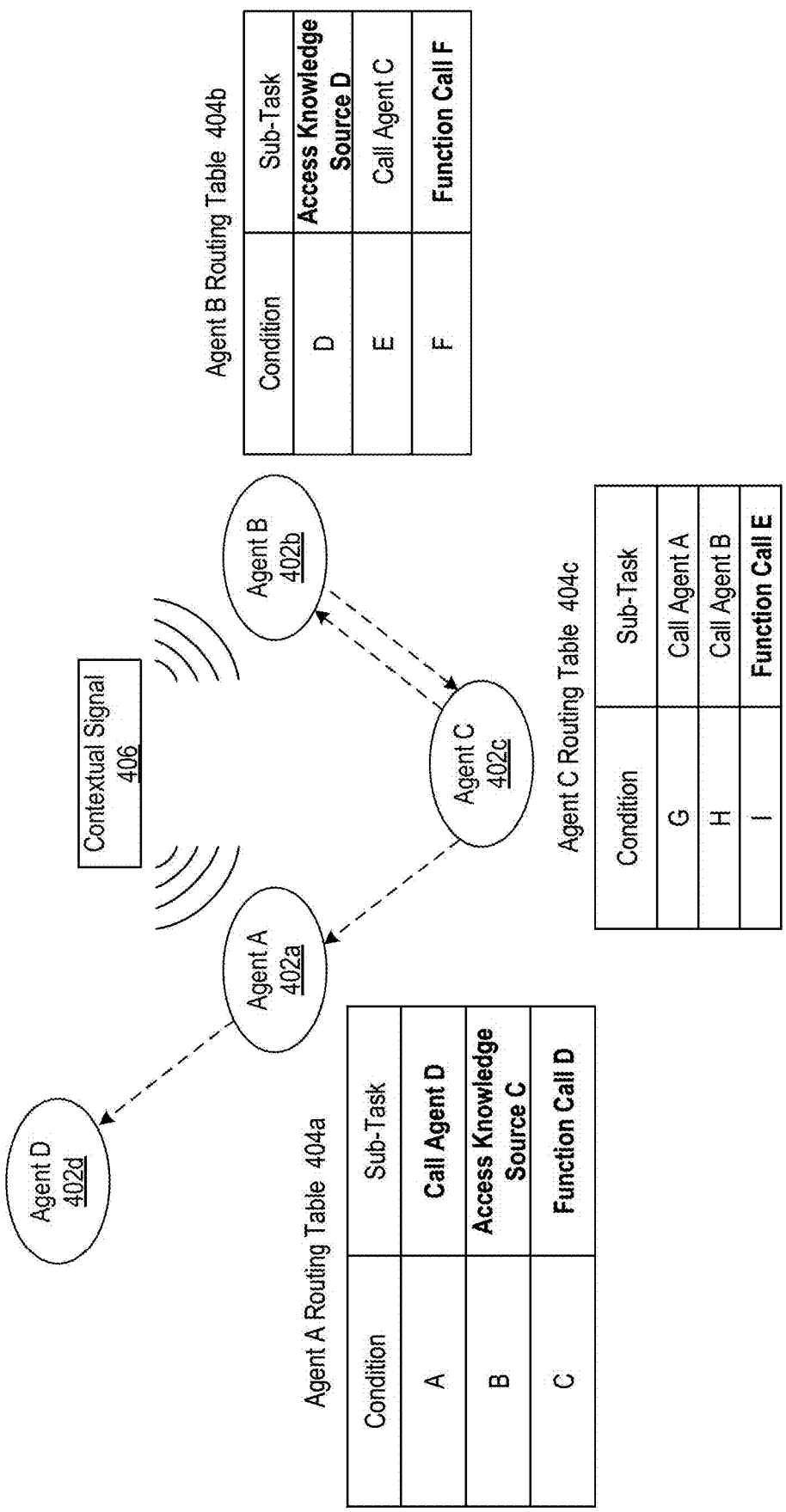

Orchestrating Semi-Autonomous/Autonomous Agents Using the Model Orchestration Platform FIGS. 4A and 4B show schematics illustrating dynamic changes in routing table(s) 404 of semi-autonomous or autonomous agent(s) 402 orchestrated by the model orchestration platform in response to a contextual signal 406, in accordance with some implementations of the present technology. The agents 402 and the routing tables 404 are implemented using components of example devices 200 and computing devices 302 illustrated and described in more detail with reference to FIG. 2 and FIG. 3, respectively. Implementations of FIGS. 4A and 4B can include different and/or additional components or can be connected in different ways.

The agents 402 refer to semi-autonomous or autonomous entities within the model orchestration platform, implemented on a range of machine learning models (e.g., deep neural networks, transformer architectures, reinforcement learning policies, and so forth). Each agent 402 can be trained to perform specific tasks or be trained on datasets associated with particular domains of knowledge. These agents 402 process inputs received from the gateway router 106 (e.g., the sub-queries 108 in FIG. 1), autonomously execute one or more actions, and generate outputs (e.g., the agent responses 116 in FIG. 1). Each agent 402 can be provisioned with a routing table 404 that encodes mappings from environmental or input conditions (such as prompt type, detected entities, time of day, or user authorization class) to computer-executable actions or delegated sub-tasks.

The routing tables 404 refer to static or dynamic data structures associated with each agent 402. Each routing table 404 is a computer-implemented data structure, which can be realized as an in-memory database or distributed key-value store, whose entries encode conditional logic, stateful statistics, and transformation rules that govern the selection, prioritization, and invocation of agents for each computational sub-task. The routing tables 404 can include sets of rules, conditions, and corresponding actions used by the agents 402. Each routing table 404 can be structured to map input conditions to appropriate actions or sub-tasks. The routing tables 404 can be updated dynamically in response to various contextual signals, thereby enabling the agents to adapt their behavior based on changing environmental conditions.

In FIG. 4A, the schematic illustrates a baseline configuration of the agents and their routing tables. A first agent 402a is associated with a first routing table 404a, which includes conditions A, B, and C, each mapped to specific sub-tasks or actions. Similarly, a second agent 402b and a third agent 402c are each associated with their respective routing tables, a second routing table 404b and a third routing table 404c, each including sets of conditions and corresponding actions. Rules can be implemented as either first-order logic predicates, parameterized configuration entries, or neural function approximators. Table entries can trigger actions such as resource-aware invocation of downstream APIs, application of data validation models, or routing of specific sub-queries to specialized agents. In some implementations, one or more routing tables 404 can be independently versioned.

FIG. 4B demonstrates how the routing tables 404 can be dynamically updated in response to a contextual signal 406. The contextual signal 406 refers to a change in the environment or input data that causes the agents to adapt their behavior, as further discussed with reference to the contextual signals 504 in FIG. 5. The contextual signal 406 can be detected by the gateway router. For example, one or more generative AI models used by the gateway router can be trained on datasets of historical events, economic trends, and so forth, and can identify patterns/predict potential impacts on the system's operations. Upon detecting a contextual signal 406, the gateway router initiates a process to update the routing tables of the affected agents. For example, if the gateway router (e.g., via generative AI models) detects signals indicative of an economic downturn, such as a sudden drop in stock market indices or an increase in unemployment rates, the gateway router can trigger an update to the routing tables of agents associated with financial decision-making. In some implementations, the update includes dynamically selecting or switching between predefined rule engine sets.

In the updated configuration shown in FIG. 4B, the routing tables of the agents have been modified to reflect the new context responsive to the contextual signal 406. For instance, the first routing table 404a in FIG. 4B includes a new action "Call Agent D" in place of the previous "Call Agent C" action. Thus, in some implementations, new or additional agents can be indicated in an updated routing table (i.e., additional fourth agent 402d). The change can, for example, represent a shift toward more conservative decision-making in response to an economic downturn indicated by the contextual signal 406. Similarly, the second routing table 404b is updated in FIG. 4B with a new action "Access Knowledge Source D" instead of the previous "Access Knowledge Source B," which can indicate, for example, consulting different data sources in the new economic climate.

Figure 5:
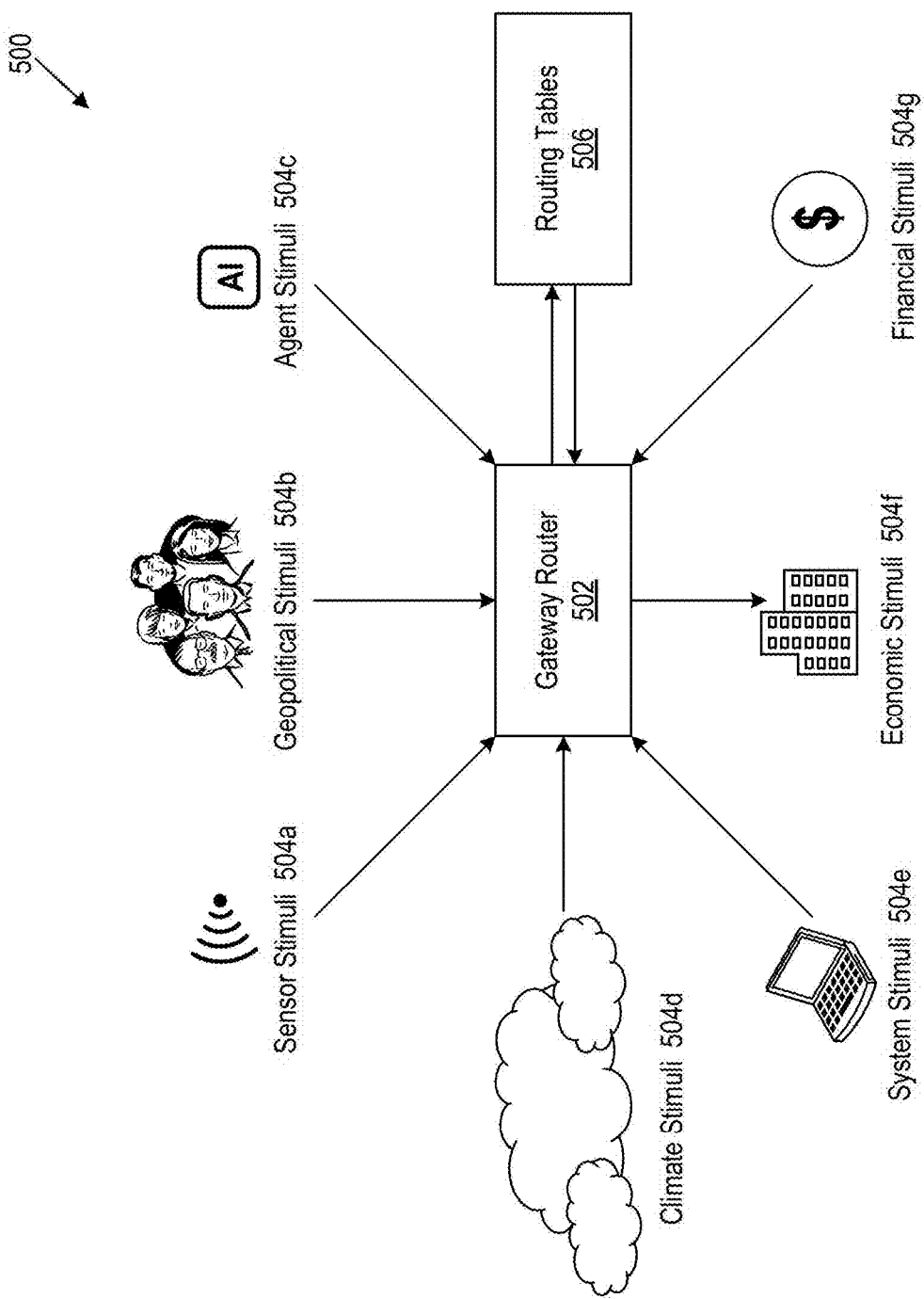
FIG. 5 shows a schematic illustrating contextual signals used to dynamically update the routing table(s) of the semi-autonomous or autonomous agent(s), in accordance with some implementations of the present technology.

FIG. 5 shows a schematic illustrating an example environment 500 of a gateway router 502 (e.g., the gateway router 106 in FIG. 1) using contextual signals 504 to dynamically update the routing table(s) 506 of the semi-autonomous or autonomous agent(s), in accordance with some implementations of the present technology.

The contextual signals 504 refer to a set of inputs that provide near-real-time or real-time information about the environment in which the gateway router 502 operates. Sensor stimuli 504a refers to data streams from physical sensors, which can include temperature sensors, motion detectors, or any other device capable of capturing physical measurements from the environment. The sensors can be distributed across various locations and connected to the gateway router 502 through wireless or wired networks, thereby providing continuous streams of quantitative data that reflect changes in the physical world. Geopolitical stimuli 504b refers to information related to political events, international relations, and governmental actions that may impact the system's decision-making processes. Geopolitical stimuli 504b can include data from news feeds, communications, or geopolitical analysis services. Agent stimuli 504c refers to feedback and status updates from other AI agents within the system or from external AI systems. Agent stimuli 504c can include performance metrics, task completion statuses, or requests for assistance from other agents. Climate stimuli 504d represents environmental data related to weather patterns, climate trends, and ecological factors. Climate stimuli 504d can include short-term weather forecasts, long-term climate projections, and data on environmental events such as storms or droughts. System stimuli 504e refers to internal metrics and status updates from the computational infrastructure supporting the AI system. System stimuli 504e can include CPU usage, memory allocation, network traffic, and other performance indicators that reflect the health and capacity of the system. Economic stimuli 504*f* represents data related to market conditions, economic indicators, and financial trends. Economic stimuli 504*f* can include stock market data, inflation rates, gross domestic product (GDP) figures, and other economic metrics. Financial stimuli 504*g* refers to specific financial data associated with the system's operations or its users. Financial stimuli 504*g* can include transaction data, credit scores, investment portfolios, or other financial metrics.

The routing tables 506 refer to dynamic data structures that store the rules and parameters governing how the gateway router 502 directs information flow and processing tasks within the system. The routing tables 506 can be continuously updated based on the contextual signals 504 received.

Figure 6:
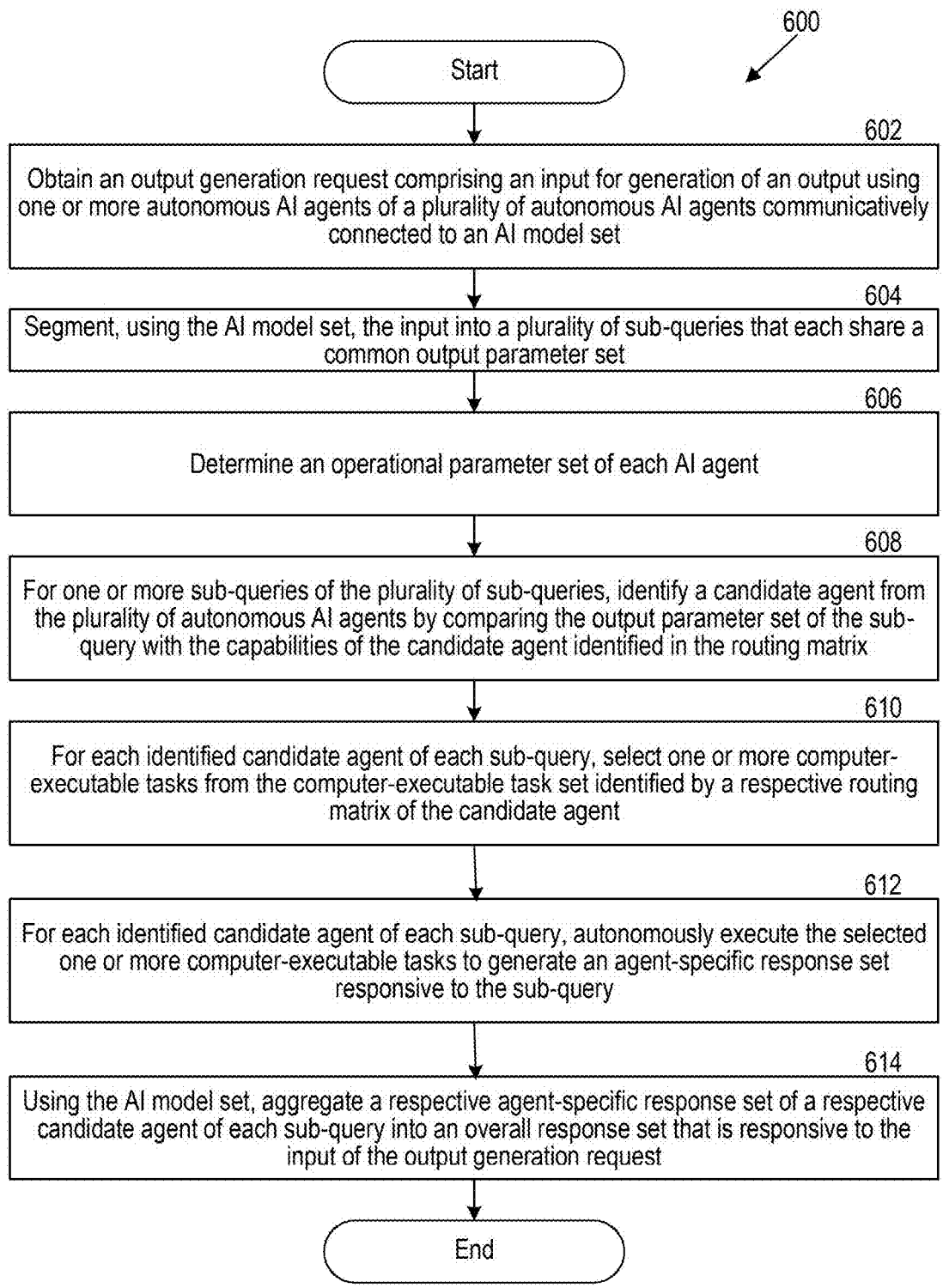
FIG. 6 shows a flow diagram illustrating a process for orchestrating a plurality of semi-autonomous or autonomous artificial intelligence (AI) agents to generate a personalized response, in accordance with some implementations of the present technology.

FIG. 6 shows a flow diagram illustrating a process 600 for orchestrating a plurality of semi-autonomous or autonomous AI agents to generate a personalized response, in accordance with some implementations of the present technology. In some implementations, the process 600 is performed by components of example devices 200 and computing devices 302 illustrated and described in more detail with reference to FIG. 2 and FIG. 3, respectively. Likewise, implementations can include different and/or additional operations or can perform the operations in different orders.

In operation 602, the model orchestration platform is enabled to obtain (e.g., receive from a computing device) an output generation request that includes a digitally encoded input, such as a textual prompt, query object, or command set, for generation of an output using one or more AI agents of a set of AI agents communicatively connected to a gateway router (e.g., a large language model (LLM) set, an AI model set, a model set, an AI agent set).

In implementations where the gateway router is an LLM set, the LLM set can identify the context, intent, and/or semantic structure of the input using techniques such as dependency parsing, named entity recognition, and semantic role labeling. In some implementations, the gateway router is a modular suite of models that can include a hybrid setup of rules-based classifiers, neural embeddings, and so forth. The gateway router can map out which portions of the input are linked (e.g., what is the main verb, which nouns are the subject or object, and which adjectives modify which nouns) to identify dependencies. The gateway router can identify entities referenced within the input, such as names of people, organizations, locations, dates, or products. The gateway router can determine the underlying intent of the input by predicting the likely action based on training data or using a rule-based system to map identified verbs to a corresponding action. For example, an intent can be referenced as "retrieve information," "book an appointment," "send an email," or "answer a question."

One or more AI agents can be associated with a specific routing data structure such as a matrix, table, graph, or other data structure that identifies actions such as a computer-executable task set used to generate a response, preconditions, parameter boundaries, and/or trigger events. The routing data structure(s) can be annotated using domain-specific ontologies or knowledge graphs. For example, a matrix row maps a detected user type and operation to a given agent's indices, while a column encodes resource constraints or regulatory flags.

Each action can be autonomously executed by the AI agent on a set of software applications in response to satisfaction of a condition set. For example, each action can be identified in the routing data structure by its operational signature, such as a software API call, database transaction, service invocation, code execution on an isolated virtual machine, and so forth. The respective AI agent can evaluate a condition set, which can be Boolean or other logic, against the input's operational parameters (such as user permissions, data sensitivity, time constraints, or current system load). Only when the conditions in the condition set are satisfied does the agent proceed to autonomously execute the action.

In operation 604, the model orchestration platform is enabled to segment, using the gateway router, the input into a plurality of portions such as sub-queries. Each sub-query can share a common output parameter set that identifies, for example, a user type or privilege level (to enforce access control), timestamp of receipt, requested output modality (such as text, file, JSON object, vector embedding, or structured report), performance metric thresholds (e.g., required response time, accuracy bounds, resource usage limits), constraints on system resource allocation (such as memory, CPU, or bandwidth quotas per sub-query), and so forth.

To partition the input, the gateway router can transform the input into high-dimensional vectors (i.e., numerical representations that encode the underlying contextual relationships of each part of the input) using an embedding model (which can be within the gateway router). The embeddings enable the gateway router to detect shifts in intent, semantic domains, or actionable entities within the input. For example, the vectors are compared against a set of pre-established reference embeddings, each representing prototypical intents, domains (e.g., a subset of knowledge), or entity types. By measuring the proximity and direction of the input vectors relative to these references (using cosine similarity or related distance metrics), the gateway router can quantify how closely each segment aligns with known categories or detect when vector patterns shift, signaling a change in user intent, topic, or actionable item. A vector shift can be flagged as a context transition, and therefore form a separate sub-query.

For example, when a user or automated system transmits an input to the platform that states "prepare the house for bedtime by turning off the downstairs lights, locking all exterior doors, lowering the thermostat to 65 degrees, and activating security cameras," the gateway router identifies the sequence of independent operations: (1) turning off lights, (2) locking doors, (3) adjusting the thermostat, and (4) activating security devices by identifying keywords within the input (e.g., "lock," "adjust thermostat"). Each of the operations is treated as a sub-query. For each sub-query, the gateway router can obtain the common output parameter set of the predefined sub-query. For instance, the gateway router tags each one with the user's privilege level (so "lock all doors" or "deactivate alarms" will only be attempted if the user has admin access).

In operation 606, the model orchestration platform is enabled to determine an operational parameter set of each AI agent that defines at least one user type authorized to use the AI agent, a range of timestamps associated with the AI agent, at least one output modality of responses generated by the AI agent, at least one performance metric value, at least one resource usage value, and so forth. Performance metric values, such as required response time (latency), accuracy, trust confidence, or compliance levels, can be retrieved from agent registries or calculated in near-real-time or real-time based on prior executions, simulated workloads, or machine learning-based predictions. Resource usage values can define computational boundaries, such as maximum CPU cycles, RAM usage, bandwidth consumption, number of concurrent threads, and so forth. The model orchestration platform can store the operational parameter set of each AI agent within a respective dynamic routing table or configuration graph that tracks active constraints and current state for each agent.

In operation 608, the model orchestration platform is enabled to, for each sub-query of the plurality of sub-queries, identify, using the gateway router, a candidate agent (single or multiple) from the plurality of AI agents by comparing the output parameter set of the sub-query with the operational parameter set of each AI agent within the plurality of AI agents. In a rule-based approach, the gateway router uses filtering and logic rules to remove agents who do not meet particular requirements, such as compliance, privilege level, and so forth. In some implementations, the gateway router calculates similarity scores between the vectors of sub-query output parameters and agent operational parameters, e.g., using cosine similarity or other distance measures. The gateway router can use an ensemble model to rank candidate agents on predefined static capabilities (e.g., training data) and/or near-real-time or real-time performance, availability, historical success rate for similar tasks, predicted energy consumption, and so forth. For example, when the operational parameter set defines the at least one resource usage value, the model orchestration platform can allocate a subset of available computational resources to process the sub-query based on the one or more resource usage values of the identified candidate agent.

The gateway router can cross-reference the vectorized input against structured ontologies, or digital maps of domain expertise and capabilities of the AI agents communicatively connected to the model orchestration platform, to map distinct portions of the input to their most appropriate downstream handler. The gateway router can compare the current prompt with historical requests and workflows, and use the comparison to route similar input portions to historically routed agents.

In some implementations, each AI agent is associated with an ontology data structure. The ontology data structure can refer to a machine-readable representation of a domain set, an attribute set of each domain-specific category in the domain set, and/or a set of relationships among the domain set and the attribute set of each domain set. The AI model set can access the ontology data structure of a particular AI agent to identify, for a particular sub-query, a query-specific domain within the domain set based on one or more query-specific attributes within respective attribute sets of each domain. One or more candidate agents of the candidate agent set can be associated with the query-specific domain. The ontology data structure can be stored in, for example, a graph database, a distributed file system, a cloud-based object storage service, a local persistent memory of the AI agent, and so forth. Updates to the ontology structure can be performed only in response to a consensus among the AI agents. For example, the model orchestration platform can update the ontology data structure responsive to receiving a data signal from the AI agent set that indicates a consensus among the AI agent set for the update.

The plurality of AI agents can be organized in a hierarchal architecture (e.g., a "constellation" of agents). The hierarchal architecture can include a general-purpose agent at a first level of the hierarchal architecture, multiple specialized sub-agents at a second level, and so forth. AI agents can be identified on an API registry, which can refer to a continuously updated directory that lists all registered agents, their endpoints, supported functions, operational health status, and/or compliance metadata. For example, the model orchestration platform can expose an API registry identifying the AI agent set, where the API registry is accessible by the gateway router. This registry can be implemented as a centralized ledger or a distributed service, allowing the orchestrator (and even sub-agents) to dynamically discover, authenticate, and select the available agents for a given sub-task.

In some implementations, at least one AI agent is associated with a dynamic retrieval-augmented generation (RAG)-based model. The dynamic RAG-based model can update a knowledge base associated with the RAG-based model by retrieving data from one or more data sources via, for example, an API. The update can be triggered based on detected performance degradation, received user feedback, a scheduled interval, and the other contextual signals such as those discussed with reference to FIG. 5. The dynamic agent refers to a dynamic RAG-based agent that communicatively connects its internal language model(s) to an actively managed knowledge base that is continually refreshed by retrieving new data from sources (e.g., trusted sources) through APIs, web scrapers, and/or other database connectors. The timing and frequency of the updates can be fully automated or governed by predefined logic, for example, triggering data incorporation when an agent's live performance metrics drop below an accuracy benchmark (e.g., 90% on evaluation sets), in direct response to user feedback highlighting knowledge gaps, or at regular, scheduled intervals. The flexibility enables the gateway router and/or the candidate agent itself to monitor for new or valuable data sources, check for stale entries, and incorporate vetted updates, while minimizing or at least greatly reducing retraining costs and ensuring that sensitive or proprietary information remains secure and is not intermixed or exfiltrated outside a trusted or otherwise validated environment.

In some implementations, at least one AI agent is instantiated as fine-tuned models, wherein the fine-tuning can be performed using domain-specific datasets to modify the model parameters of a pre-trained neural network. The model orchestration platform can receive a base model (e.g., a transformer-based LLM or small language model (SLM)), select a corpus of training data associated with a target domain (such as legal, medical, or financial records), and/or execute a supervised learning operation to update the model's weights. The resulting fine-tuned AI agent is enabled to generate responses to sub-queries that match the domain of the training data, and the model orchestration platform can dynamically route such sub-queries to the fine-tuned agent by matching sub-query metadata or semantic embeddings of the query to a respective domain of the fine-tuned AI agent. Thus, internal representations of the fine-tuned AI agent are specifically adapted to the operational context of the sub-query.

The model orchestration platform, in some implementations, uses purpose-trained SLMs that have been constructed using knowledge distillation operations. For example, the knowledge distillation operations include training a "compact" SLM (the "student") to replicate the output distributions of a larger, more "complex" (i.e., more parameters) model (the "teacher") on a set of inputs. In some implementations, a dataset of input-output pairs is generated using the teacher model that can be subsequently used to train the student SLM to minimize or otherwise reduce a divergence metric (e.g., Kullback-Leibler divergence) between its outputs and those of the teacher. The resulting SLM agent can be registered within the model orchestration platform with metadata that indicates its specific capabilities. During runtime, the model orchestration platform evaluates system resource constraints and sub-query requirements, and selectively routes sub-queries to the SLM agent when its operational profile and knowledge domain are determined to be aligned for the task.

The AI agents can be instantiated using various machine learning techniques, such as Bayesian inference models, decision trees, SVMs, rule-based expert systems, and the like. Each AI agent can be instantiated as a software module with a defined interface for receiving sub-queries, executing a computational procedure (e.g., probabilistic inference, tree traversal, or rule evaluation), and/or returning a structured response. The model orchestration platform can maintain a registry of agent capabilities and match sub-query characteristics (such as data type, required explainability, or determinism) to the agent sharing common attributes.

Conversely, static agents operate against fixed, immutable knowledge bases, which provides the benefit of full control, data provenance, and improved data privacy, especially when the underlying LLM or SLM is kept on-premises or within particular operative boundaries (e.g., within the automated systems or servers of an organization). This architecture reduces the risk of unwanted data leakage or contamination. In some implementations, dynamic RAG agents can perform validations via both automated validation (using deep learning-driven validators) and human-in-the-loop workflows, where updates to the knowledge base are subject to approval by users with specific roles or permissions.

In some implementations, at least one AI agent is a static agent associated with a first knowledge base that is fixed, and at least one other AI agent is a dynamic agent with a second knowledge base that can be updated. The data routing table can select between static and dynamic agents for a particular portion of the input based on data sensitivity, update frequency, user-defined policy, and so forth. The routing data structure or gateway router can dynamically determine, for each incoming input or sub-query, whether a static or dynamic agent is most appropriate, based on the rate at which information changes in the relevant domain (update frequency), the sensitivity or classification of the information (ensuring proprietary or confidential data is handled only by static agents), policies defined by administrators, and so forth.

In operation 610, the model orchestration platform is enabled to, for each identified candidate agent of each sub-query, select, using the gateway router, one or more actions (e.g., computer-executable tasks from the computer-executable task set) identified by a respective routing data structure (e.g., table, matrix) of the candidate agent. Each of the one or more actions can be selected based on the sub-query satisfying a respective condition set of the action. For example, the routing data structure can indicate a knowledge source used by the AI agent and/or a model used by the AI agent. The gateway router evaluates each sub-query against condition sets (i.e., logic rules or feature thresholds) identified by the routing data structure. For instance, if a sub-query requests "lower temperature if above 28° C.," the agent's task table can only activate its "HVAC adjust" action if current sensor data meets or exceeds that threshold. The routing structure can indicate which knowledge source (such as a sensor, retrieved data, or an external model) the agent should use, as well as which specific model or sub-model is invoked to process the input.

Routing data structures, which determine how actions are matched to conditions, can be maintained manually (e.g., updated by administrators through dashboards or configuration files) or automatically, via dynamic signals observed by the model orchestration platform itself. To update the routing data structures dynamically, the model orchestration platform can detect a change in one or more environmental signals using the LLM set, and dynamically modify the routing data structure of one or more AI agents based on the detected change in the one or more environmental signals.

The routing data structure can be updated in response to a detected change in system load (CPU, memory, or network usage), a detected change in user context (such as a role change), a detected change in environmental signals (such as a change in building occupancy or sensor reading/malfunction), and so forth. The change can additionally or alternatively be a change in value of a performance metric associated with the AI agent. Examples of contextual signals are discussed in further detail with reference to FIG. 5. For instance, if performance metrics indicate that an AI agent is becoming a bottleneck (increased response time, dropped packets), the routing data structure can downgrade its task assignment priority until a particular action such as fault recovery is executed.

In some implementations, the AI agent set and/or the gateway router includes a validation agent to validate updates to a knowledge base accessed by one or more AI agents. The validation agent can obtain (e.g., receive) a proposed update to the knowledge base. The validation agent can initiate a computer-implemented workflow to evaluate the proposed update against an update criteria set, and responsive to determining satisfaction of the proposed update with the update criteria set, apply the proposed update to the knowledge base. This thus prevents inadvertent propagation of faulty rules or data.

In some implementations, candidate agents can be identified based on historical queries. For example, the model orchestration platform compares the prompt against a database of previous queries, and identifies one or more identified candidate agents based on the comparison. Each new input can be compared against a database of previously processed output generation requests, using vector similarity search, recurrence pattern mining, or clustering models. If a current input closely matches a previously handled input, the routing platform can prioritize (e.g., increase the rank of) agent(s) that successfully (e.g., accurately, within a particular latency threshold) responded in the past.

In operation 612, the model orchestration platform is enabled to autonomously execute, using the identified candidate agent, the selected one or more computer-executable tasks to generate an agent-specific response set responsive to the sub-query.

In operation 614, the model orchestration platform is enabled to, using the gateway router, aggregate each respective agent-specific response set of each respective candidate agent of each sub-query (possibly from different modalities, such as text, images, audio, video, multi-modal data, unstructured data, semi-structured data, structured data, device status codes, summaries, and the like) into an overall response set that is responsive to the prompt of the output generation request. In some implementations, since responses can stem from a wide variety of data modalities, the gateway router normalizes each respective agent-specific response set into a standardized internal format so that disparate data types can be mapped to the original subcomponents of the input and enable the model orchestration platform to maintain a traceable link between each response and the specific sub-query of the input the response addresses. For example, one sub-query can request a temperature reading (structured data) while another requests a video snapshot from a security camera (multi-modal data).

Once normalized, the model orchestration platform can synthesize each respective agent-specific response set using temporal and semantic alignment (linking events or data across agents by their timestamp or logical context) and merging or summarizing redundant or complementary information. The model orchestration platform can perform conflict resolution through policy rules or majority voting. Confidence scoring and contextual weighting can be used to assess the reliability of each agent based on historical performance metrics, current system status, or explicit confidence values returned by the agents themselves. For instance, if two agents provide disagreeing status codes for a device state, the model orchestration platform can resolve the discrepancy by choosing (or weighting more heavily) the result from the most recently updated or highest-confidence agent. The aggregated response can be formatted or encoded according to the requirements of the output channel or requesting user, such as generating a structured report, a dashboard, a single summary text, or machine-consumable data package (e.g., JSON).

In some implementations, one or more AI agents are enabled to implement a feedback loop. For example, the model orchestration platform, via the gateway router and/or the AI agent, obtains a feedback set for one or more agent-specific response sets. The model orchestration platform generates a modification set (e.g., actions to adjust task parameters, alter execution sequences, or reweight routing priorities) to modify the one or more computer-executable tasks of a respective candidate agent and/or a sequence of the one or more computer-executable tasks of the respective candidate agent. The model orchestration platform transmits the modification set to the respective candidate agent, and applies the actions indicated in the modification set onto the respective candidate agent. The one or more AI agents can, once modified, re-execute the computer-executable tasks to generate a modified agent-specific response set, which can then be re-validated using the model orchestration platform.

In some implementations, the feedback loop is implemented using operations associated with fine-tuning and reinforcement learning. Fine-tuning can be performed by updating the parameters of a deployed agent model using additional labeled data that is specific to the operational environment or user context. For example, once new training samples are received, a supervised learning operation can be applied to adjust the model's weights, and the updated agent can be redeployed within the model orchestration platform. Reinforcement learning operations can be executed so that an agent receives reward signals based on the outcomes of its actions within the environment of the model orchestration platform. For example, an agent's policy is updated to enable the agent to iteratively adjust its behavior over time in response to observed feedback and performance metrics (e.g., using algorithms such as Q-learning or policy gradients).

Feedback can be generated internally by the agent itself, for example, by monitoring its own performance metrics, error rates, or confidence scores during task execution. Additionally or alternatively, feedback can be received from the orchestrator, which can be aggregate system-level performance data, user satisfaction scores, or compliance audit results. The orchestrator can transmit the received feedback as structured feedback signals to the agent. Agents, in some implementations, receive feedback from peer agents within the network to enable collaborative learning from feedback received by other agents. Furthermore, the model orchestration platform can obtain feedback from external sources, such as user annotations, third-party evaluation services, or regulatory compliance systems.

Agents within the model orchestration platform can autonomously generate feedback signals based on their internal state, task outcomes, or detected anomalies. The agent-generated feedback signals can be transmitted to the orchestrator, to other agents, or to external monitoring systems. For example, the model orchestration platform can implement a subscriber framework to enable services, agents, or external systems to register as subscribers to specific feedback channels or topics. When feedback is generated or received, the model orchestration platform can publish the feedback to all subscribed entities using a publish-subscribe messaging protocol. Thus, relevant feedback is disseminated in near real time or real time to all associated components across the model orchestration platform.

Validating Agent Inputs and Outputs Using the Model Orchestration Platform

Figure 7:
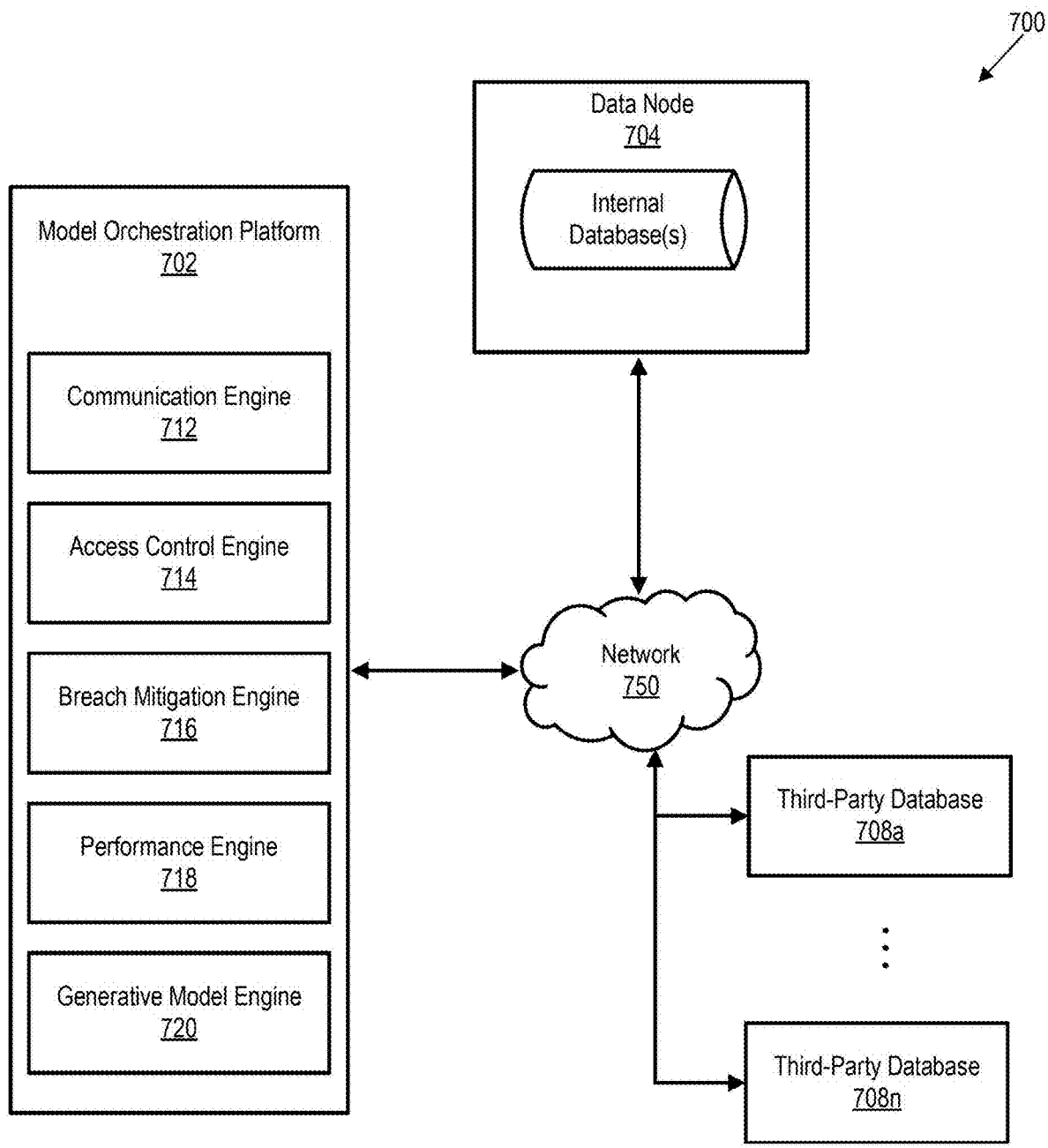
FIG. 7 shows an illustrative environment for evaluating model prompts and outputs for model selection and validation, in accordance with some implementations of the present technology.

FIG. 7 shows an illustrative environment 700 for evaluating machine learning model inputs (e.g., agent prompts) and outputs for model selection and validation, in accordance with some implementations of the present technology. For example, the environment 700 includes the model orchestration platform 702, which is capable of communicating with (e.g., transmitting or receiving data to or from) a data node 704 and/or third-party databases 708*a*-708*n* via a network 750. The model orchestration platform 702 can include software, hardware, or a combination of both and can reside on a physical server or a virtual server (e.g., as described in FIG. 3) running on a physical computer system. For example, the model orchestration platform 702 can be distributed across various nodes, devices, or virtual machines (e.g., as in a distributed cloud server). In some implementations, the model orchestration platform 702 can be configured on a user device (e.g., a laptop computer, smartphone, desktop computer, electronic tablet, or another suitable user device). Furthermore, the model orchestration platform 702 can reside on a server or node and/or can interface with third-party databases 708*a*-708*n* directly or indirectly.

The data node 704 can store various data, including one or more machine learning models, prompt validation models, associated training data, user data, performance metrics and corresponding values, validation criteria, and/or other suitable data. For example, the data node 704 includes one or more databases, such as an event database (e.g., a database for storage of records, logs, or other information associated with LLM-related user actions), a vector database, an authentication database (e.g., storing authentication tokens associated with users of the model orchestration platform 702), a secret database, a sensitive token database, and/or a deployment database.

An event database can include data associated with events relating to the model orchestration platform 702. For example, the event database stores records associated with users' inputs or prompts for generation of an associated natural language output (e.g., prompts intended for processing using an LLM). The event database can store timestamps and the associated user requests or prompts. In some implementations, the event database can receive records from the model orchestration platform 702 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the model orchestration platform 702). By doing so, the model orchestration platform 702 can store and track information relating to performance, errors, and troubleshooting. The model orchestration platform 702 can include one or more subsystems or subcomponents. For example, the model orchestration platform 702 includes a communication engine 712, an access control engine 714, a breach mitigation engine 716, a performance engine 718, and/or a generative model engine 720.

A vector database can include data associated with vector embeddings of data. For example, the vector database includes a numerical representations (e.g., arrays of values) that represent the semantic meaning of unstructured data (e.g., text data, audio data, or other similar data). For example, the model orchestration platform 702 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the model orchestration platform 702 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the model orchestration platform 702 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the model orchestration platform 702 can evaluate prompts and/or outputs to prevent breaches or leakage of such sensitive information.

A deployment database can include data associated with deploying, using, or viewing results associated with the model orchestration platform 702. For example, the deployment database can include a server system (e.g., physical or virtual) that stores validated outputs or results from one or more LLMs, where such results can be accessed by the requesting user.

The model orchestration platform 702 can receive inputs (e.g., prompts), training data, validation criteria, and/or other suitable data from one or more devices, servers, or systems. The model orchestration platform 702 can receive such data using communication engine 712, which can include software components, hardware components, or a combination of both. For example, the communication engine 712 includes or interfaces with a network card (e.g., a wireless network card and/or a wired network card) that is associated with software to drive the card and enables communication with network 750. In some implementations, the communication engine 712 can also receive data from and/or communicate with the data node 704, or another computing device. The communication engine 712 can communicate with the access control engine 714, the breach mitigation engine 716, the performance engine 718, and the generative model engine 720.

In some implementations, the model orchestration platform 702 can include the access control engine 714. The access control engine 714 can perform tasks relating to user/device authentication, controls, and/or permissions. For example, the access control engine 714 receives credential information, such as authentication tokens associated with a requesting device and/or user. In some implementations, the access control engine 714 can retrieve associated stored credentials (e.g., stored authentication tokens) from an authentication database (e.g., stored within the data node 704). The access control engine 714 can include software components, hardware components, or a combination of both. For example, the access control engine 714 includes one or more hardware components (e.g., processors) that are able to execute operations for authenticating users, devices, or other entities (e.g., services) that request access to an LLM associated with the model orchestration platform 702. The access control engine 714 can directly or indirectly access data, systems, or nodes associated with the third-party databases 708a-708n and can transmit data to such nodes. Additionally or alternatively, the access control engine 714 can receive data from and/or send data to the communication engine 712, the breach mitigation engine 716, the performance engine 718, and/or the generative model engine 720.

The breach mitigation engine 716 can execute tasks relating to the validation of inputs and outputs associated with the LLMs. For example, the breach mitigation engine 716 validates inputs (e.g., prompts) to prevent sensitive information leakage or malicious manipulation of LLMs, as well as validate the security or safety of the resulting outputs. The breach mitigation engine 716 can include software components (e.g., modules/virtual machines that include prompt validation models, performance criteria, and/or other suitable data or processes), hardware components, or a combination of both. As an illustrative example, the breach mitigation engine 716 monitors prompts for the inclusion of sensitive information (e.g., PII), or other forbidden text, to prevent leakage of information from the model orchestration platform 702 to entities associated with the target LLMs. The breach mitigation engine 716 can communicate with the communication engine 712, the access control engine 714, the performance engine 718, the generative model engine 720, and/or other components associated with the network 750 (e.g., the data node 704 and/or the third-party databases 708a-708n).

The performance engine 718 can execute tasks relating to monitoring and controlling performance of the model orchestration platform 702 (e.g., or the associated development pipeline). For example, the performance engine 718 includes software components (e.g., performance monitoring modules), hardware components, or a combination thereof. To illustrate, the performance engine 718 can estimate performance metric values associated with processing a given prompt with a selected LLM (e.g., an estimated cost or memory usage). By doing so, the performance engine 718 can determine whether to allow access to a given LLM by a user, based on the user's requested output and the associated estimated system effects. The performance engine 718 can communicate with the communication engine 712, the access control engine 714, the performance engine 718, the generative model engine 720, and/or other components associated with the network 750 (e.g., the data node 704 and/or the third-party databases 708a-708n).

The generative model engine 720 can execute tasks relating to machine learning inference (e.g., natural language generation based on a generative machine learning model, such as an LLM). The generative model engine 720 can include software components (e.g., one or more LLMs, and/or API calls to devices associated with such LLMs), hardware components, and/or a combination thereof. To illustrate, the generative model engine 720 can provide users' prompts to a requested, selected, or determined model (e.g., LLM) to generate a resulting output (e.g., to a user's query within the prompt). As such, the generative model engine 720 enables flexible, configurable generation of data (e.g., text, code, or other suitable information) based on user input, thereby improving the flexibility of software development or other such tasks. The generative model engine 720 can communicate with the communication engine 712, the access control engine 714, the performance engine 718, the generative model engine 720, and/or other components associated with the network 750 (e.g., the data node 704 and/or the third-party databases 708a-708n).

Engines, subsystems, or other components of the model orchestration platform 702 are illustrative. As such, operations, subcomponents, or other aspects of particular subsystems of the model orchestration platform 702 can be distributed, varied, or modified across other engines. In some implementations, particular engines can be deprecated, added, or removed. For example, operations associated with breach mitigation are performed at the performance engine 718 instead of at the breach mitigation engine 716.

Figure 8:
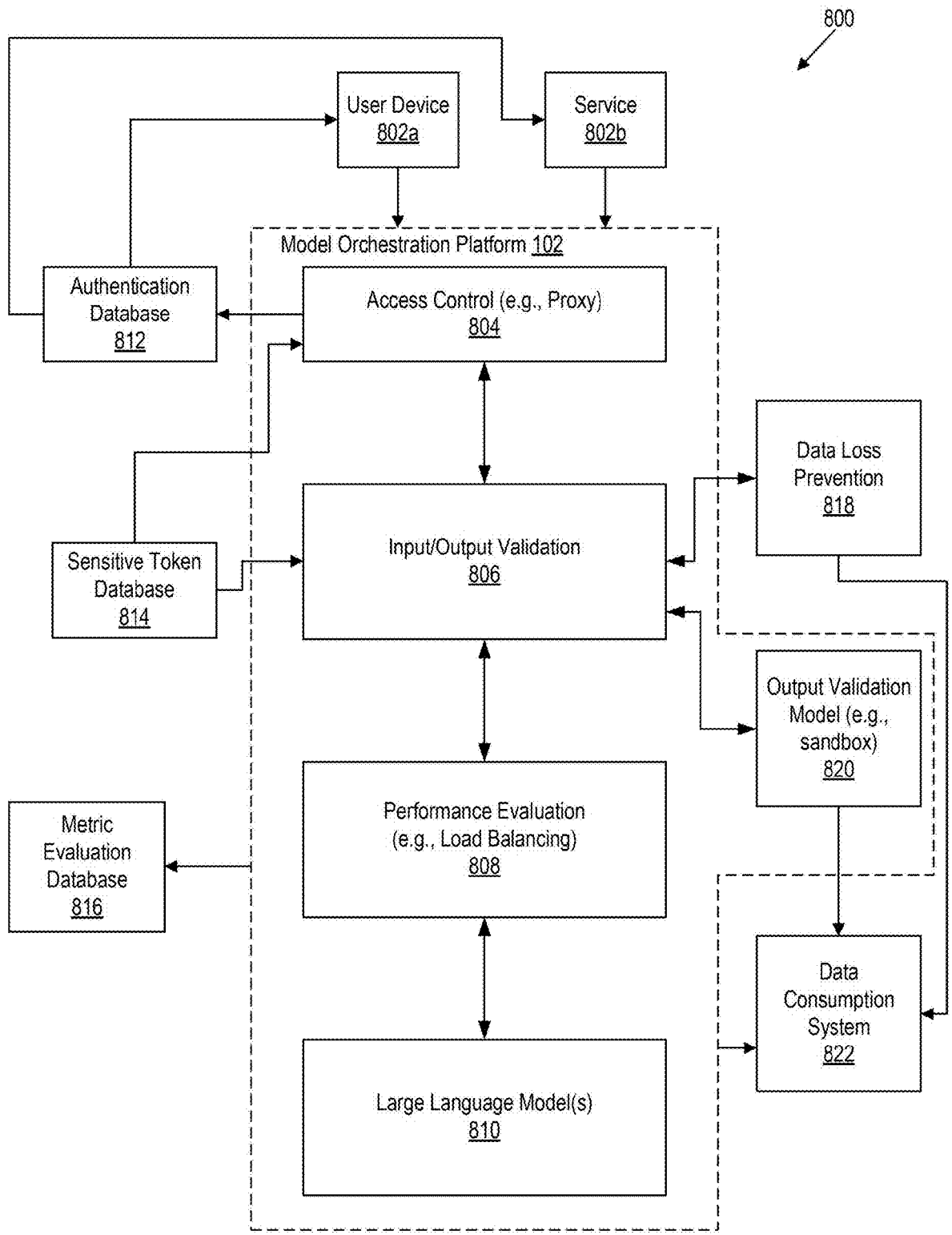
FIG. 8 is a schematic illustrating a process for validating model inputs and outputs, in accordance with some implementations of the present technology.

FIG. 8 is a schematic illustrating a process 800 for validating model (e.g., agent) inputs and outputs, in accordance with some implementations of the present technology. For example, a user device 802a or a service 802b provides an output generation request (e.g., including an input, such as a prompt, and an authentication token) to the model orchestration platform 702 (e.g., to the access control engine 714 for access control 804 via the communication engine 712 of FIG. 7). The access control engine 714 can authenticate the user device 802a or service 802b by identifying stored tokens within an authentication database 812 that match the provided authentication token. The access control engine 714 can communicate the prompt to the breach mitigation engine 716 for input/output validation 806. The breach mitigation engine 716 can communicate with a sensitive token database 814 and/or a data-loss prevention engine 818, and/or an output validation model 820 for validation of prompts and/or model outputs. Following input validation, the performance engine 718 can evaluate the performance of models to route the prompt to an appropriate model (e.g., model(s) 810). The model orchestration platform 702 can transmit the generated output to the output validation model 820 for testing and validation of the output (e.g., to prevent security breaches). The output validation model 820 can transmit the validated output to a data consumption system 822, for exposure of the output to the user device 802a and/or the service 802b. In some implementations, the model orchestration platform 702 can transmit metric values, records, or events associated with the model orchestration platform 702 to a metric evaluation database 816 (e.g., an event database) for monitoring, tracking, and evaluation of the model orchestration platform 702.

A user device (e.g., the user device 802a) and/or a module, component, or service of a development pipeline (e.g., a service 802b) can generate and transmit an output generation request to the model orchestration platform 702 (e.g., via the communication engine 712 of FIG. 7). An output generation request can include an indication of a requested output from a machine learning model. The output generation request can include an input, such as a prompt, an authentication token, and/or a user/device identifier of the requester. To illustrate, the output generation request can include a prompt (e.g., a query) requesting data, information, or data processing (e.g., from a model). The prompt can include a natural language question or command (e.g., in English). For example, the prompt includes a request for a model to generate code (e.g., within a specified programming language) that executes a particular operation. Additionally or alternatively, a prompt includes a data processing request, such as a request to extract or process information of a database (e.g., associated with one or more of the third-party databases 708a-708n). The output generation request can be transmitted to the model orchestration platform 702 using an API call to an API associated with the model orchestration platform 702 and/or through a graphical user interface (GUI).

The output generation request can include textual and/or non-textual inputs. For example, the output generation request includes audio data (e.g., a voice recording), video data, streaming data, database information, and other suitable information for processing using a machine learning model. For example, the output generation request is a video generation request that includes an image and a textual prompt indicating a request to generate a video based on the image. As such, machine learning models of the model orchestration platform disclosed herein enable inputs of various formats or combinations thereof.

Figure 9:
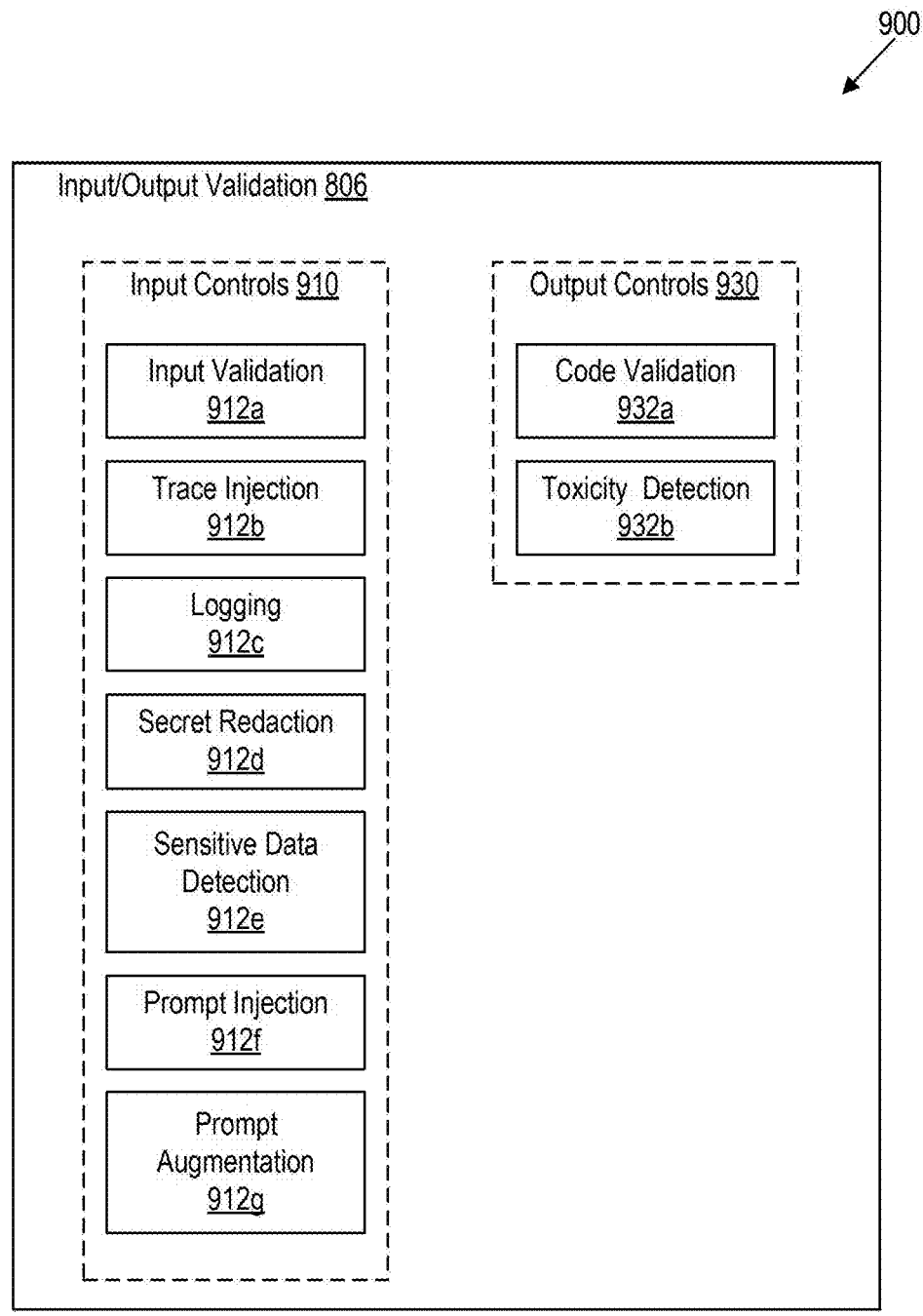
FIG. 9 shows a schematic illustrating components of input/output validation, in accordance with some implementations of the present technology.

FIG. 9 shows a schematic 900 illustrating components of input/output validation, in accordance with some implementations of the present technology. For example, input/output validation 806 (e.g., through breach mitigation engine 716) includes input controls 910 (e.g., associated with prompt validation) that include one or more prompt validation models. The input/output validation 806 can additionally or alternatively include output controls 930, as discussed below. Modules, components, or models associated with the input/output validation 806 can be updated, modified, added, removed, activated, or deactivated (e.g., according to attributes of the output generation request, a classification of the user, or other suitable factors). Thus the breach mitigation engine 716 (and the model orchestration platform 702) are flexible, modular, and configurable in an application-specific manner.

A prompt (e.g., input) validation model can include a module (e.g., a software component), model, algorithm, or process for validating, authenticating, modifying, and/or controlling inputs (e.g., to models). For example, a prompt validation model includes one or more input controls 910, as shown in FIG. 9. Additionally or alternatively, the input controls 910 can include one or more prompt validation models capable of executing operations including input validation 512a, trace injection 512b, logging 512c, secret redaction 512d, sensitive data detection 512e, prompt injection 512f, and/or prompt augmentation 512g. A prompt validation model can generate a validation indicator. The validation indicator can indicate a validation status (e.g., a binary indicator specifying whether the prompt is suitable for provision to the associated model). Additionally or alternatively, the validation indicator can indicate or specify aspects of the prompt that are validated and/or invalid, thereby enabling further modification to cure any associated deficiencies in the prompt.

Figure 10:
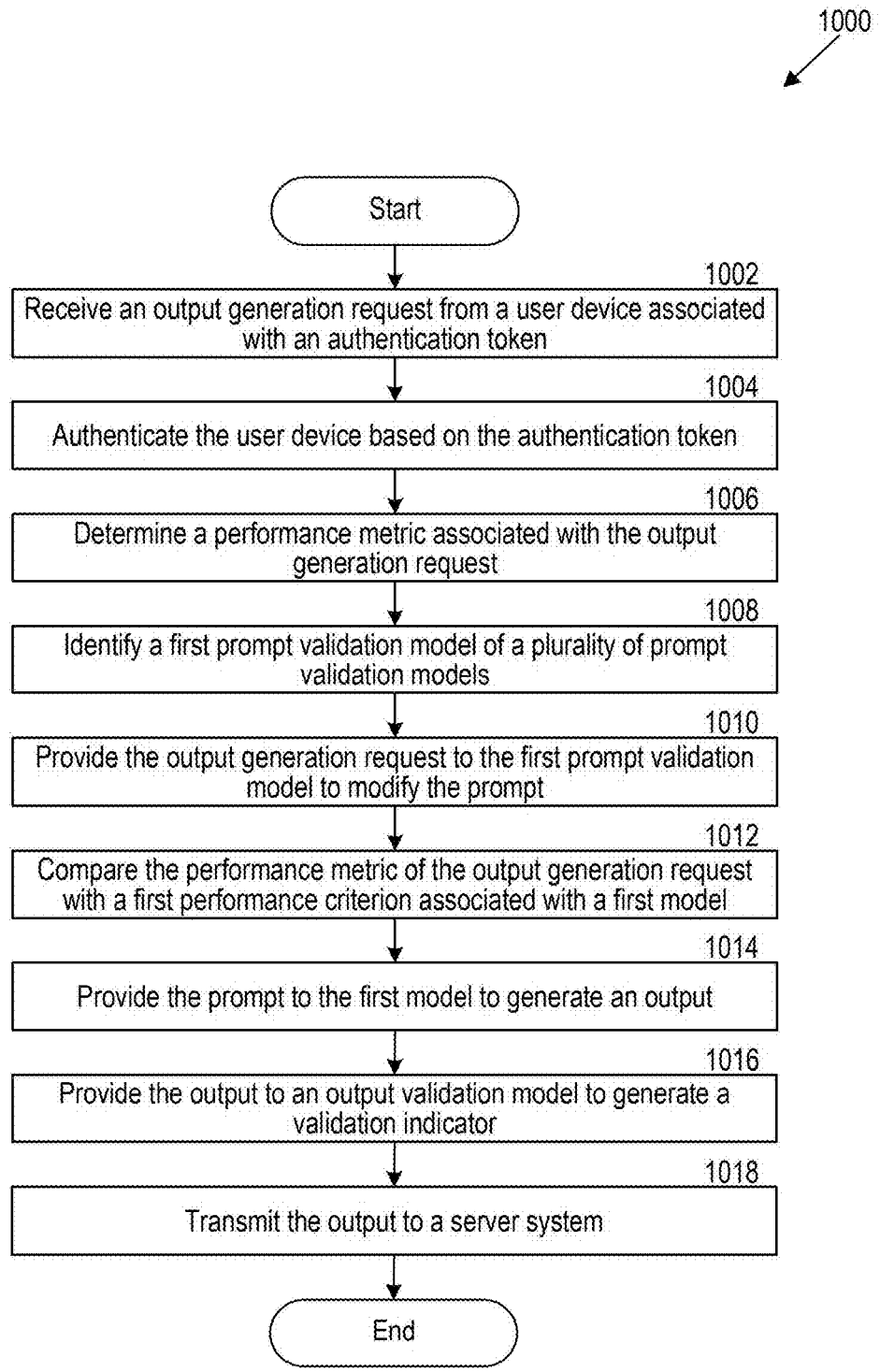
FIG. 10 shows a flow diagram illustrating a process for evaluating natural language prompts for model selection and for validating generated responses, in accordance with some implementations of the present technology.

FIG. 10 shows a flow diagram illustrating a process 1000 for the dynamic evaluation of model prompts and validation of the resulting outputs, in accordance with some implementations of the present technology. For example, the process 1000 is used to generate data and/or code for in the context of data processing or software development pipelines.

At act 1002, process 1000 can receive an output generation request from a user device (e.g., where the user device is associated with an authentication token). For example, the model orchestration platform 702 receives an output generation request from a user device, where the user device is associated with an authentication token, and where the output generation request includes a prompt for generation of a text-based output using a first model. As an illustrative example, the model orchestration platform 702 receives a request from a user, through a computing device, indicating a query to request the generation of code for a software application. The request can include a user identifier, such as a username, as well as a specification of a particular requested model architecture. By receiving such a request, the model orchestration platform 702 can evaluate the prompt and generate a resulting output in an efficient, secure manner.

In some implementations, process 1000 can generate an event record that describes the output generation request. For example, the model orchestration platform 702 generates, based on the output generation request, an event record including the performance metric value, a user identifier associated with the user device, and the prompt. The model orchestration platform 702 can transmit, to the server system, the event record for storage in an event database. As an illustrative example, the model orchestration platform 702 can generate a log of requests from users for generation of outputs (e.g., including the user identifier and associated timestamp). By doing so, the model orchestration platform 702 can track, monitor, and evaluate the use of system resources, such as models, thereby conferring improved control to system administrators to improve the effectiveness of troubleshooting and system resource orchestration.

At act 1004, process 1000 can authenticate the user. For example, the model orchestration platform 702 authenticates the user device based on the authentication token (e.g., credentials associated with the output generation request). As an illustrative example, the model orchestration platform 702 can identify the user associated with the output generation request and determine whether the user is allowed to submit a request (e.g., and/or whether the user is allowed to select an associated model). By evaluating the authentication status of the user, the model orchestration platform 702 can protect the associated software development pipeline from malicious or unauthorized use.

In some implementations, process 1000 can compare the authentication token with a token stored within an authentication database in order to authenticate the user. For example, the model orchestration platform 702 determines a user identifier associated with the user device. The model orchestration platform 702 can determine, from a token database, a stored token associated with the user identifier. The model orchestration platform 702 can compare the stored token and the authentication token associated with the output generation request. In response to determining that the stored token and the authentication token associated with the output generation request match, the model orchestration platform 702 can authenticate the user device. As an illustrative example, the model orchestration platform 702 can compare a first one-time password assigned to a user (e.g., as stored within an authentication database) with a second one-time password provided along with the authentication request. By confirming that the first and second passwords match, the model orchestration platform 702 can ensure that the user submitting the output generation request is authorized to interact to use the requested models.

At act 1006, process 1000 can determine a performance metric value associated with the output generation request. For example, the model orchestration platform 702 determines a performance metric value associated with the output generation request, where the performance metric value indicates an estimated resource requirement for the output generation request. As an illustrative example, the model orchestration platform 702 can determine an estimated memory usage associated with the output generation request (e.g., an estimated memory size needed by the associated model to generate the requested output based on the input prompt). By doing so, the model orchestration platform 702 can determine the load or burden on the system associated with the user's request, thereby enabling the model orchestration platform 702 to evaluate and suggest resource use optimization strategies to improve the efficiency of the associated development pipeline.

At act 1008, process 1000 can identify a prompt validation model, for validation of the output generation request, based on an attribute of the request. For example, the model orchestration platform 702 identifies, based on an attribute of the output generation request, a first prompt validation model of a plurality of prompt validation models (e.g., of a set of input controls). As an illustrative example, the model orchestration platform 702 can determine a technical application or type of requested output associated with the prompt. The attribute can include an indication that the prompt is requesting code (e.g., for software development purposes). Based on this attribute, the model orchestration platform 702 can determine a prompt validation model (e.g., an input control) that is suitable for the given prompt or output generation request. By doing so, the model orchestration platform 702 enables tailored, flexible, and modular controls or safety checks on prompts provided by users, thereby improving the efficiency of the system will targeting possible vulnerabilities in a prompt-specific manner.

At act 1010, process 1000 can provide the output generation request to the identified model for modification of the prompt. For example, the model orchestration platform 702 provides the output generation request to the first prompt validation model to modify the prompt. As an illustrative example, the model orchestration platform 702 can execute one or more input controls to evaluate the prompt, including trace injection, prompt injection, logging, secret redaction, sensitive data detection, prompt augmentation, or input validation. By doing so, the model orchestration platform 702 can improve the accuracy, security, and stability of prompts that are subsequently provided to models, thereby preventing unintended data leakage (e.g., of sensitive information), malicious prompt manipulation, or other adverse effects.

In some implementations, process 1000 can replace or hide sensitive data within the user's prompt. For example, the model orchestration platform 702 determines that the prompt includes a first alphanumeric token. The model orchestration platform 702 can determine that one or more records in a sensitive token database include a representation of the first alphanumeric token. The model orchestration platform 702 can modify the prompt to include a second alphanumeric token in lieu of the first alphanumeric token, where the sensitive token database does not include a record representing the second alphanumeric token. As an illustrative example, the model orchestration platform 702 can detect that the prompt includes sensitive information (e.g., PII), such as users' personal names, social security numbers, or birthdays. By masking such information, the model orchestration platform 702 can ensure that such sensitive information is not leaked to or provided to external systems (e.g., via an API request to an externally housed model), thereby mitigating security breaches associated with model use.

In some implementations, process 1000 can remove forbidden tokens from the user's prompt. For example, the model orchestration platform 702 determines that the prompt includes a forbidden token. The model orchestration platform 702 can generate the modified prompt by omitting the forbidden token. As an illustrative example, the model orchestration platform 702 can determine whether the user's prompt includes inappropriate or impermissible tokens, such as words, phrases, or sentences that are associated with swear words. The model orchestration platform 702 can mask or replace such inappropriate tokens, thereby improving the quality of inputs to the target model and preventing unintended or undesirable outputs as a result.

In some implementations, process 1000 can inject a trace token into the user's prompt to improve model evaluation and tracking capabilities. For example, the model orchestration platform 702 can generate a trace token comprising a traceable alphanumeric token. The model orchestration platform 702 can generate the modified prompt to include the trace token. As an illustrative example, the model orchestration platform 702 can inject (e.g., by modifying the prompt to include) tokens, such as characters, words, or phrases, that are designed to enable tracking, evaluation, or monitoring of the prompt any resulting outputs. By doing so, the model orchestration platform 702 enables evaluation and troubleshooting with respect to model outputs (e.g., to detect or prevent prompt manipulation or interception of the prompt or output by malicious actors).

At act 1012, process 1000 can compare the performance metric value with a performance criterion (e.g., a threshold metric value) that is related to the model associated with the output generation request. For example, the model orchestration platform 702 compares the performance metric value of the output generation request with a first performance criterion associated with the first model of a plurality of models. As an illustrative example, the model orchestration platform 702 can compare a requirement of system resources for execution of the model using the given prompt with a threshold value (e.g., as associated with the model, the user, and/or the attribute of the output generation request). For example, the model orchestration platform 702 can compare an estimated system memory usage for use of the model with an available system memory availability to determine whether the model can be used without adversely affecting the associated computing system. By doing so, the model orchestration platform 702 can prevent unintended system-wide issues regarding resource use.

In some implementations, process 1000 can generate a cost metric value and determine whether the cost metric value satisfies a threshold cost (e.g., a threshold associated with the performance criterion). For example, the model orchestration platform 702 generates a cost metric value associated with the estimated resource requirement for the output generation request. The model orchestration platform 702 can determine a threshold cost associated with the first model. The model orchestration platform 702 can determine that the cost metric value satisfies the threshold cost. As an illustrative example, the model orchestration platform 702 can determine a monetary cost associated with running the model with the requested prompt. Based on determining that the cost is greater than a threshold cost (e.g., a remaining budget within the user's allotment), the model orchestration platform 702 can determine not to provide the prompt to the model. Additionally or alternatively, the model orchestration platform 702 can determine that the cost is less than the threshold cost and, in response to this determination, proceed to provide the prompt to the model. By doing so, the model orchestration platform 702 provides improved flexibility and/or control over the use of system resources (including memory, computational, and/or financial resources), enabling optimization of the associated development pipeline.

At act 1014, process 1000 can provide the prompt (e.g., as modified by suitable prompt validation models) to the model generate the requested output. For example, in response to determining that the performance metric satisfies the first performance criterion, the model orchestration platform 702 provides the prompt to the first model to generate an output. As an illustrative example, the model orchestration platform 702 can generate a vector representation of the prompt (e.g., using a vectorization system and/or the vector database) and provide the vector representation to a transformer model and/or a neural network associated with an model (e.g., through an API call). By doing so, the model orchestration platform 702 can generate a resulting output (e.g., generated code or natural language data) in response to a query submitted by the user within the prompt.

At act 1016, process 1000 can validate the output from the model. For example, the model orchestration platform 702 provides the output to an output validation model to generate a validation indicator associated with the output. As an illustrative example, the model orchestration platform 702 can validate the output of the model to prevent security breaches or unintended behavior. For example, the model orchestration platform 702 can review output text using a toxicity detection model and determine an indication of whether the output is valid or invalid. In some implementations, the model orchestration platform 702 can determine a sentiment associated with the output and modify the output (e.g., by resubmitting the output to the model) to modify the sentiment associated with the output. By doing so, the model orchestration platform 702 can ensure the accuracy, utility, and reliability of generated data.

In some implementations, process 1000 can validate the output by generating and testing an executable program compiled on the basis of the output. For example, the model orchestration platform 702 extracts a code sample from the output, where the code sample includes code for a software routine. The model orchestration platform 702 can compile, within a virtual machine of the system, the code sample to generate an executable program associated with the software routine. The model orchestration platform 702 can execute, within the virtual machine, the software routine using the executable program. The model orchestration platform 702 can detect an anomaly in the execution of the software routine. In response to detecting the anomaly in the execution of the software routine, the model orchestration platform 702 can generate the validation indicator to include an indication of the anomaly. As an illustrative example, the model orchestration platform 702 can generate a validation indicator based on determining that the output contains code and testing the code (and/or the compiled version of the code) in an isolated environment for potential adverse effects, viruses, or bugs. By doing so, the model orchestration platform 702 can ensure the safety and security of generated code, thereby protecting the software development pipeline from security breaches or unintended behavior.

At act 1018, process 1000 can enable access to the output by the user. For example, in response to generating the validation indicator, the model orchestration platform 702 transmits the output to a server system enabling access to the output by the user device. As an illustrative example, the model orchestration platform 702 can provide the output to a server that enables users to access the output data (e.g., through login credentials) for consumption of the data and/or use in other downstream applications. As such, the model orchestration platform 702 provides a robust, flexible, and modular way to validate model-generated content.

Figure 11:
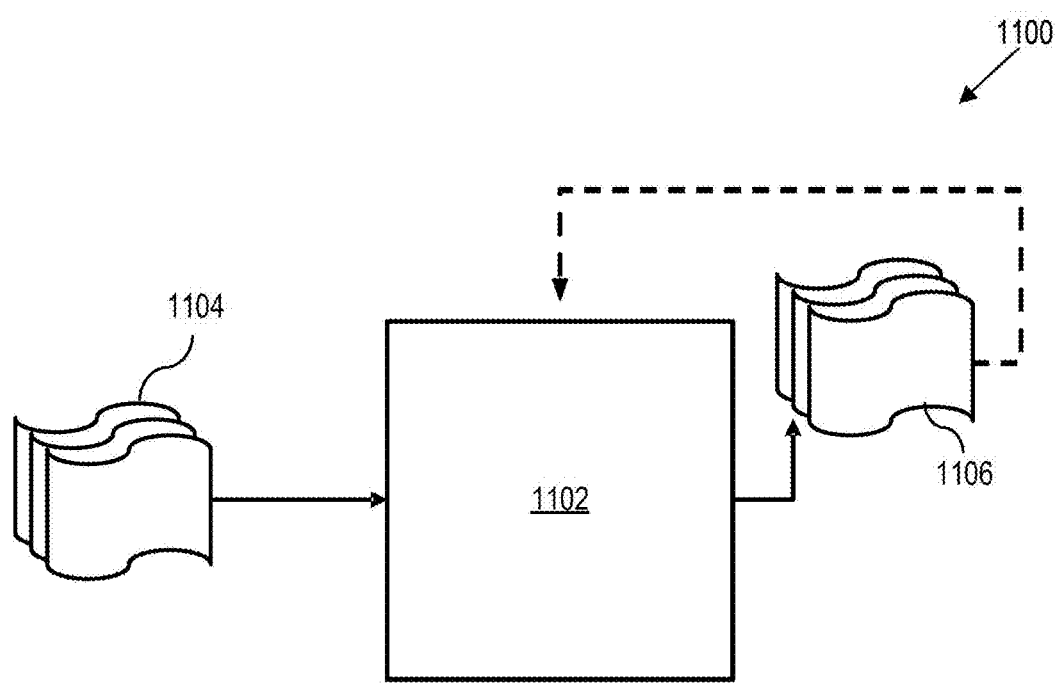
FIG. 11 shows a diagram of an artificial intelligence (AI) model, in accordance with some implementations of the present technology.

FIG. 11 shows a diagram of an AI model, in accordance with some implementations of the present technology. AI model 1100 is shown. In some implementations, AI model 1100 can be any AI model. In some implementations, AI model 1100 can be part of, or work in conjunction with, server computing device 306 (FIG. 3). For example, server computing device 306 can store a computer program that can use information obtained from AI model 1100, provide information to AI model 1100, or communicate with AI model 1100. In other implementations, AI model 1100 can be stored in database 308 and can be retrieved by server computing device 306 to execute/process information related to AI model 1100, in accordance with some implementations of the present technology.

In some implementations, AI model 1100 can be a machine learning model 1102. Machine learning model 1102 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 11, machine learning model 1102 can take inputs 1104 and provide outputs 1106. In one use case, outputs 1106 can be fed back to machine learning model 1102 as input to train machine learning model 1102 (e.g., alone or in conjunction with user indications of the accuracy of outputs 1106, labels associated with the inputs, or other reference feedback information). In another use case, machine learning model 1102 can update its configurations (e.g., weights, biases, or other parameters) based on its assessment of its prediction (e.g., outputs 1106) and reference feedback information (e.g., user indication of accuracy, reference labels, or other information). In another use case, where machine learning model 1102 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 1102 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

Dynamic Agent Selection for the Model Orchestration Platform

The model orchestration platform disclosed herein enables dynamic model (e.g., LLM, agent) selection for processing inputs (e.g., prompts) to generate associated outputs (e.g., responses to the prompts). For example, the model orchestration platform can redirect a prompt to a second model (e.g., distinct from the first model selected by the user within the output generation request). Additionally or alternatively, the model orchestration platform operates with other suitable machine learning model algorithms, inputs (e.g., including images, multimedia, or other suitable data), and outputs (e.g., including images, video, or audio). By doing so, the model orchestration platform 702 can mitigate adverse system performance (e.g., excessive incurred costs or overloaded memory devices or processors)

by estimating system effects associated with the output generation request (e.g., the prompt) and generating an output using an appropriate model.

FIG. 12 shows a schematic of a data structure 1200 illustrating a system state and associated threshold metric values, in accordance with some implementations of the present technology. For example, the data structure 1200 includes usage values 1204 and maximum values 1206 for performance metrics 1202. The model orchestration platform 702 can determine threshold metric values based on data associated with system performance (e.g., at the time of receipt of the output generation request). By doing so, the model orchestration platform 702 enables dynamic evaluation of requests for output generation, as well as dynamic selection of suitable models with which to process such requests.

As discussed in relation to FIG. 8 above, a performance metric can include an attribute of a computing system that characterizes system performance. For example, the performance metric is associated with monetary cost, system memory, system storage, processing power (e.g., through a CPU or a GPU), and/or other suitable indications of performance. The system state (e.g., a data structure associated with the system state) can include information relating to performance metrics 1202, such as CPU usage, memory usage, hard disk space usage, a number of input tokens (e.g., system-wide, across one or more models associated with the model orchestration platform 702), and/or cost incurred. The data structure 1200 corresponding to the system state can include usage values 1204 and maximum values 1206 associated with the respective performance metrics 1202.

In some implementations, the model orchestration platform 702 determines a threshold metric value (e.g., of the threshold metric values 1208 of FIG. 12) based on a usage value and maximum value for a corresponding performance metric (e.g., of performance metrics 1202). For example, the model orchestration platform 702 determines a cost incurred up to a given point of time or within a predetermined time period associated with machine learning models of the model orchestration platform 702. The cost incurred can be stored as a usage value within the system state. For example, the usage value includes an indication of a sum of metric values for previous output generation requests, inputs (e.g., textual or non-textual prompts), or output generation instances associated with the system. The system state can include an indication of an associated maximum, minimum, or otherwise limiting value for the cost incurred or other performance metrics (e.g., an associated maximum value). By storing such information, the model orchestration platform 702 can determine a threshold metric value associated with generating an output using the selected model based on the prompt.

For example, the model orchestration platform 702 determines the threshold metric value based on a difference between the usage value and the maximum value. The model orchestration platform 702 can determine a threshold metric value associated with a cost allowance for processing a prompt based on a difference between a maximum value (e.g., a maximum budget) and a usage value (e.g., a cost incurred). As such, the model orchestration platform 702 can handle situations where the system's performance metric changes over time.

In some implementations, the model orchestration platform 702 can determine or predict a threshold metric value based on providing the output generation request and the system state to a threshold evaluation model. For example, the model orchestration platform 702 can provide the input, the indication of a selected model, and information of the system state to the threshold evaluation model to predict a threshold metric value. To illustrate, the model orchestration platform 702 can predict a future system state (e.g., a time-series of performance metric values associated with the system) based on the output generation request, the current system state, and the selected model. The model orchestration platform 702 can estimate an elapsed time for the generation of output using the requested model; based on this elapsed time, the model orchestration platform 702 can determine a predicted system state throughout the output generation, thereby enabling more accurate estimation of the threshold metric value. The threshold evaluation model can be trained on historical system usage (e.g., performance metric value) information associated with previous output generation requests. As such, the model orchestration platform 702 enables the determination of threshold metric values on a dynamic, pre-emptive basis, thereby improving the ability of the model orchestration platform 702 to predict and handle future performance issues.

In some implementations, the system state is generated with respect to a particular user and/or group of users. For example, the model orchestration platform 702 determines a system state associated with a subset of resources assigned to a given user or group of users. To illustrate, the model orchestration platform 702 can determine a maximum cost value associated with output generation for a given user or subset of users of the model orchestration platform 702. For example, the maximum cost value corresponds to a budget (e.g., a finite set of monetary resources) assigned to a particular group of users, as identified by associated user identifiers. Furthermore, the usage value can be associated with this particular group of users (e.g., corresponding to the generation of outputs using models by users of the group). As such, the model orchestration platform 702 can determine an associated threshold metric value that is specific to the particular associated users. By doing so, model orchestration platform 702 enables flexible, configurable requirements and limits to system resource usage based on the identity of users submitting prompts.

In some implementations, the model orchestration platform 702 determines an estimated performance metric value, as discussed in relation to FIG. 8. For example, the model orchestration platform 702 generates the estimated performance metric value based on a performance metric evaluation model. A performance metric evaluation model can include an artificial intelligence model (e.g., or another suitable machine learning model) that is configured to predict performance metric values associated with generating outputs using machine learning models (e.g., agents, LLMs). For example, the performance metric evaluation model can generate an estimated cost value for processing a prompt using the first model to generate the associated output. In some implementations, the performance metric evaluation model is trained using previous prompts and associated performance metric values. The performance metric evaluation model can be specific to a particular machine learning model or LLM. Additionally or alternatively, the performance metric evaluation model accepts an indication of a machine learning model as an input to generate the estimated performance metric value.

In some implementations, the model orchestration platform 702 evaluates the suitability of a prompt for a given model based on comparing a composite metric value with a threshold composite value. For example, the model orchestration platform 702 generates a composite performance metric value based on a combination of performance metrics (e.g., the performance metrics 1202 as shown in FIG. 12). To illustrate, the model orchestration platform 702 can generate a composite performance metric based on multiple performance metrics of the computing system associated with the machine learning models. Based on the metric, the model orchestration platform 702 can generate an estimated composite metric value corresponding to the composite metric (e.g., by calculating a product of values associated with the respective performance metrics) and compare the estimated composite metric value with an associated threshold metric value. As such, model orchestration platform 702 enables a more holistic evaluation of the effect of a given output generation request on system resources, thereby improving the accuracy and efficiency of the model orchestration platform 702 in selecting a suitable model. In some implementations, the model orchestration platform 702 can assign particular performance metrics a respective weight and calculate a value for the composite metric accordingly. Accordingly, the model orchestration platform 702 enables the prioritization of relevant performance metrics (e.g., cost) over other metrics (e.g., memory usage) according to system requirements.

Figure 13:
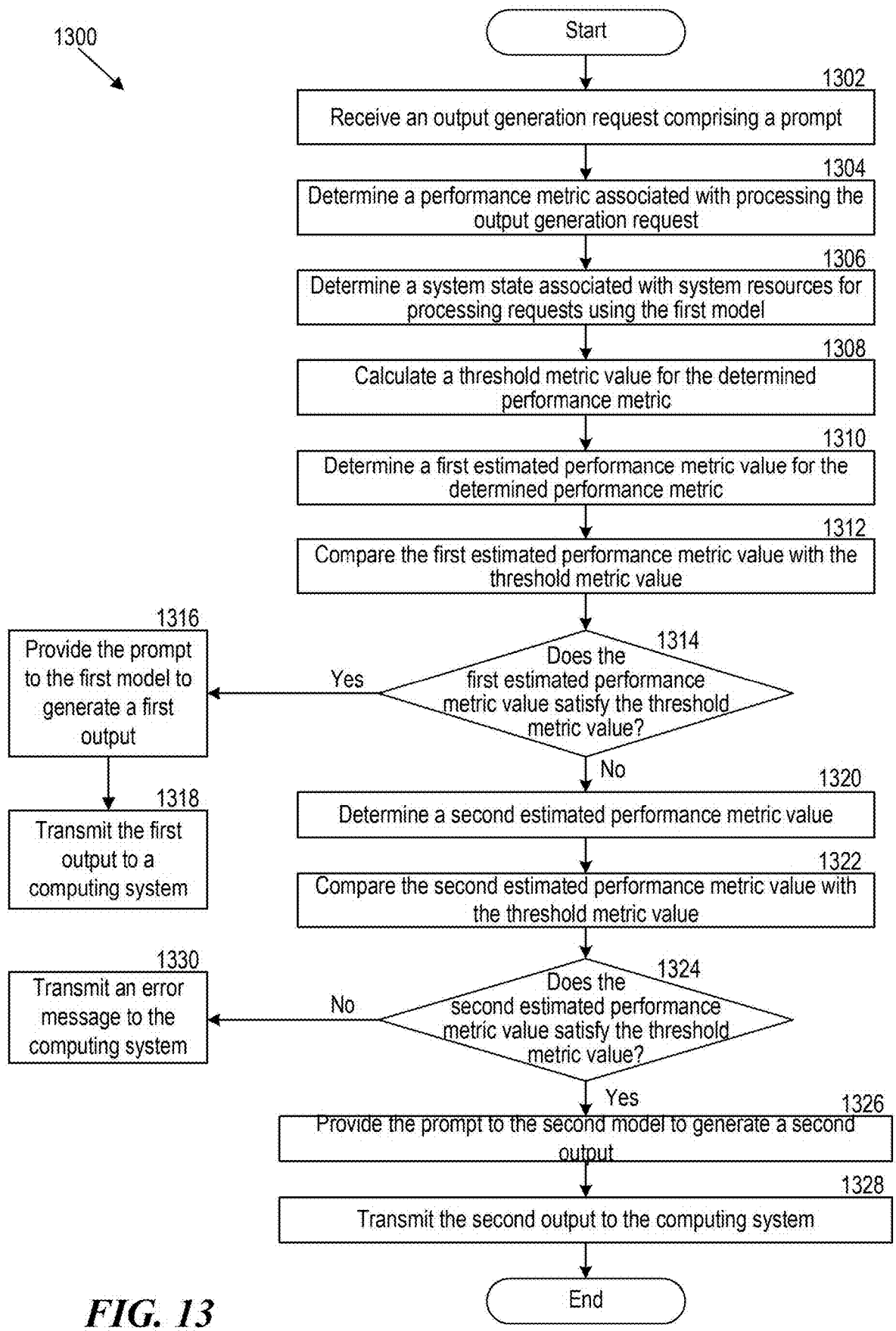
FIG. 13 shows a flow diagram illustrating a process for dynamic selection of models based on evaluation of user prompts, in accordance with some implementations of the present technology.

FIG. 13 shows a flow diagram illustrating a process 1300 for dynamic selection of models based on evaluation of user inputs (e.g., prompts), in accordance with some implementations of the present technology. For example, the process 1300 enables selection of an model for generation of an output (e.g., software-related code samples) based on an input (e.g., a text-based prompt) to prevent overuse of system resources (e.g., to ensure that sufficient system resources are available to process the request).

At act 1302, the process 1300 can receive an input for generation of an output using a model. For example, the process 1300 receives, from a user device, an output generation request comprising an input (e.g., prompt) for generation of an output using a first model (e.g., an agent) of a plurality of models. As an illustrative example, the model orchestration platform 702 (e.g., through the communication engine 712) receives a prompt indicating a desired output, such as a text-based instruction for the generation of software-related code samples (e.g., associated with a particular function). The output generation request can include an indication of a selected model (e.g., agent) for processing the prompt. As such, the model orchestration platform 702 can evaluate the effect of generating an output using the selected model based on the prompt (e.g., or other suitable inputs) on the basis of the content or nature of the request (e.g., based on a user identifier associated with the request).

At act 1304, the process 1300 can determine a performance metric associated with processing the output generation request. For example, the process 1300 determines a performance metric associated with processing the output generation request. As an illustrative example, the model orchestration platform 702 can determine one or more performance metrics that characterize the behavior of the system (e.g., when providing inputs to a model for generation of an output). Such performance metrics can include CPU utilization, cost (e.g., associated with the operation of the system and/or the associated models), memory usage, storage space, and/or number of input or output tokens associated with MODELs. In some implementations, the model orchestration platform 702 (e.g., through the performance engine 718) determines multiple performance metrics (e.g., associated with the system state) for evaluation of the effects (e.g., of generating an output based on the prompt) on the system.

At act 1306, the process 1300 can determine a system state associated with system resources. For example, the process 1300 determines a system state associated with system resources for processing requests using the first model of the plurality of models. As an illustrative example, the performance engine 718 dynamically determines a state of the system (e.g., with respect to the determined performance metrics). The system state can include an indication of values associated with performance metrics (e.g., usage values, such as CPU utilization metric values, memory usage values, hard disk space usage values, numbers of input tokens previously submitted to models within the system, and/or values of incurred cost). For example, the model orchestration platform 702, through communication engine 712 can query a diagnostic tool or program associated with the computing system and/or an associated database to determine values of the performance metrics. In some implementations, the system state includes maximum, minimum, or other limiting values associated with the performance metric values (e.g., a maximum cost/budget, or a maximum available memory value). By receiving information relating to the system state and associated restrictions, the model orchestration platform 702 can evaluate the received prompt to determine whether the selected model is suitable for generating an associated output.

At act 1308, the process 1300 can calculate a threshold metric value (e.g., associated with the output generation request). For example, the process 1300 can calculate, based on the system state, a threshold metric value for the determined performance metric. As an illustrative example, the model orchestration platform 702 (e.g., through the performance engine 718) determines an indication of computational or monetary resources available for processing the input or prompt (e.g., to generate an associated output). The model orchestration platform 702 can determine an available budget (e.g., a threshold cost metric) and/or available memory space (e.g., remaining space within a memory device of the system) for processing the request. By doing so, the model orchestration platform 702 can evaluate the effect of generating an output based on the prompt using the specified model (e.g., agent) with respect to system requirements or constraints.

In some implementations, the model orchestration platform 702 (e.g., through performance engine 718) can determine the threshold metric value to include the allowance value. For example, the performance engine 718 determines that the performance metric corresponds to a cost metric. The performance engine 718 can determine a maximum cost value associated with output generation associated with the system. The performance engine 718 can determine, based on the system state, a sum of cost metric values for previous output generation requests associated with the system. The performance engine 718 can determine, based on the maximum cost value and the sum, an allowance value corresponding to the threshold metric value. The performance engine 718 can determine the threshold metric value comprising the allowance value. As an illustrative example, the performance engine 718 determines a remaining budget associated with model operations. By doing so, the performance engine 718 can mitigate cost overruns associated with output text generation, thereby improving the efficiency of the model orchestration platform 702.

In some implementations, the model orchestration platform 702 (e.g., through the performance engine 718) can determine the threshold metric value based on a user identifier and corresponding group associated with the output generation request. For example, the model orchestration platform 702 determines, based on the output generation request, a user identifier associated with a user of the user device. The performance engine 718 can determine, using the user identifier, a first group of users, wherein the first group comprises the use. The performance engine 718 can determine the allowance value associated with the first group of users. As an illustrative example, the performance engine 718 determines an allowance value (e.g., a budget) that is specific to a group of users associated with the user identifier (e.g., a username) of the output generation request. As such, the model orchestration platform 702 enables tracking of resources assigned or allocated to particular groups of users (e.g., teams), thereby improving the flexibility of allocation of system resources.

In some implementations, the model orchestration platform 702 (e.g., through the performance engine 718) can determine the threshold metric value based on a usage value for a computational resource. For example, the model orchestration platform 702 determines that the performance metric corresponds to a usage metric for a computational resource. The performance engine 718 can determine an estimated usage value for the computational resource based on the indication of an estimated computational resource usage by the first model (e.g., agent) when processing the input (e.g., prompt) with the first model. The performance engine 718 can determine a maximum usage value for the computational resource. The performance engine 718 can determine, based on the system state, a current resource usage value for the computational resource. The performance engine 718 can determine, based on the maximum usage value and the current resource usage value, an allowance value corresponding to the threshold metric value. The performance engine 718 can determine the threshold metric value comprising the allowance value. As an illustrative example, the performance engine 718 can determine a threshold metric value based on a remaining available set of resources that are idle (e.g., processors that are not being used or free memory). As such, the model orchestration platform 702 enables dynamic evaluation of the state of the system for determination of whether sufficient resources are available for processing the output.

At act 1310, the process 1300 can determine an estimated performance metric value associated with processing the output generation request. For example, the process 1300 determines a first estimated performance metric value for the determined performance metric based on an indication of an estimated resource usage by the first model when processing the input included in the output generation request. As an illustrative example, the model orchestration platform 702 determines a prediction for resource usage for generating an output using the indicated model (e.g., an agent associated with the determined performance metric). The model orchestration platform 702 (e.g., through the performance engine 718) can determine a number of input tokens within the input or prompt and predict a cost and/or a memory usage associated with processing the prompt using the selected model. By doing so, the model orchestration platform 702 can evaluate the effects of processing the input on system resources for evaluation of the suitability of the model for generating the requested output.

In some implementations, the model orchestration platform 702 generates a composite performance metric value based on more than one performance metric. For example, the performance engine 718 determines that the performance metric includes a composite metric associated with a plurality of system metrics. The performance engine 718 can determine, based on the system state, a threshold composite metric value. The performance engine 718 can determine a plurality of estimated metric values corresponding to the plurality of system metrics. Each estimated metric value of the plurality of estimated metric values can indicate a respective estimated resource usage associated with processing the output generation request with the first model. The performance engine 718 can determine, using the plurality of estimated metric values, a composite metric value associated with processing the output generation request with the first model. The performance engine 718 can determine the first estimated performance metric value comprising the composite metric value. As an illustrative example, the model orchestration platform 702 can generate a geometric mean of estimated values associated with various performance metrics (e.g., estimated memory usage, CPU utilization, and/or cost) and determine an associated metric. In some implementations, the model orchestration platform 702 can generate a weighted geometric mean based on weightings assigned to respective values of the performance metric. By doing so, the model orchestration platform 702 enables flexible, targeted evaluation of system behavior associated with generating outputs using models.

In some implementations, the model orchestration platform 702 generates a performance metric value corresponding to a number of input or output tokens. For example, the first estimated performance metric value corresponds to a number of input or output tokens, and wherein the threshold metric value corresponds to a maximum number of tokens. As an illustrative example, the model orchestration platform 702 determines a number of input tokens (e.g., words or characters) associated with the input or prompt. Additionally or alternatively, the model orchestration platform 702 determines (e.g., predicts or estimates) a number of output tokens associated with the output in response to the prompt. For example, the model orchestration platform 702 can estimate a number of output tokens by identifying instructions or words associated with prompt length within the prompt (e.g., an instruction to keep the generated output within a particular limit). By doing so, the model orchestration platform 702 can compare the number of tokens associated with processing the prompt with an associated threshold number of tokens to determine whether the selected model is suitable for the generation task. As such, the model orchestration platform 702 can limit wordy or excessive output generation requests, thereby conserving system resources.

In some implementations, the model orchestration platform 702 generates the estimated performance metric value based on providing the prompt to an evaluation model. For example, the model orchestration platform 702 provides the input (e.g., the prompt) and an indication of the first model (e.g., agent) to a performance metric evaluation model to generate the first estimated performance metric value. To illustrate, the model orchestration platform 702 can provide the input to a machine learning model (e.g., an artificial neural network) to generate an estimate of resources used (e.g., an estimated memory usage or cost) based on historical data associated with output generation. By doing so, the model orchestration platform 702 improves the accuracy of estimated performance metric value determination, thereby mitigating overuse of system resources.

In some implementations, the model orchestration platform 702 trains the evaluation model based on previous inputs (e.g., prompts) and associated performance metric values. For example, the model orchestration platform 702 obtains, from a first database, a plurality of training prompts and respective performance metric values associated with providing respective training prompts to the first model. The model orchestration platform 702 can provide the plurality of training prompts and respective performance metric values to the performance metric evaluation model to train the performance metric evaluation model to generate estimated performance metric values based on prompts. For example, the model orchestration platform 702 can retrieve previous prompts submitted by users, as well as previous system states when the prompts are submitted to the associated model (e.g., agent). Based on these previous prompts and system states, the model orchestration platform 702 can train the performance metric evaluation model to generate estimated performance metrics based on inputs.

At act 1312, the process 1300 can compare the first estimated performance metric value with the threshold metric value. As an illustrative example, the model orchestration platform 702 can determine whether the first estimated performance metric value is greater than, equal to, and/or less than the threshold metric value. At act 1314, the process 1300 can determine whether the first estimated performance metric value satisfies the threshold metric value. (e.g., by determining that the estimated resource usage value is less than or equal to a threshold metric value). For example, the model orchestration platform 702 can determine whether an estimated cost value associated with processing the prompt using the first model is less than or equal to an allowance value (e.g., a remaining balance within a budget). By doing so, the model orchestration platform 702 can ensure that the prompt is processed when suitable system resources are available.

At act 1316, the process 1300 can provide the input (e.g., prompt) to the first model in response to determining that the first estimated performance metric value satisfies the threshold metric value. For example, in response to determining that the first estimated performance metric value satisfies the threshold metric value, the process 1300 provides the prompt to the first model to generate a first output by processing the input (e.g., prompt) included in the output generation request. As an illustrative example, the model orchestration platform 702 can transmit the prompt (e.g., through the communication engine 712 and/or via an associated API) to the first model for generation of an associated output. To illustrate, the model orchestration platform 702 can generate a vector representation of the prompt (e.g., through word2vec or another suitable algorithm) and generate a vector representation of the output via the first model. By doing so, the model orchestration platform 702 can process the user's output generation request with available system resources (e.g., monetary resources or computational resources).

At act 1318, the process 1300 can generate the output for display on a device associated with the user. For example, the process 1300 transmits the first output to a computing system enabling access to the first output by the user device. As an illustrative example, the model orchestration platform 702 (e.g., through the communication engine 712) can transmit the output from the first model to a computing system (e.g., a server) from which the user can access the generated output (e.g., through an API call and/or via a user interface). By doing so, the model orchestration platform 702 enables generation of outputs (e.g., natural language outputs) using models specified by the user when system resources are available to process associated prompts.

At act 1320, the process 1300 can determine a second estimated performance metric value associated with a second model (e.g., agent) in response to determining that the first estimated performance metric value does not satisfy the threshold metric value. For example, in response to determining that the first estimated performance metric value does not satisfy the threshold metric value, the process 1300 determines a second estimated performance metric value for the determined performance metric based on an indication of an estimated resource usage by a second model of the plurality of models when processing the prompt included in the output generation request. As an illustrative example, the model orchestration platform 702 can determine a second estimate for a cost associated with processing the output with the second model and determine whether this cost estimate is consistent with the threshold cost value (e.g., determine whether the cost is less than the budget available to the user for the output generation request).

At act 1322, the process 1300 can compare the second estimated performance metric value with the threshold metric value. For example, at act 1324, the process 1300 can determine whether the second estimated performance metric value satisfies the threshold metric value. As an illustrative example, the model orchestration platform 702 can determine whether the cost metric value associated with processing the input (e.g., prompt) with the second model is greater than, less than, and/or equal to the threshold metric value (e.g., associated with an allowance or budget). By doing so, the model orchestration platform 702 can ensure that sufficient system resources are available for processing the prompt using the second model, thereby enabling redirection of output generation requests to an appropriate model when the selected model is unsuitable due to insufficient resource availability.

At act 1326, the process 1300 can generate a second output by providing the prompt to the second model in response to determining that the second estimated performance metric value satisfies the threshold metric value. For example, the process 1300 provides the prompt to the second model to generate a second output by processing the input (e.g., prompt) included in the output generation request. As an illustrative example, the model orchestration platform 702 (e.g., through the communication engine 712) can generate vector representations of the prompt and transmit these (e.g., via an API call) to a device associated with the second model for generation of the associated output. By doing so, the model orchestration platform 702 enables processing of the output generation request using a model (e.g., the second agent) that satisfies system resource limitations or constraints, thereby improving the resilience and efficiency of the model orchestration platform 702.

In some implementations, the process 1300 can determine the second model based on a selection of the model by the user. For example, in response to determining that the first estimated performance metric value does not satisfy the threshold metric value, the model orchestration platform 702 transmits a model (e.g., agent) selection request to the user device. In response to transmitting the model selection request, the model orchestration platform 702 obtains, from the user device, a selection of the second model. The model orchestration platform 702 can provide the input (e.g., prompt) to the second model associated with the selection. As an illustrative example, the model orchestration platform 702 can generate a message for the user requesting selection of another model for generation of an output in response to the prompt. In response to the message, the model orchestration platform 702 can receive instructions from the user (e.g., via a command or function) for redirection of the prompt to another suitable model that satisfies performance requirements for the system.

In some implementations, the process 1300 can determine the second model based on a selection of the model on a GUI (e.g., from a list of models with performance metrics that satisfy the performance requirements). For example, the model orchestration platform 702, in response to determining that the first estimated performance metric value does not satisfy the threshold metric value, generates, for display on a user interface of the user device, a request for user instructions, wherein the request for user instructions comprises a recommendation for processing the output generation request with the second model of the plurality of models. In response to generating the request for user instructions, the model orchestration platform 702 can receive a user instruction comprising an indication of the second model. In response to receiving the user instruction, the model orchestration platform 702 can provide the prompt to the second model. To illustrate, the model orchestration platform 702 can generate indications of one or more recommended models with estimated performance metric values (e.g., estimated cost values) that are compatible with the associated threshold performance metric (e.g., a threshold cost metric). By doing so, the model orchestration platform 702 can present options for models (e.g., that satisfy system performance constraints) for processing the user's prompt, conferring the user with increased control over output generation.

At act 1328, the process 1300 can generate the output for display on a device associated with the user. For example, the process 1300 transmits the second output to the computing system enabling access to the second output by the user device. As an illustrative example, the model orchestration platform 702 (e.g., through communication engine 712) transmits the second output to a computing system that enables access to the output by the user (e.g., through an associated API or GUI).

At act 1330, the process 1300 can transmit an error message to the computing system in response to determining that the second estimated performance metric value does not satisfy the threshold metric value. As an illustrative example, the model orchestration platform 702 (e.g., through the communication engine 712) can generate a message that indicates that the input (e.g., prompt) is unsuitable for provision the second model due to insufficient resources. Additionally or alternatively, the model orchestration platform 702 can determine a third model (e.g., agent) with satisfactory performance characteristics (e.g., with a third estimated performance metric value that satisfies the threshold metric value). By doing so, the model orchestration platform 702 enables generation of an output based on the prompt via a model such that system resources are conserved or controlled.

In some implementations, the process 1300 generates a recommendation for a model by providing the output generation request (e.g., the associated prompt) to a selection model. For example, in response to determining that the first estimated performance metric value does not satisfy the threshold metric value, the model orchestration platform 702 generates, for display on a user interface of the user device, a request for user instructions. The request for user instructions can include a recommendation for processing the output generation request with the second model of the plurality of models. In response to generating the request for user instructions, the model orchestration platform 702 can receive a user instruction comprising an indication of the second model. In response to receiving the user instruction, the model orchestration platform 702 can provide the input (e.g., prompt) to the second model. As an illustrative example, the model orchestration platform 702 can evaluate the prompt for selection of a model that is compatible with resource requirements and/or a task associated with the output generation request. For example, the model orchestration platform 702 can determine an attribute associated with the prompt (e.g., that the prompt is requesting the generation of a code sample) and reroute the prompt to a model that is configured to generate software-related outputs. By doing so, the model orchestration platform 702 can recommend models that are well-suited to the user's requested task, thereby improving the utility of the disclosed model orchestration platform.

Dynamic Output Validation Using the Model Orchestration Platform

Figure 14:
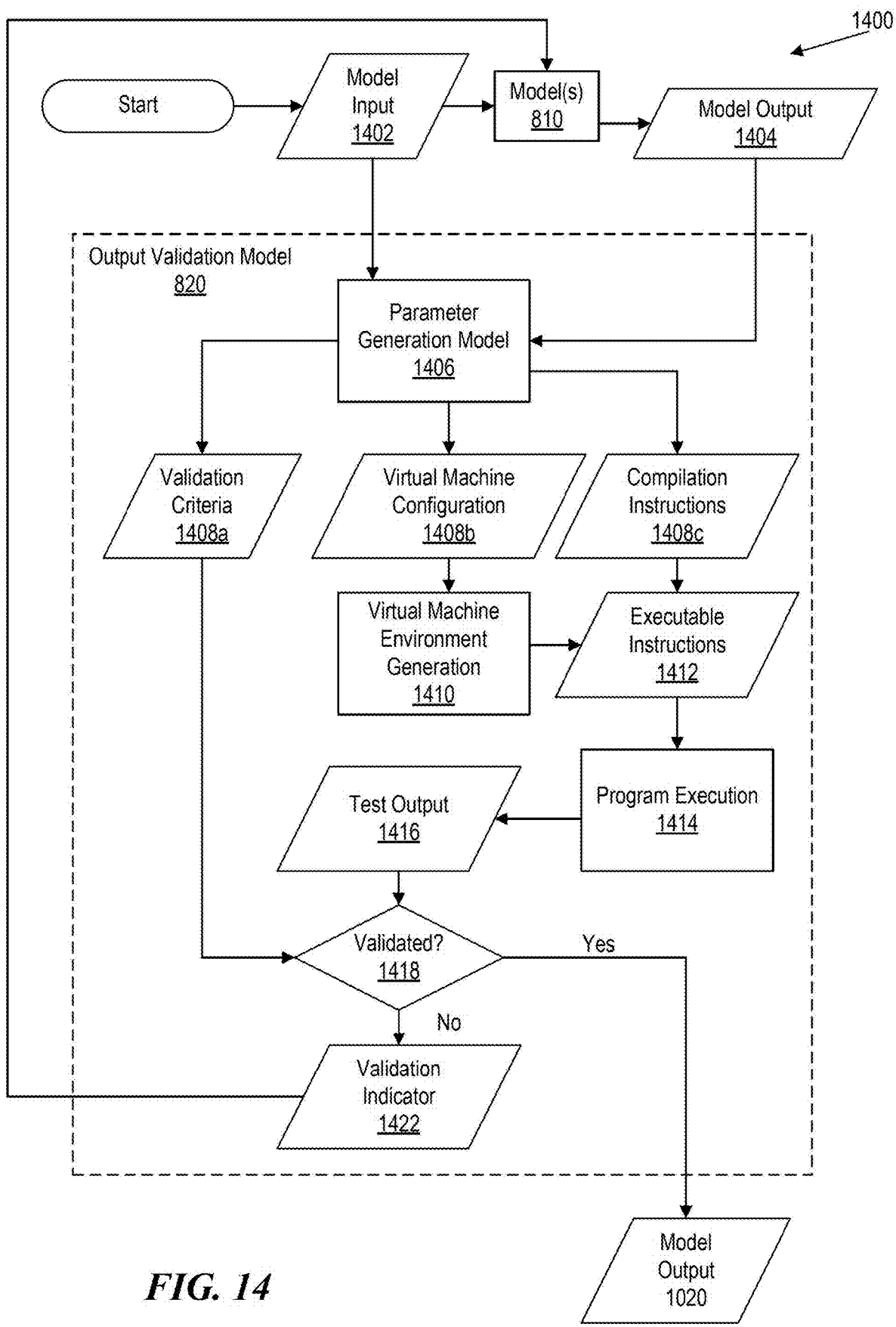
FIG. 14 shows a schematic illustrating a process for validating model outputs in an isolated environment, in accordance with some implementations of the present technology.

FIG. 14 shows a schematic illustrating a process 1400 for validating model outputs in an isolated environment, in accordance with some implementations of the present technology. The process 1400 enables the model orchestration platform 702 to evaluate and/or validate outputs from one or more machine learning models associated with the platform. For example, the model orchestration platform 702 can evaluate the safety, accuracy, and/or effects of code samples generated by a model in response to a user's prompt.

For example, the model orchestration platform 702 can receive (e.g., through the communication engine 712) an input (e.g., a prompt for a model, such as the model input 1402) for generation of software-related information by an associated machine learning model. For example, the input includes a prompt for generation of a code sample using the model(s) 810 of FIG. 8. In some implementations, the input includes suitable data, including an image, video, text string, or audio recording (e.g., a voice recording). By providing the prompt (or other suitable input) to a model (e.g., one or more of model(s) 810, or another suitable machine learning model), the generative model engine 720 can generate an associated output, such as model output 1404 shown in FIG. 14, in response to the user's output generation request.

The output from a machine learning model can include a code sample. In some implementations, a code sample includes software-related information, such as character strings indicating code snippets in one or more specified programming languages. The code sample can be embedded within the model output including other text (e.g., comments, explanations, or other such information). For example, a user associated with the output generation request can request generation of code samples for use in a particular application and/or for deployment on a specified system. To illustrate, the code sample generated by a model of the model orchestration platform 702 can include a portion of code in a particular language that adds a functionality to an existing application (e.g., for modification of the existing application's source code to include the generated code). The code sample can include one or more function definitions, variable definitions, algorithms, processes, or other suitable information. Additionally or alternatively, the code sample includes binary/executable files and/or other software-related information or data. By generating code sample, the model orchestration platform 702 enables improvements to software development efficiency by reducing the need for manual writing of code. For example, the model orchestration platform 702 generates application code, system-level code, pseudocode, coding instructions, and/or guidance for a model (e.g., an agent) to generate, enhance, or modify existing code.

The output validation model 820, as shown in FIG. 8, can validate the output generated by one or more machine learning models (e.g., the model output 1404). For example, the output validation model 820 receives the model output 1404 and the associated input (e.g., the model input 1402) and provides such data to a parameter generation model 1406 for generation of parameters associated with output validation. Such parameters can include validation criteria 1208a, a virtual machine configuration 1208b, and/or compilation instructions 1208c.

A parameter generation model can include a model configured to generate parameters (e.g., for a validation test). The parameter generation model 1406 can include a machine learning model (e.g., as described previously) configured to receive an input (e.g., the model input 1402 and/or other information associated with the output generation request, such as a user identifier), and/or a model output (e.g., the model output 1404 and/or other information generated by machine learning models). For example, the parameter generation model 1406 receives a representation of the user's request to generate code associated with deployment of a software application, as well as the code sample generated by an model in response to the user's request. Based on such information, the model orchestration platform 702 can generate validation test parameters that enable validation of the generated code sample (e.g., within an isolated environment corresponding to a virtual machine). The validation test parameters can include one or more of validation criteria 1208a, a virtual machine configuration 1208b, and/or compilation instructions 1208c.

Figure 15:
FIG. 15 shows a data structure depicting a virtual machine configuration, in accordance with some implementations of the present technology.

The validation test parameters can include a virtual machine configuration. FIG. 15 shows a data structure 1500 depicting a virtual machine configuration (e.g., the virtual machine configuration 1208b), in accordance with some implementations of the present technology. The virtual machine configuration can include a characterization of an isolated testing environment for compiling, executing, and/or evaluating generated code samples. For example, the parameter generation model 1406 can generate a virtual machine configuration, including an indication of a hardware configuration 1510, a software configuration 1530, and/or a communication configuration 1550 for the testing environment (e.g., a virtual machine environment).

The hardware configuration 1510 can include a characterization of hardware components (e.g., as associated with a virtual machine and/or a run-time environment). For example, a hardware configuration includes an indication of a system architecture, such as a CPU architecture (e.g., x86 and/or ARM) or a GPU architecture (e.g., Single Instruction Single Data (SISD), Single Instruction Multiple Data (SIMD), Multiple Instruction Single Data (MISD), and/or other suitable architectures), an indication of a storage type (e.g., an SSD and/or an HDD), an indication of a storage space (e.g., a size associated with the storage in bytes), and/or an indication of a memory type and/or space (e.g., associated with run-time or random-access memory). In some implementations, the hardware configuration includes the specification of peripherals and/or other devices associated with a computing device. The parameter generation model can generate the hardware configuration depending on the model input 1402 and/or the model output 1404 (e.g., the user's prompt and/or the generated code sample) based on a determination of hardware requirements associated with execution of the associated application. For example, the parameter generation model 1406 can determine that the code sample includes a request to transmit information to a physical display and can generate the hardware configuration to include an indication of a suitable display peripheral. By generating an indication of a hardware configuration associated with a validation test, the model orchestration platform 702 enables the specification of properties of a simulated computing device for testing generated code, thereby improving the accuracy and sensitivity of code validation.

The software configuration 1530 can include a characterization of software components (e.g., applications, operating systems, and/or other such components) associated with a virtual machine and/or run-time environment. For example, as shown in FIG. 15, the software configuration 1530 includes an indication of an operating system and/or version, and definition of environment variables (e.g., including a characterization of a home directory path, a display identifier, and/or a system language/locale). In some implementations, the software configuration 1530 includes an indication of libraries to be linked to the compiled executable instructions and/or other dependencies, such as other applications. The parameter generation model can generate the software configuration depending on the model input 1402 and/or the model output 1404 (e.g., the user's prompt and/or the generated code sample) based on a determination of software requirements associated with execution of the associated application. For example, the parameter generation model 1406 can determine that the code sample includes an indication of a particular software library and can generate the software configuration to include the software library. By specifying a software configuration for the validation test, the model orchestration platform 702 enables testing of generated code samples in an environment that includes any associated requirements for execution of the associated software application.

The communication configuration 1550 can include a characterization of communication links. For example, the communication configuration 1550 includes information relating to communication interfaces, peripherals, associated protocols, port configurations, data transmission rates, and/or security settings. To illustrate, the communication configuration 1550, as shown in FIG. 15, can include information relating to a standard associated with communication interfaces (e.g., wired or wireless network interfaces and/or interfaces with peripheral devices, such as computer mice, keyboards, and/or displays). The communication configuration 1550 can include an indication of a wireless network type and/or associated security standards, such as encryption standards. Additionally or alternatively, the communication configuration 1550 includes an indication of ports available for transmission of data (e.g., including information relating to associated communication protocols, including Hypertext Transfer Protocol (HTTP), Transmission Control Protocol/Internet Protocol (TCP/IP), and/or File Transfer Protocol (FTP) information). For example, the parameter generation model 1406 can determine that the code sample includes a network request (e.g., to download information via HTTP), and can generate the communication configuration to include a mechanism for accessing the internet. By generating information relating to communication configurations associated with a testing environment for generated code samples, the model orchestration platform 702 can accurately simulate execution of the associated application.

The model orchestration platform 702, at the operation 1410 shown in FIG. 14, can generate a virtual machine environment that is consistent with the generated virtual machine configuration 1208b. A virtual machine environment can include a subsystem associated with an environment (e.g., a virtual environment) in which computer programs can run, such as a run-time environment. The virtual machine environment can reside on one or more devices (e.g., in a cloud architecture) and can include containerized and/or non-containerized applications. For example, the environment can specify, define, and/or characterize memory management, environment variables, mechanisms for passing parameters between procedures, interfaces with an operating system, and/or other suitable conditions for computer program execution. For example, the virtual machine environment includes a virtual machine (e.g., an emulation or virtualization of a computer system) based on a particular computer architecture (e.g., as defined by the generated software and/or hardware configurations and/or associated communication configuration).

In some implementations, the parameter generation model 1406 can generate validation test parameters can include compilation instructions (e.g., associated with the code sample). The compilation instructions 1208c can include information, commands, and/or other suitable data associated with code compilation. For example, compilation instructions 1208c include information relating to how to generate an executable program based on a given code sample. In some implementations, the compilation instructions include an indication of a scripting language (e.g., a computer programming language) associated with the code sample. By generating such information, the parameter generation model 1406 provides information to aid in generation of an executable program (e.g., an executable binary and/or instructions) based on human-readable code. For example, the model orchestration platform 702 can retrieve, from a database of compilers, a compilation routine (e.g., a compiler) associated with a particular scripting language. In some implementations, the compilation instructions 1208c can include an identifier and/or address associated with a compiler for the given code sample (e.g., as associated with the corresponding scripting language). Furthermore, the compilation instructions 1208c can include flags, markers, and/or other customizations relating to the associated virtual machine configuration (e.g., as described below). For example, the compilation instructions 1208c include indications of compiler flags consistent with the virtual machine configuration generated by the parameter generation model 1406.

Additionally or alternatively, the compilation instructions 1208c includes an indication of a source code for the suitable application for which the user requests modification. For example, based on the prompt provided to the model by the user (e.g., model input 1402), the model orchestration platform 702 determines a target application and/or associated source code associated with the output generation request. Accordingly, the parameter generation model can generate an indication of how to modify the source code using the generated code sample, as well as instructions to compile the modified source code. As such, by generating compilation instructions, the model orchestration platform 702 enables flexible, modular modification and/or deployment of applications based on model-generated code samples.

Based on the compilation instructions and the code sample, the model orchestration platform 702 can generate an executable program within the configured virtual machine environment. For example, the executable program (e.g., the executable instructions 1412 for a software routine) includes a binary file and/or machine-readable instructions enabling execution of a given application or software routine. The model orchestration platform 702 can generate the executable program within the generated virtual machine environment (e.g., associated with a computing device). To illustrate, the model orchestration platform 702 can retrieve an address associated with a compilation routine (e.g., via a compiler database associated with the virtual machine environment). For example, the compiler database can include an index of compiler addresses associated with corresponding programming languages. The model orchestration platform 702 can provide the code sample and/or associated source code to a program associated with the compilation routine to generate the executable instructions (e.g., a binary file), thereby program execution at operation 1414 of FIG. 14. In some implementations, the model orchestration platform 702 can execute the program associated with code (e.g., a code sample or associated source code for an application) without compiling the code, as in the case of an interpreted scripting language. For example, the compilation instructions can indicate an interpreter address for execution of the code associated with the scripting language.

Figure 16:
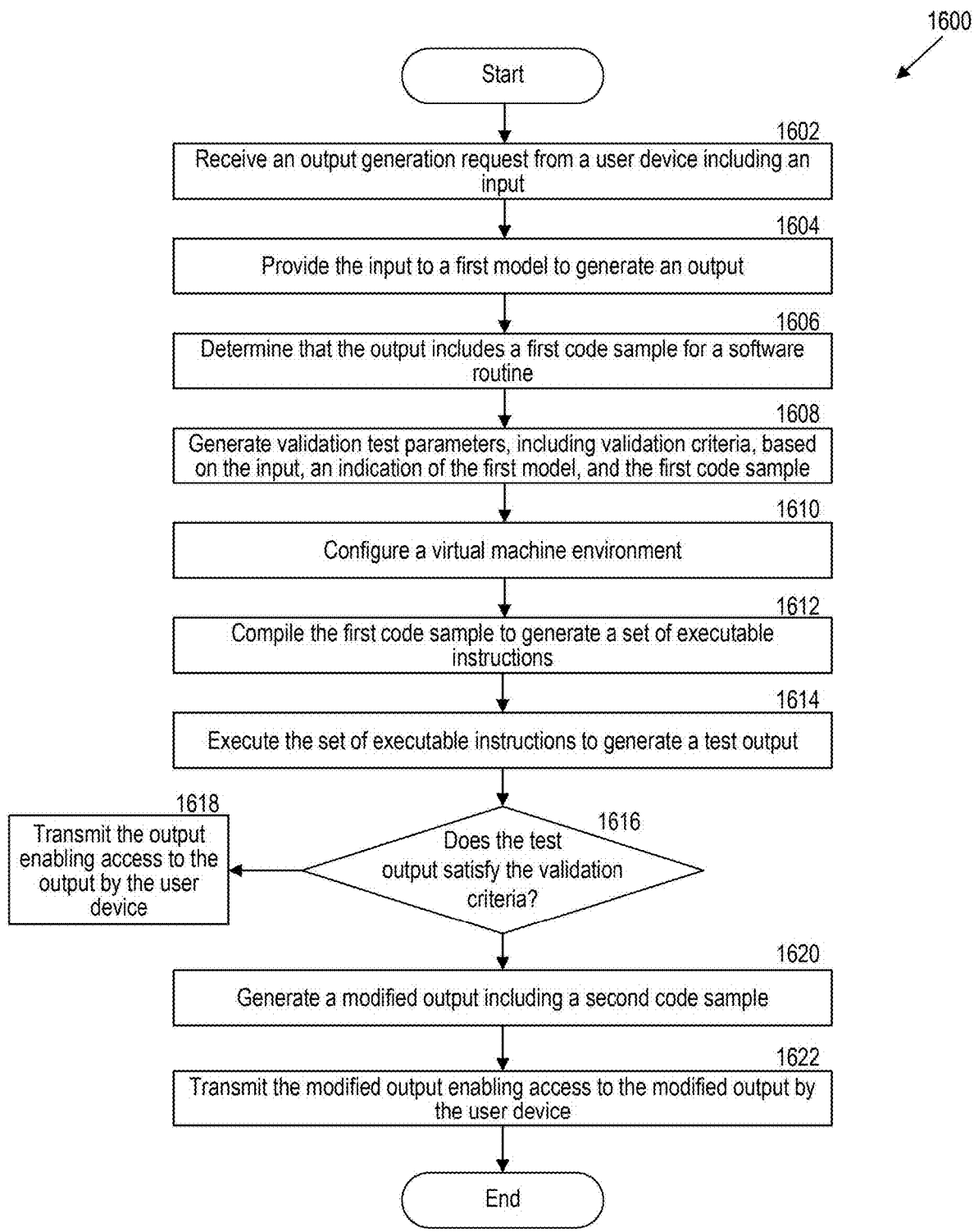
FIG. 16 shows a flow diagram illustrating a process for dynamic evaluation of machine model outputs in an isolated environment, in accordance with some implementations of the present technology.

FIG. 16 shows a flow diagram illustrating a process 1600 for dynamic evaluation of machine model outputs in an isolated environment, in accordance with some implementations of the present technology. For example, the process 1600 enables evaluation of software-related code samples (e.g., code snippets) generated by models for security breaches, intended system behavior, or software bugs/errors based on input-dependent validation tests within an isolated environment.

At act 1602, process 1600 can receive an output generation request that includes an input (e.g., a prompt for generation of text-based output). For example, the model orchestration platform 702 receives, from a user device, an output generation request including an input for generation of an output using a first model. As an illustrative example, the model orchestration platform 702 can receive a text-based prompt indicating generation of a code snippet with a specified functionality and in a particular programming language (e.g., including a function for performing a particular calculation). As such, the model orchestration platform 702 enables the generation of software-related information, including textual code, according to user specifications.

At act 1604, process 1600 can provide the output to the requested model for generation of an output (e.g., a text-based output). For example, the model orchestration platform 702 provides the input to the first model to generate the output. As an illustrative example, the model orchestration platform 702 can provide the user prompt to a model that is configured to generate software-related code samples (e.g., one or more portions of source code) in response to user inputs. In some implementations, the output includes portions that are software code and other portions that are descriptions, comments, or other non-code data. Thus, the model orchestration platform 702 can obtain a model output that includes output (e.g., including a code sample) in response to the output generation request.

At act 1606, process 1600 can determine that the output includes software-related data, such as code. For example, the model orchestration platform 702 determines that the output includes a first code sample for a software routine. As an illustrative example, the model orchestration platform 702 can identify one or more portions of output generated from a model that correspond to code or other software-related information. For example, the model orchestration platform 702 extracts data from the model that corresponds to code. By doing so, the model orchestration platform 702 can further evaluate, test, and/or validate the functioning, security, and privacy associated with the execution of the code, as described below.

At act 1608, process 1600 can generate validation test parameters that characterize a test for validating the generated code sample. For example, in response to determining that the output includes the first code sample, the model orchestration platform 702 provides the input, an indication of the first model, and the first code sample to a parameter generation model to generate validation test parameters. The validation test parameters can include compilation instructions, a virtual machine configuration, and validation criteria. As an illustrative example, the model orchestration platform 702 can generate test parameters that characterize the nature, strictness, and/or criteria associated with testing the generated code samples for security, privacy and/or errors. For example, the model orchestration platform 702 determines the nature of the isolated environment (e.g., the virtual machine) in which to generate or compile an executable program associated with the code sample, based on the nature of the code sample and/or the associated output generation request. Additionally or alternatively, the model orchestration platform 702 identifies a procedure for compiling the code sample (e.g., by updating associated source code and executing a compilation routine). As such, the model orchestration platform 702 can generate flexible output testing parameters in a prompt-specific and/or application-specific manner.

At act 1610, process 1600 can configure a virtual machine environment according to the generated virtual machine configuration. For example, the model orchestration platform 702 configures, based on the virtual machine configuration, a virtual machine environment. As an illustrative example, the model orchestration platform 702 can identify and/or generate a virtual machine with an environment that includes parameters and/or properties as defined within the virtual machine configuration. For example, the model orchestration platform 702 can generate the virtual machine to simulate any network connections, hardware configurations, or software features as specified within the validation test parameters. By doing so, the model orchestration platform 702 can prepare an environment (e.g., an isolated environment) in which to test generated code in a safe, flexible manner.

In some implementations, the model orchestration platform 702 configures the virtual machine environment according to a communication configuration. For example, the model orchestration platform 702 determines that the virtual machine configuration includes an indication of a communication configuration indicating one or more communication interfaces. The model orchestration platform 702 can generate the virtual machine environment including a simulation of the one or more communication interfaces. As an illustrative example, the model orchestration platform 702 configures the virtual machine environment to include simulations of connections, such as WAN, LAN, and/or peripheral connections. By doing so, the model orchestration platform 702 can test any attempted transmissions associated with the generated code, thereby enabling the mitigation of security breaches or the unintended exposure of private information.

In some implementations, the model orchestration platform 702 configures the virtual machine environment according to a hardware configuration. For example, the model orchestration platform 702 determines that the virtual machine configuration includes an indication of a hardware configuration indicating a system architecture. The model orchestration platform 702 can generate the virtual machine environment including a simulation of the system architecture. As an illustrative example, the model orchestration platform 702 can simulate a hardware architecture (e.g., including emulation of central processing units (CPUs), graphics processing units (GPUs), and/or other associated hardware devices) within the virtual machine environment, thereby enabling comprehensive testing of system behavior due to the execution of generated code.

At act 1612, process 1600 can compile the first code sample to generate executable instructions for further testing. For example, the model orchestration platform 702 compiles, within the virtual machine environment and using the compilation instructions, the first code sample to generate a set of executable instructions for the software routine. As an illustrative example, the model orchestration platform 702 generate an executable version of a software routine associated with the code sample (e.g., an executable binary file) using the compilation instructions associated with the generated validation test parameters. For example, the model orchestration platform 702, using the compilation instructions, configures the executable binary file to be compatible with the simulated hardware architecture and/or software consistent with the virtual machine configuration. By doing so, the model orchestration platform 702 can prepare the generated code to be tested within the isolated environment (e.g., the virtual machine).

In some implementations, the model orchestration platform 702 configures a compilation routine based on identification of an associated scripting language. For example, the model orchestration platform 702 determines that the compilation instructions include an identifier of a scripting language. The model orchestration platform 702 can determine, from a compiler database, a compilation routine associated with the scripting language. The model orchestration platform 702 can configure, based on the virtual machine configuration, the compilation routine for operability within the virtual machine environment. The model orchestration platform 702 can generate, within the virtual machine environment and using the configured compilation routine, the set of executable instructions for the software routine. As an illustrative example, the model orchestration platform 702 can identify a programming language associated with the generated code and search for or identify an associated compiler. For example, the model orchestration platform 702 extracts an address associated with the compiler within a compiler database to determine a compiler (e.g., or an associated compilation routine) that is compatible with the compilation instructions, thereby enabling compilation of the code sample and generation of the associated executable instructions.

At act 1614, process 1600 can execute the executable instructions to generate a test output. For example, the model orchestration platform 702 executes, within the virtual machine environment, the set of executable instructions for the software routine to generate a test output. As an illustrative example, the model orchestration platform 702 can run, execute, or process the compiled instructions. In some implementations, the model orchestration platform 702, via the virtual machine configuration, can log (e.g., monitor) actions or effects of the running software routine. For example, the model orchestration platform 702 can detect communications associated with the simulated communication interfaces of the virtual machine, and/or determine run-times associated with the program. As such, the model orchestration platform 702 enables evaluation of the system behavior in relation to the code sample generated by the model in response to the output generation request.

At act 1616, process 1600 can determine whether the test output satisfies the validation criteria. For example, the model orchestration platform 702 determines a validation indicator specifying whether the test output satisfies the validation criteria. As an illustrative example, the model orchestration platform 702 can extract one or more criteria associated with the generated validation criteria of the validation test parameters. For example, the model orchestration platform 702 can extract a criterion specifying that memory usage is to remain within a particular range of values. The model orchestration platform 702 can monitor the test output (e.g., including readings of memory usage over time) to determine whether the criterion is satisfied throughout the execution of the executable program instructions. By doing so, the model orchestration platform 702 enables validation of the code generated via the associated models by evaluating the associated system behavior.

In some implementations, the model orchestration platform 702 validates communications associated with the virtual machine environment for anomalies. For example, the model orchestration platform 702 determines that the validation criteria includes an anomaly criterion indicating that an anomalous communication is forbidden. The model orchestration platform 702 can evaluate the test output including communications associated with the one or more communication interfaces. Based on determining that the communications include the anomalous communication, the model orchestration platform 702 can determine that the test output does not satisfy the validation criteria. The model orchestration platform 702 can generate the validation indicator including an indication that the test output does not satisfy the validation criteria. As an illustrative example, the model orchestration platform 702 can determine an attempt to initiate an unexpected connection (e.g., a WAN connection when only a LAN connection is allowed, according to validation criteria). By doing so, the model orchestration platform 702 can ensure that, following software deployment, sensitive information is not shared with unauthorized devices (e.g., beyond a particular LAN), thereby improving system security.

In some implementations, the model orchestration platform 702 determines a measure of similarity between the test output and an expected output to determine whether the test output satisfies the validation criteria. For example, the model orchestration platform 702 determines, based on the validation criteria, an expected test output for the software routine. The model orchestration platform 702 can generate a first vector representation for the expected test output and a second vector representation for the test output. The model orchestration platform 702 can generate a similarity metric value including a measure of a similarity metric between the first vector representation and the second vector representation. The model orchestration platform 702 can determine, based on the output generation request, a threshold value associated with the similarity metric. The model orchestration platform 702 can comparing the similarity metric value with the threshold value. Based on determining that the similarity metric value satisfies the threshold value, the model orchestration platform 702 can determine that the test output satisfies the validation criteria. The model orchestration platform 702 can generate the validation indicator specifying that the test output satisfies the validation criteria. As an illustrative example, the model orchestration platform 702 can determine an expected output (e.g., an expected log file) based on the validation criteria and/or other associated validation test parameters. To illustrate, the expected output can describe expected or predicted actions taken in response to executing the compiled code sample, such as memory usage, connections, and/or generation of other requested outputs (e.g., data generated by the executable instructions). The model orchestration platform 702 can compare the expected output with the actual test output to determine a similarity metric value (e.g., by comparing vector representations of the respective outputs). Based on determining the similarity metric value, the model orchestration platform 702 can determine if the test output differs from the expected output by a threshold value and, as such, can flag or detect unexpected behavior. As such, the model orchestration platform 702 enables improved anomalous behavior detection for an associated system.

In some implementations, the model orchestration platform 702 can determine the threshold value based on a user risk level associated with the output generation request. For example, the model orchestration platform 702 determines a user identifier associated with the output generation request. The model orchestration platform 702 can determine, based on a user database, a risk level for a user associated with the user identifier. The risk level can indicate a low, medium, or high risk associated with user activity for the user. In response to determining that the risk level indicates the medium or high risk associated with the user activity, the model orchestration platform 702 can determine a first value for the threshold value. In response to determining that the risk level indicates the low risk associated with the user activity, the model orchestration platform 702 can determine a second value for the threshold value, wherein the second value is greater than the first value. As an illustrative example, the model orchestration platform 702 can determine a strictness associated with evaluating the differences between an expected output and the test output on the basis of user credentials and/or a risk level associated with the user associated with the output generation request. For example, a user with less coding experience (e.g., with a number of years of experience fewer than a threshold number) can be assigned a high or medium risk level. Additionally or alternatively, a user with more coding experience (e.g., with a number of years of experience greater than the threshold number) can be assigned a low risk level. By tuning the threshold value associated with the similarity metric according to user credentials and/or user risk, the model orchestration platform 702 can improve mitigation of security breaches, errors, or bugs in a user-specific, targeted manner, thereby improving the efficiency of output evaluation by focusing system resources on users most likely to commit errors in software development.

In some implementations, the model orchestration platform 702 can determine whether the test output includes sensitive information (e.g., from the sensitive token database). For example, the model orchestration platform 702 determines that the validation criteria includes a privacy criterion indicating that sensitive information is forbidden in the test output. Based on determining that the validation criteria includes the privacy criterion, the model orchestration platform 702 can determine whether the test output includes a sensitive token of a sensitive token database. The model orchestration platform 702 can generate the validation indicator including an indication of whether the test output includes the sensitive token of the sensitive token database. As an illustrative example, the model orchestration platform 702 can determine that the test output includes sensitive and/or private information, such as PII, secrets, or other such information, based on determining that a token (e.g., a word, phrase, or sentence) of the test output is included within a sensitive token database. By doing so, the model orchestration platform 702 can prevent disclosure and/or exposure of sensitive or private information, thereby improving the safety of the system to which the code is to be deployed.

At act 1618 process 1600 can transmit the output from the first model in order to provide access to the output (e.g., the generated code sample) for the user. For example, in response to determining that the test output satisfies the validation criteria, the model orchestration platform 702 transmits the output to a server system enabling access to the output by the user device. As an illustrative example, the model orchestration platform 702 can determine that the test output satisfies validation criteria generated by the parameter generation model. For example, the model orchestration platform 702 determines that the test output indicates that the virtual machine remained within memory usage requirements specified by the validation criteria and did not attempt to communicate with forbidden devices (e.g., through forbidden communication channels). By doing so, the model orchestration platform 702 can ensure the security of the system prior to providing the generated code sample to the user requesting the code sample, in response to the output generation request.

At act 1620 process 1600 can generate a modified output when the test output does not satisfy the validation criteria. For example, in response to determining that the test output does not satisfy the validation criteria, the model orchestration platform 702 generates a modified output including a second code sample different from the first code sample. As an illustrative example, the model orchestration platform 702 can determine that the virtual machine, when executing the executable instructions associated with the code sample, does not satisfy memory usage requirements and/or attempts to communicate via forbidden channels. By doing so, the model orchestration platform 702 can modify the code to resolve any detected deficiencies in the validation test (e.g., based on an indication of a validation error). By doing so, the model orchestration platform 702 can resolve any bugs, errors, and/or security issues associated with the code sample generated in response to the output generation request.

In some implementations, the model orchestration platform 702 can generate the modified output by providing an indication of a validation error (e.g., associated with the validation indicator) to a model. For example, the model orchestration platform 702 determines, based on the validation indicator, an indication of a validation error associated with the test output. The indication of the validation error can include an indication of a criterion of the validation criteria that is not satisfied by the test output. The model orchestration platform 702 can provide the indication of the validation error, the first code sample, and the input to the first model to generate the modified output including the second code sample. As an illustrative example, the model orchestration platform 702 can generate a summary of any deficiencies associated with the validation test failure (e.g., an indication of particular criteria that was not satisfied by the test output) and provide such information to the model, along with the first code sample, to modify the code sample to resolve issues causing the validation test failure. For example, the model orchestration platform 702 modifies the code sample to prevent communication via a forbidden communication channel and/or to a forbidden communication device. By doing so, the model orchestration platform 702 can fix generated code in a targeted manner, improving the efficiency of software development.

At act 1622, process 1600 can transmit the modified output in order to provide access to the modified output for the user. For example, the model orchestration platform 702 transmits the modified output to the server system to enable access to the modified output by the user device. As an illustrative example, the model orchestration platform 702 can provide the modified output (e.g., including a modified code sample) to the user in response to the output generation request. As such, the model orchestration platform 702 can provide generated code to a user following validation and resolution of any validation test discrepancies, thereby improving the quality and security of the generated code for use by the user.

In some implementations, the model orchestration platform 702 can transmit the modified output to the user device in response to validating the modified output. For example, the model orchestration platform 702 compiles, within the virtual machine environment and using the compilation instructions, the second code sample to generate a second set of executable instructions. The model orchestration platform 702 can execute, within the virtual machine environment, the second set of executable instructions to generate a second test output. The model orchestration platform 702 can determine whether the second test output satisfies the validation criteria. In response to determining that the second test output satisfies the validation criteria, the model orchestration platform 702 can transmit the modified output to the server system to enable access to the modified output by the user device. As an illustrative example, the model orchestration platform 702 can ensure that the modified output (and/or the associated code) is consistent with the validation criteria prior to transmission to the user, thereby preventing any additional errors or security breaches introduced as a result of the modification.

Figure 17:
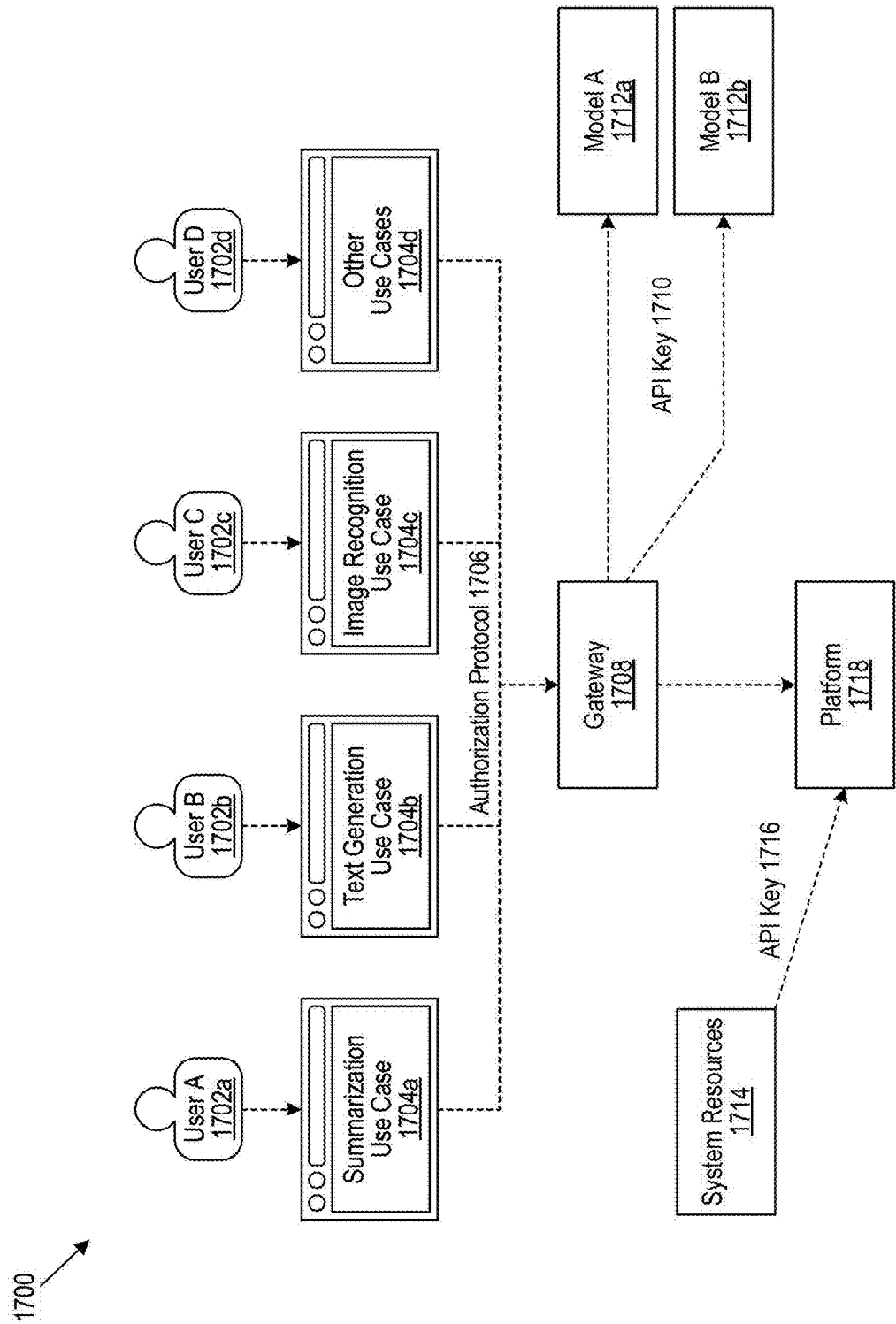
FIG. 17 shows a schematic illustrating an example environment of a platform for dynamically selecting models and infrastructure to process a request with the selected models, in accordance with some implementations of the present technology.

Dynamic Resource-Sensitive Agent Selection Using the Model Orchestration Platform FIG. 17 is an illustrative diagram illustrating an example environment 1700 of a platform 1718 for dynamically selecting models and infrastructure to process a request with the selected models, in accordance with some implementations of the present technology. Environment 1700 includes users 1702*a-d*, use cases 1704*a-d*, authorization protocol 1706, gateway 1708, API key 1710, 1716, models 1712*a-b*, system resources 1714, and platform 1718. Platform 1718 is implemented using components of example devices 200 and computing devices 302 illustrated and described in more detail with reference to FIG. 2 and FIG. 3, respectively. Platform 1718 can be the same as or similar to model orchestration platform 702 with reference to FIG. 7. Likewise, implementations of example environment 1700 can include different and/or additional components or can be connected in different ways.

Users 1702*a-d* can each represent different individuals or entities who interact with the platform by submitting inputs (e.g., input inquiry, prompt, query) in an output generation request to be processed subsequently by the platform 1718 to select appropriate models and resources. Each user 1702*a-d* can have distinct requirements and use cases, such as summarization use case 1704*a*, text generation use case 1704*b*, image recognition use case 1704*c*, and/or other use cases 1704*d*. For example, the summarization use case 1704*a* can include generating a concise summary of a given text input. The user 1702*a* submits a text document or a large body of text, and the platform 1718 processes the text document to produce a shorter version that captures the representative points and information of the text document. Additionally, the text generation use case 1704*b* can include generating new text based on a given prompt or input. The user 1702*b* provides a starting sentence, topic, or context, and the platform generates coherent and contextually relevant text. For instance, a user can provide a prompt like "Once upon a time in a faraway land," and the platform generates a continuation of the story. Further, the image recognition use case 1704c can include analyzing and identifying objects, features, or patterns within an image. The user 1702c submits an image, and the platform processes the image to recognize and label the contents. For example, a user can upload a photo of a crowded street, and the platform identifies and labels objects such as cars, pedestrians, traffic lights, and buildings.

The authorization protocol 1706 ensures that only authorized users and devices can access the platform 1718 by managing authentication and authorization processes, verifying user identities, and granting appropriate access rights based on predefined policies. The authorization protocol 1706 can include one or more of, for example, multi-factor authentication, OAuth tokens, or other security measures to ensure access control. In some implementations, the authorization protocol can also include biometric verification or hardware-based security modules for improved security. Examples of authorization protocol 1706 and methods of implementing authorization protocol 1706 are discussed with reference to FIG. 18.

The gateway 1708 is an entry point for output generation requests submitted by users 1702a-d, routing the output generation requests to the platform 1718. The gateway 1708 can perform load balancing (i.e., distributing requests across multiple platform instances to improve efficiency of resource use and prevent bottlenecks), data transformations (i.e., converting and normalizing input data for compatibility with the platform), and/or protocol translations (e.g., converting HTTP requests to gRPC) to support the interactions between users 1702a-d and the platform 1718. In some implementations, the gateway 1708 is a microservices-based architecture that allows for scalable and modular handling of requests. For example, when user 1702a submits a text summarization request, the gateway 1708 balances the load by directing the request to an available instance (e.g., platform 1718), transforms the data format if needed, and/or translates the protocol to ensure compatibility before transmitting the request to the platform 1718. The platform 1718 processes the request, and the gateway 1708 returns the summarized text to the user.

In some implementations, when a user submits a request, the gateway 1708 first intercepts the request and checks for the presence of a valid API key 1710. The API key 1710, which serves as a unique identifier, is verified against the authorization protocol 1706. API key 1710 is used to authenticate (e.g., via authorization protocol 1706) and authorize API requests to ensure that only valid requests from authorized users or systems are processed by the platform. Once authenticated, the authorization protocol 1706 can check the associated permissions and roles linked to the API key 1710 to determine if the user has the necessary access rights to perform the requested action. If the API key 1710 is valid and the user is authorized, the gateway 1708 routes the request to the appropriate components within the platform 1718. This interaction ensures that only authorized users can access the platform's resources, maintaining the security and integrity of the system. In some implementations, the authorization protocol 1706 can also enforce additional security measures, such as rate limiting and logging, to further protect the platform from unauthorized access and abuse. In some implementations, API key 1710 can be supplemented with JWT (JSON Web Tokens) for stateless authentication and improved security.

Models 1712a-b are the different models (e.g., AI models, machine learning models, LLMs) accessible by the platform 1718. The models 1712a-b can have different capabilities and performance properties or attributes. The platform 1718 dynamically selects the most appropriate model(s) within models 1712a-b based on the output generation request of the user 1702a-d that specifies the use case 1704a-d. Methods of dynamically selecting the most appropriate model(s) is discussed in further detail with reference to FIG. 18. The models 1712a-b can include, for example, deep learning models, decision trees, or ensemble methods, depending on the use case 1704a-d. In some implementations, the platform can use a model registry to manage and version control the models 1712a-b to ensure that the most up-to-date and accurate versions of models 1712a-b are used for processing the output generation request.

Similarly to API key 1710, API key 1716 can be used to verify the system resources 1714 accessible by the users 1702a-d. System resources 1714 include the computational and storage resources used to process output generation request, encompassing CPU, GPU, memory, and/or other software, hardware, and/or network components that the platform allocates dynamically. The platform can use container orchestration tools such as KUBERNETES to manage the system resources 1714. In some implementations, the platform could leverage cloud-based infrastructure for elastic scaling and cost efficiency.

Figure 18:
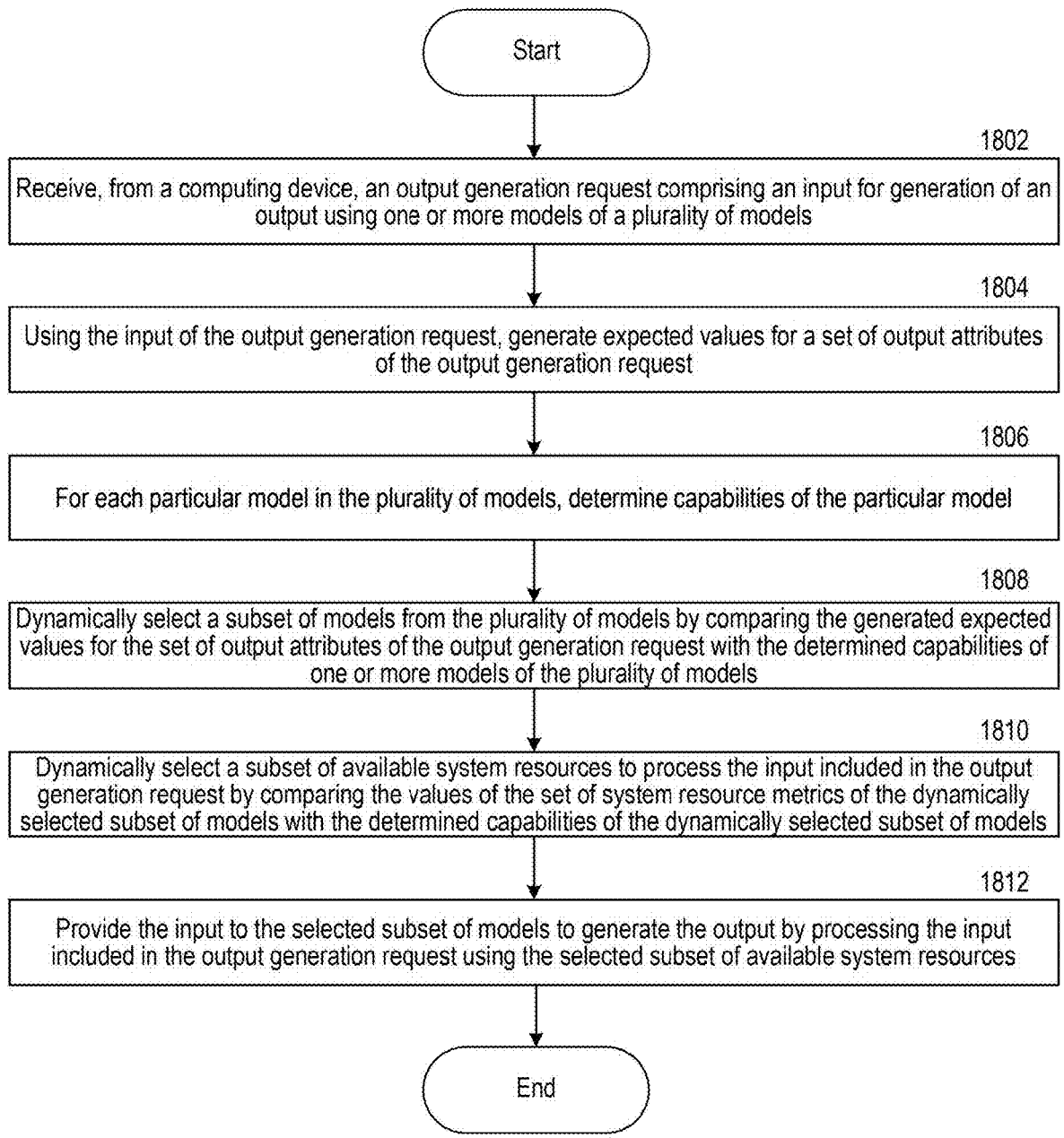
FIG. 18 is a flow diagram illustrating a process for the dynamic selection of models and infrastructure to process the request with the selected models based on evaluation of user prompts, in accordance with some implementations of the present technology.

FIG. 18 is a flow diagram illustrating a process 1800 for the dynamic selection of models and infrastructure to process the request with the selected models based on evaluation of user prompts, in accordance with some implementations of the present technology. In some implementations, the process 1800 is performed by components of example devices 200 and computing devices 302 illustrated and described in more detail with reference to FIG. 2 and FIG. 3, respectively. Likewise, implementations can include different and/or additional operations or can perform the operations in different orders.

In operation 1802, the system receives, from a computing device, an output generation request including an input (e.g., a prompt, query, input query, request) for generation of an output using one or more models (e.g., AI models) of a plurality of models. In some implementations, at least one AI model in the plurality of AI models is an LLM. The request can be received, for example, via an API endpoint exposed by a gateway (e.g., gateway 1708), which can be the entry point for incoming output generation request. The output generation request can include various parameters such as the type of output desired (e.g., text, image, or data), specific instructions or constraints, and/or metadata about the requestor.

In some implementations, the output generation request includes a predefined query context (e.g., metadata about the requestor) corresponding to a user of the computing device. The predefined query context is a vector representation of one or more expected values for the set of output attributes of the output generation request. The query context can include various types of metadata, such as the user's preferences, historical interaction data, or specific constraints and requirements for the output. For example, if the requestor is a user seeking a text summary, the query context can include information about the preferred summary length, the level of detail required, and any specific sections of the text that should be prioritized.

The vector representation of the query context is typically generated using techniques such as word embeddings, sentence embeddings, or other forms of vectorization that capture the semantic meaning and relationships of the metadata. Text vectorization transforms textual data into a numerical format. The pre-defined query context can be pre-processed, which can include tokenization, normalization, and/or stop word removal. Tokenization is the process of breaking down text into smaller units called tokens. These tokens can be words, phrases, or even individual characters. For instance, the sentence "The quick brown fox jumps over the lazy dog" can be tokenized into individual words like "The", "quick", "brown", "fox", "jumps", "over", "the", "lazy", and "dog". Normalization converts text into a consistent format, making the text easier to process. This can include converting all characters to lowercase, removing punctuation, expanding contractions (e.g., "don't" to "do not"), and handling special characters. Normalization ensures uniformity in the text, reducing variations that could lead to inaccuracies in analysis. For example, normalizing "Don't" and "don't" can result in both being converted to "do not". Stop word removal is the process of filtering out common words that carry little semantic value and are often considered irrelevant for text analysis. These words include "the", "is", "in", "and", etc. Removing stop words helps in focusing on the more meaningful parts of the text. For example, in the sentence "The quick brown fox jumps over the lazy dog", removing stop words would result in "quick", "brown", "fox", "jumps", "lazy", and "dog".

This vector is used to inform and guide the AI models during the output generation process. For instance, a model can adjust its text generation parameters to produce a summary that aligns with the user's historical or recorded preferences for length and detail. The use of a predefined query context allows the system to provide more personalized and contextually relevant outputs, enhancing the overall user experience. Additionally, the query context can be dynamically updated based on the user's interactions and feedback, allowing the system to continuously learn and improve its performance.

In operation 1804, using the prompt of the output generation request, the system generates expected values for a set of output attributes (e.g., output properties, features) of the output generation request. The generated expected values for the set of output attributes of the output generation request can indicate: (1) a type of the output generated from the prompt (e.g., text generation, summarization, image recognition, length of output, format, tone) and (2) a threshold response time of the generation of the output (e.g., low latency, high latency). Natural language processing (NLP) techniques, such as tokenization, part-of-speech tagging, and named entity recognition, can be used to identify the semantic structure and intent of the prompt. Based on this analysis, the system generates expected values for the output attributes.

The type of output refers to the specific format or nature of the generated content. For instance, the system can determine whether the output should be a text summary, a detailed report, an image, or a data visualization. The determination is based on the prompt's content and any predefined query context provided in the request. The system can use classification algorithms or predefined rules to categorize the prompt and assign the appropriate output type. For example, a prompt asking for a summary of a document can result in the system generating a concise text summary, while a prompt requesting an analysis of sales data can lead to the creation of a graphical report.

The threshold response time is an attribute that specifies the maximum allowable time for generating the output. The threshold response time ensures that the system meets performance requirements and provides timely responses to user requests. The system can calculate the threshold response time based on factors such as the complexity of the prompt, the computational resources available, and any user-specified constraints. For instance, a simple text generation task can have a shorter threshold response time compared to a complex image recognition task that uses extensive processing. The threshold response time can be dynamically adjusted based on a current load or resource availability of the system. For example, the system continuously monitors metrics such as CPU and GPU utilization, memory usage, network bandwidth, and active requests. When high load or limited resources are detected, the system increases the threshold response time for new requests to balance the load and prevent delays. Conversely, during low demand periods, the system decreases the threshold response time to provide faster responses. The system can prioritize requests based on the importance, assigning shorter response times to high-priority requests and longer times to lower-priority ones.

In operation 1806, for each particular AI model in the plurality of AI models, the system determines capabilities of the particular AI model. The capabilities can include, for example, (1) values of a set of estimated performance metrics for processing requests using the particular AI model (e.g., the abilities of the models on the platform), and/or (2) values of a set of system resource metrics indicating an estimated resource usage of available system resources for processing the requests using the particular AI model. The available system resources can include hardware resources, software resources, and/or network resources accessible by the computing device to process the output generation request using the particular AI model. Hardware resources can include resources beyond physical hardware, such as virtual machines (VMs). A VM is a software-based emulation of a physical computer that runs an operating system and applications just like a physical computer. Multiple VMs are able to run on a single physical machine, sharing the physical machine's resources such as CPU, memory, and storage. Each VM operates independently and can run different operating systems and applications, and are thus commonly used for tasks such as testing, development, and running multiple applications on a single hardware platform.

The values of the set of estimated performance metrics for each particular AI model in the plurality of AI models can include, for example, response time, accuracy, and/or latency. For example, the system can analyze the model's accuracy in generating text summaries, its response time for image recognition tasks, or its throughput in handling multiple concurrent requests.

The values of the set of system resource metrics for each particular AI model in the plurality of AI models can include, for example, Central Processing Unit (CPU) usage, Graphical Processing Unit (GPU) usage, memory usage, cost, power consumption, and/or network bandwidth. The system assesses the resource consumption patterns of each AI model, considering factors like computational intensity, memory footprint, and data transfer requirements. For instance, a deep learning model for image recognition can have high GPU and memory usage, while an NLP model can use significant CPU and network bandwidth for handling large text datasets.

To determine the capabilities of each AI model, the system can examine the model's architecture (e.g., the number of layers in a neural network), configuration (e.g., the types of operations the model performs), and dependencies (e.g., dependency on specific libraries or frameworks) to estimate the model's resource requirements and performance characteristics (e.g., computational intensity, memory footprint, and potential bottlenecks). In some implementations, the system can execute the model with representative data and capturing metrics such as processing time, accuracy, throughput, CPU and GPU utilization, memory consumption, and network bandwidth usage.

In some implementations, the system obtains a set of operation boundaries (e.g., guidelines, regulatory guidelines) of the plurality of AI models. In some implementations, the system translates guidelines into actionable test cases for evaluating AI model compliance. By parsing and interpreting guidelines (e.g., regulatory documents), the system identifies relevant compliance requirements and operational boundaries that must be complied with plurality of AI models. The system constructs a set of test cases associated with each guideline that covers various scenarios derived from the regulatory requirements. These test cases can include prompts, expected outcomes, and/or expected explanations. For each particular AI model in the plurality of AI models, the system evaluates the particular AI model against the set of test cases to determine compliance of the particular AI model with the set of operation boundaries. The system can generate one or more compliance indicators based on comparisons between expected and actual outcomes and explanations. For example, if the particular AI model's response meets the expected outcome and explanation, the particular AI model receives a positive compliance indicator. If there are discrepancies, the system can flag these as areas requiring further attention or modification. In some implementations, the system can automatically adjust to the parameters of the particular AI model to ensure alignment with regulatory guidelines. By validating each particular AI model, this results in more efficient resource usage so the validation test cases only have to be run once by the platform, rather than every time a user attempts to access a particular AI model.

In operation 1808, the system dynamically selects a subset of AI models from the plurality of AI models by comparing the generated expected values for the set of output attributes of the output generation request with the determined capabilities of the plurality of AI models. This comparison can be performed by assigning a degree to which each model's capabilities align with/satisfy the expected values. For instance, if the request requires a high-accuracy text summary with a short response time, the system assigns a higher degree of alignment/satisfaction to models that have demonstrated high accuracy and low latency in similar tasks in their determined capabilities.

In some implementations, the subset of models is dynamically selected responsive to determining the capabilities of each particular model in the plurality of models. The system can compare the determined capabilities a first model of the plurality of models with the determined capabilities of a second model of the plurality of models. The system can use a scoring mechanism that assigns a compatibility score to each AI model based on how well its capabilities match the expected values. The scoring mechanism can use weighted criteria to prioritize certain attributes over others, depending on the specific requirements of the request. For example, in a real-time application, response time can be weighted more heavily than accuracy, whereas in a medical diagnosis task, accuracy can be the primary criterion. The system aggregates the scores to rank the AI models, identifying those that best meet the overall requirements of the request. The system can normalize the performance metrics and expected values to a common scale to allow different metrics can be compared and aggregated. The system applies weights to each metric based on the importance of the corresponding attribute. The weights can be predefined based on the type of request or dynamically adjusted based on user preferences or contextual factors. For instance, a weight of 0.7 can be assigned to accuracy and 0.3 can be assigned to latency for a medical diagnosis task, reflecting the higher priority of accuracy.

Once the weights are applied, the system calculates a weighted sum for each AI model, representing its overall compatibility score. The score is a composite measure that reflects how well the model's capabilities align with the expected values across all relevant attributes. The system aggregates the scores to rank the AI models, identifying those that best meet the overall requirements of the request. The models with the highest compatibility scores are selected as the subset of AI models for processing the output generation request. In some implementations, the system prioritizes each AI model in the plurality of AI models based on historical performance data of each AI model in the plurality of AI models. The system can store the historical performance data of each AI model in a database accessible by the system. The system updates the historical performance data of one or more AI models in the plurality of AI models after the output generation request is processed.

In some implementations, the system sequentially evaluates each model's capabilities and compares them to the expected values, until a model is found that satisfies the requirements of the output generation request. The system determines the capabilities of a first model in the plurality of models. The system compares the generated expected values for the set of output attributes of the output generation request with the determined capabilities of the first model. Responsive to the determined capabilities of the first model satisfying the generated expected values for the set of output attributes of the output generation request, the system provides the input to the first model to generate the output by processing the input included in the output generation request using the selected subset of available system resources. Responsive to the determined capabilities of the first model not satisfying the generated expected values for the set of output attributes of the output generation request, the system can determine the capabilities of a second model in the plurality of models. Responsive to the determined capabilities of the second model satisfying the generated expected values for the set of output attributes of the output generation request, the system can provide the input to the second model to generate the output by processing the input included in the output generation request using the selected subset of available system resources. The approach ensures that the system quickly identifies a suitable model without the need for exhaustive evaluation of all available models. By stopping the search as soon as a model that meets the expected values is found, the system can efficiently allocate resources and minimize processing time.

In operation 1810, the system dynamically selects a subset of available system resources to process the prompt included in the output generation request by comparing the values of the set of system resource metrics of the dynamically selected subset of AI models with the determined capabilities of the dynamically selected subset of AI models. The system can query resource management modules to obtain real-time data on resource usage across the computing infrastructure. The system assesses the availability of hardware resources, such as the number of free CPU cores, available GPU memory, and storage capacity. The system can additionally or alternatively consider software dependencies, ensuring that the required libraries and frameworks are installed and compatible with the selected models. Additionally, the system evaluates network resources, such as available bandwidth and latency, to ensure that data can be transferred efficiently between components. To perform the comparison, the system can take into account various factors, such as resource constraints, priority levels, and potential contention with other tasks. The system can assign weights (e.g., accessed via an API key) to different resource types based on the resource's respective importance for the specific models and the output generation request. For example, GPU resources can be weighted more heavily for a model that relies on parallel processing, while network bandwidth can be prioritized for a model that requires frequent data transfers.

The dynamically selected subset of available system resources can include a set of shared hardware and a set of dedicated hardware. Shared hardware refers to resources that are concurrently used by multiple tasks or processes, such as general-purpose CPUs, shared GPU clusters, and common storage systems. Dedicated hardware, on the other hand, refers to resources that are exclusively allocated to a specific task or process, such as dedicated GPU instances, specialized accelerators (e.g., TPUs), and isolated memory pools. In some implementations, the system initializes processing the input query included in the output generation request using the set of shared hardware for a predetermined time period. Upon expiration of the predetermined time period, the system continues to process the input query included in the output generation request using the set of dedicated hardware. The transition allows the most resource-intensive stages of the processing are handled by dedicated resources, which can provide higher performance, lower latency, and more predictable execution times.

In some implementations, the system initializes processing the input query included in the output generation request using the set of dedicated hardware for a predetermined time period. Upon expiration of the predetermined time period, the system continues to process the input query included in the output generation request using the set of shared hardware. The transition helps better use resources by offloading less performance-based stages of the processing to shared resources, freeing up dedicated hardware for other high-priority tasks.

In operation 1812, the system provides the prompt to the selected subset of AI models to generate the output by processing the prompt included in the output generation request using the selected subset of available system resources. The routing process can be managed by a task scheduler that coordinates the execution of the models across the allocated system resources. The scheduler ensures that the input data is distributed to the appropriate models, taking into account factors such as data locality, resource availability, and load balancing. For example, if multiple models are running on different GPU instances, the scheduler ensures that the input data is transferred to the correct GPU memory to minimize data transfer latency and maximize processing efficiency. In some implementations, responsive to the generated output, the system automatically transmits, to the computing device, the output within the threshold response time. In some implementations, processing the input included in the output generation request using the dynamically selected subset of available system resources consumes less electrical power than processing the input included in the output generation request using a different subset of available system resources within the set of available system resources.

The output can be a final output. In some implementations, the system provides the prompt to the dynamically selected subset of AI models in parallel. The system can aggregate model-specific outputs from each AI model of the dynamically selected subset of AI models to generate the final output. In some implementations, the system distributes the input prompt across multiple AI models simultaneously, allowing each model to process the data independently and concurrently. The system can partition the input prompt into segments or sub-tasks that can be processed in parallel. For instance, in a text summarization task, the input document can be divided into sections, with each section being processed by a different model. In an image recognition task, different regions of an image can be analyzed by separate models. Once the input prompt is partitioned, the system routes each segment to the corresponding AI model in the dynamically selected subset. Once each AI model has processed the model's segment of the input prompt, the system aggregates the model-specific outputs to generate the final output. For instance, in a text summarization task, the system can merge the summaries generated by each model into a single summary. In an image recognition task, the system can combine the detected objects and features from each model into a single analysis of the input image.

In some implementations, the system provides the prompt to the dynamically selected subset of AI models in a sequence. The system can input a model-specific output from a first AI model of the dynamically selected subset of AI models into a second AI model of the dynamically selected subset of AI models in the sequence. For example, the system can provide the initial prompt to the first AI model in the sequence. The model processes the input data according to its specific capabilities and generates an intermediate output. For example, in an NLP task, the first model can perform tokenization and part-of-speech tagging on the input text. In an image processing task, the first model can perform initial feature extraction or object detection. Once the first model has generated its output, the system takes the model-specific output and inputs the model-specific output into the second AI model in the sequence. The second model processes the intermediate output, further refining or transforming the data. For instance, in the NLP task, the second model can perform named entity recognition or sentiment analysis on the tagged text. In the image processing task, the second model can perform more detailed analysis, such as identifying specific objects or classifying detected features. The sequential processing continues, with each model in the sequence receiving the output from the previous model and generating its own intermediate output. Once the final model in the sequence has processed its input, the system generates the final output.

In some implementations, the system generates a confidence score for a model-specific output generated by each AI model in the selected subset of AI models. The system can aggregate the model-specific outputs using the generated confidence scores. The system selects the model-specific output with a highest confidence score for transmission to the computing device. For example, in an NLP task, a model can calculate its confidence score based on the probability distribution of the generated text, the coherence of the sentences, and the alignment with known linguistic patterns. In an image recognition task, a model can calculate its confidence score based on the clarity of the detected objects, the consistency of the classification results, and the alignment with training data.

The system can receive a set of user feedback on the generated output. The feedback can be collected through various channels, such as user ratings, comments, error reports, or direct interaction with the output. The feedback data can be evaluated by the system to identify patterns, trends, and specific areas for improvement using NLP techniques and sentiment analysis to interpret and categorize the feedback. For example, the system can parse the textual feedback to extract information such as user satisfaction levels, specific issues encountered, and/or suggestions for improvement. The system can use machine learning algorithms, such as support vector machines (SVM) or neural networks, to classify the feedback into different categories, such as accuracy, relevance, performance, and usability. For example, feedback indicating that the output was inaccurate or irrelevant can be categorized under "accuracy issues," while feedback highlighting slow response times can be categorized under "performance issues."

Using the processed feedback, the system can adjust the dynamically selected subset of AI models and/or the dynamically selected subset of available system resources. For the AI models, the system can update the model selection criteria (e.g., assigning a higher weight to criticized areas such as accuracy or latency), retrain or fine-tune the models, or incorporate new models that better address the identified issues. For the system resources, the system can reallocate resources based on the feedback to improve performance and efficiency. For example, if the feedback indicates that the processing time is too slow, the system can allocate more CPU or GPU resources to the task, adjust the data pipelines, or implement more efficient algorithms. Conversely, if the feedback indicates that certain resources are being underutilized, the system can reallocate those resources to other tasks or reduce the overall resource allocation to improve cost efficiency. In some implementations, the system can use a reward-based mechanism where positive feedback leads to reinforcement of the current model and resource configurations, while negative feedback triggers further adjustments.

In some implementations, responsive to the generated output, the system generates for display at the computing device, a layout indicating the output. The layout can include a first representation of each model in the dynamically selected subset of models, a second representation of the dynamically selected subset of available system resources, and/or a third representation of the output. Further examples and methods of displaying the output are discussed with reference to FIG. 19.

Figure 19:
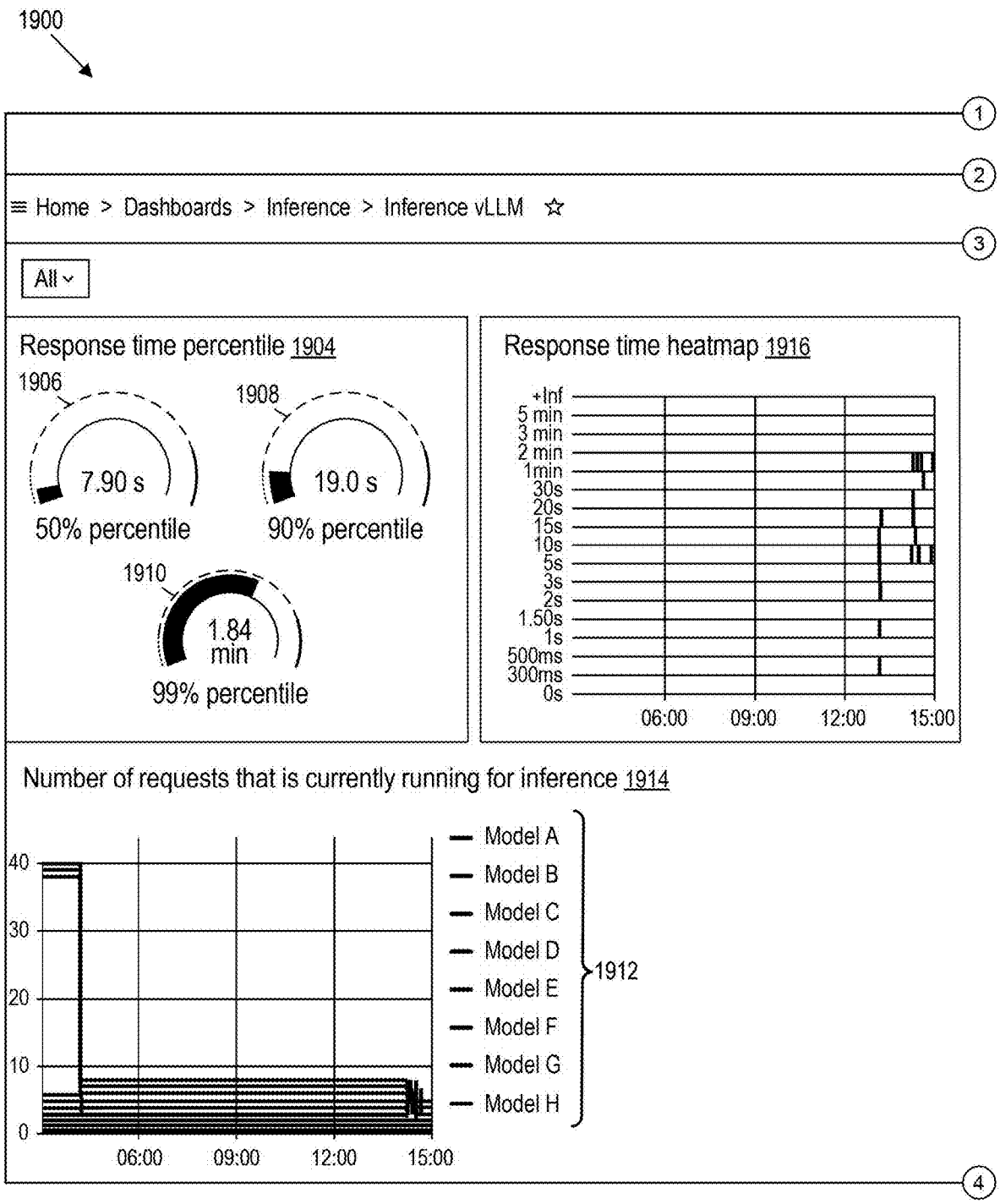
FIG. 19 is an example user interface for monitoring user activity, in accordance with some implementations of the present technology.
Figure 19:
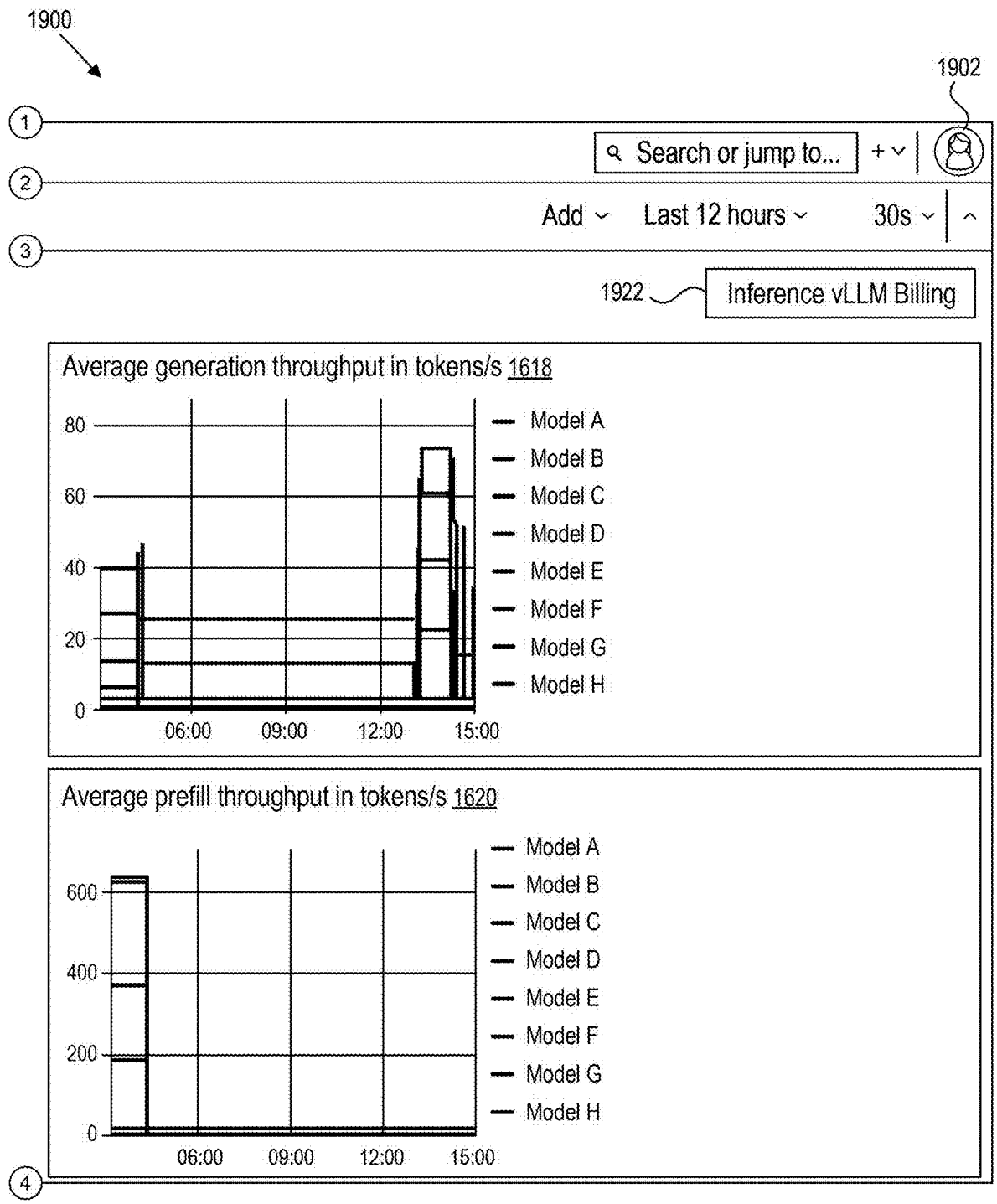

FIG. 19 is an example user interface 1900 for monitoring user activity, in accordance with some implementations of the present technology. User interface 1900 includes user 1902, response time percentile 1904, percentile graphs 1906, 1908, 1910, models 1912, request load 1914, latency representation 1916, generation throughput representation 1918, prefill throughput representation 1920, and cost representation 1922. User interface 1900 is implemented using components of example devices 200 and computing devices 302 illustrated and described in more detail with reference to FIG. 2 and FIG. 3, respectively. User 1902 can be the same as or similar to users 1302a-d with reference to FIG. 17. Implementations of example user interface 1900 can include different and/or additional components or can be connected in different ways.

The user interface 1900 allows users or administrators to monitor and manage the platform performance. The user 1902 refers to the individual or entity interacting with the system. The user 1902 can have a particular role and set of permissions within the system, and the output generation requests of the user 1902 can be tracked to ensure efficient resource allocation and model selection. In some implementations, the user 1902 can include automated agents or services that interact with the system on behalf of human users.

The response time percentile 1904 represents the distribution of response times for requests processed by the system. The response time percentile 1904 can be used to indicate the performance and latency of the system. The response time percentile 1904 can be displayed in a particular percentile format, such as the 50th, 90th, and 99th percentiles, indicating the response times below which a certain percentage of requests fall. In some implementations, additional percentiles or custom percentile ranges can be included to provide more granular insights into system performance. Percentile graphs 1906, 1908, 1910 visually represent the response time percentiles over a specified period. For example, in FIG. 16, percentile graph 1906 indicates the 50th percentile (e.g., 7.90 seconds), percentile graph 1908 indicates the 90th percentile (e.g., 19.0 seconds), and percentile graph 1910 indicates the 99th percentile (e.g., 1.84 seconds). Percentile graphs 1906, 1908, 1910 help users or administrators quickly identify trends and anomalies in system performance. In some implementations, the percentile graphs 1906, 1908, 1910 can be interactive, allowing users to zoom in on specific time ranges or filter data based on different criteria.

Models 1912 refer to the various machine learning models available within the system. Models 1912 can include a wide range of models, such as those for text generation, image recognition, and summarization, as depicted in FIG. 17. Each model has specific capabilities and resource requirements. In some implementations, models 1912 can also include custom or user-defined models loaded into the platform.

Request load 1914 indicates the number of requests currently being processed by the system. For example, high request loads can trigger the dynamic selection of additional models or system resources to maintain performance. In some implementations, request load 1914 can also include historical data to help predict future workloads. Latency representation 1916 visualizes the latency of requests processed by the system and helps users identify delays and bottlenecks in the system. For example, the latency representation 1916 can be displayed as a heatmap, bar chart, or line graph. In some implementations, latency representation 1916 can include breakdowns by model (e.g., Models A through H) or resource type to provide more detailed insights.

Generation throughput representation 1918 represents the average throughput of the system in terms of tokens generated per second and indicates the efficiency of the models in generating outputs. In some implementations, the generation throughput representation 1918 can be broken down by individual models or aggregated across all models to provide a comprehensive view of system performance. Prefill throughput representation 1920 indicates the average throughput of the system in terms of tokens prefilled per second. Prefill throughput representation 1920 helps users understand the efficiency of the system in preparing inputs for model processing. In some implementations, the prefill throughput representation 1920 can be displayed alongside generation throughput to provide a complete picture of system performance. Cost representation 1922 indicates the cost associated with processing requests within the system and helps users manage and adjust their resource usage to lower expenses. Cost representation 1922 can include metrics such as the cost per request, total cost over a specified period, and cost breakdown by model or resource type. In some implementations, cost representation 1922 can also include projections and recommendations generated by the platform using methods discussed in FIG. 18.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having operations, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated.

In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 712 (f) will begin with the words "means for," but use of the term "for" in any other context is not intended to invoke treatment under 35 U.S.C. § 712(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A non-transitory computer-readable storage medium comprising instructions for orchestrating a plurality of autonomous artificial intelligence (AI) agents to generate a personalized response stored thereon, wherein the instructions when executed by at least one data processor of a system, cause the system to:
   receive, from a computing device, an output generation request comprising a prompt for generation of an output using one or more AI agents of the plurality of AI agents communicatively connected to a large language model (LLM) set,
      wherein each AI agent is associated with a specific routing matrix that identifies a computer-executable task set used to generate a response, and
      wherein each computer-executable task is configured to be autonomously executed by the AI agent on a set of software applications in response to satisfaction of a condition set;
   segment, using the LLM set, the prompt into a plurality of sub-queries, each sub-query sharing a common output parameter set that identifies one or more of:
      a user type associated with the prompt, a timestamp of receiving the output generation request, an output modality, a performance metric threshold, or a system resource usage threshold;
   determine an operational parameter set of each AI agent that defines one or more of:
      at least one user type authorized to use the AI agent, a range of timestamps associated with the AI agent, at least one output modality of responses generated by the AI agent, at least one performance metric values, or at least one resource usage values;
   for each sub-query of the plurality of sub-queries, identify, using the LLM set, a candidate agent from the plurality of AI agents by comparing (a) the output parameter set of the sub-query with (b) the operational parameter set of each AI agent within the plurality of AI agents;

for each identified candidate agent of each sub-query:
select, using the LLM set, one or more computer-executable tasks from the computer-executable task set identified by a respective routing matrix of the candidate agent, wherein each of the one or more computer-executable tasks are selected based on the sub-query satisfying a respective condition set of the computer-executable task, and
autonomously execute, using the identified candidate agent, the selected one or more computer-executable tasks to generate an agent-specific response set responsive to the sub-query; and
using the LLM set, aggregate each respective agent-specific response set of each respective candidate agent of each sub-query into an overall response set that is responsive to the prompt of the output generation request.

2. The non-transitory computer-readable storage medium of claim 1, wherein the operational parameter set defines the at least one resource usage value, and wherein the instructions further cause the system to:
allocate a subset of available computational resources to process the sub-query based on the one or more resource usage values of the identified candidate agent.

3. The non-transitory computer-readable storage medium of claim 1, wherein one or more routing matrixes indicate one or more of: a knowledge source used by a respective AI agent or a model used by the respective AI agent.

4. The non-transitory computer-readable storage medium of claim 1, wherein the instructions further cause the system to:
detect a change in one or more environmental signals using the LLM set; and
dynamically modify the routing matrix of one or more AI agents based on the detected change in the one or more environmental signals.

5. The non-transitory computer-readable storage medium of claim 1, wherein the instructions further cause the system to:
compare the prompt against a database of previous queries,
wherein one or more identified candidate agents are identified based on the comparison.

6. The non-transitory computer-readable storage medium of claim 1, wherein the plurality of AI agents is organized in a hierarchal architecture, and
wherein the hierarchal architecture includes a (a) general-purpose agent at a first level of the hierarchal architecture and (b) multiple specialized sub-agents at a second level.

7. The non-transitory computer-readable storage medium of claim 1, wherein the instructions further cause the system to:
obtain a feedback set for one or more agent-specific response sets;
generating a modification set to modify one or more of: (a) the one or more computer-executable tasks of a respective candidate agent or (b) a sequence of the one or more computer-executable tasks of the respective candidate agent; and
transmitting the modification set to the respective candidate agent.

8. A method for orchestrating an autonomous artificial intelligence (AI) agent set to generate a personalized response, the method comprising:
obtain an output generation request comprising an input for generation of an output using one or more AI agents of the AI agent set communicatively connected to an AI model set,
wherein each AI agent is associated with a specific routing data structure that identifies a computer-executable task set configured to be autonomously executed by the AI agent in response to satisfaction of a condition set;
for each portion of the input, identify, using the AI model set, a candidate agent set from the AI agent set by comparing (a) one or more output parameters of the portion with (b) one or more operational parameters of each AI agent within the AI agent set;
for one or more identified candidate agents of each portion:
select, using the AI model set, one or more computer-executable tasks from the computer-executable task set identified by a respective routing data structure of the one or more identified candidate agents, wherein each of the one or more computer-executable tasks are selected based on the portion satisfying a respective condition set of the computer-executable task, and
autonomously execute, using the one or more identified candidate agents, the selected one or more computer-executable tasks to generate an agent-specific response set responsive to the portion; and
using the AI model set, aggregate each respective agent-specific response set of each respective candidate agent set of each portion into an overall response set that is responsive to the input of the output generation request.

9. The method of claim 8, wherein the method further comprises:
updating the routing data structure in response to at least one of: (a) a detected change in system load, (b) a change in user context, (c) a change in external environmental signals, or (d) a performance metric associated with the AI agent.

10. The method of claim 8, wherein the AI agent set comprises a validation agent configured to validate updates to a knowledge base accessed by one or more agents in the AI agent set, and wherein the method further comprises:
receiving, by the validation agent, a proposed update to the knowledge base,
initiating a computer-implemented workflow using the validation agent to evaluate the proposed update against an update criteria set, and
responsive to determining satisfaction of the proposed update with the update criteria set, applying the proposed update to the knowledge base.

11. The method of claim 8, further comprising:
exposing an application programming interface (API) registry identifying the AI agent set, wherein the API registry is accessible by one or more AI models of the AI model set.

12. The method of claim 8, wherein at least one AI model in the AI model set is a Large Language Model (LLM).

13. The method of claim 8,
wherein each AI agent is associated with an ontology data structure, and
wherein the ontology data structure comprises a machine-readable representation of a domain set, an attribute set of each domain-specific category in the domain set, and a set of relationships among the domain set and the attribute set of each domain.

14. The method of claim 13, further comprising:
access, using the AI model set, the ontology data structure of a particular AI agent to identify, for a particular sub-query, at least one of: a query-specific domain within the domain set based on one or more query-specific attributes within respective attribute sets of each domain,
wherein one or more candidate agents of the candidate agent set are associated with the query-specific domain.

15. A system comprising:
at least one hardware processor; and
at least one non-transitory memory storing instructions, which, when executed by the at least one hardware processor, cause the system to:
obtain an output generation request comprising an input for generation of an output using one or more AI agents of the AI agent set communicatively connected to an AI model set, wherein each AI agent is associated with a data structure that identifies a task set configured to be autonomously executed by the AI agent in response to satisfaction of a condition set;
for one or more portions of the input, identify, using the AI model set, a candidate agent set from the AI agent set by comparing (a) one or more output parameters of the portion with (b) one or more operational parameters of each AI agent within the AI agent set;
for one or more identified candidate agents of the one or more portions:
select, using the AI model set, one or more tasks from the task set identified by a respective data structure of the one or more identified candidate agents, wherein each of the one or more tasks are selected based on the portion satisfying a respective condition set of the task, and
autonomously execute, using the one or more identified candidate agents, the selected one or more tasks to generate an agent-specific response set responsive to the portion; and
using the AI model set, aggregate each respective agent-specific response set of each respective candidate agent set of the one or more portions into an overall response set that is responsive to the input of the output generation request.

16. The system of claim 15, wherein at least one AI agent is associated with a dynamic retrieval-augmented generation (RAG)-based model, and wherein the dynamic RAG-based model is configured to:
update a knowledge base associated with the RAG-based model by retrieving data from one or more data sources via an application programming interface (API),
wherein the update is triggered based on at least one of: detected performance degradation, received user feedback, or a scheduled interval.

17. The system of claim 15, wherein at least one AI agent is configured as a static agent associated with a first knowledge base configured to be fixed, wherein at least one other AI agent is configured as a dynamic agent with a second knowledge base configured to be updated, and wherein the system is further caused to:
select between static and dynamic agents for a particular portion of the input based on at least one of: data sensitivity, update frequency, or user-defined policy.

18. The system of claim 15,
wherein each AI agent is associated with an ontology data structure, and
wherein the ontology data structure comprises a machine-readable representation of a domain set, an attribute set of each domain-specific category in the domain set, and a set of relationships among the domain set and the attribute set of each domain.

19. The system of claim 18, wherein the ontology data structure is stored in at least one of:
(a) a graph database,
(b) a distributed file system,
(c) a cloud-based object storage service, or
(d) a local persistent memory of the AI agent.

20. The system of claim 18, wherein the ontology data structure is accessible by multiple agents within the AI agent set, and wherein the system is further caused to:
update the ontology data structure responsive to receiving a data signal from the AI agent set that indicates a consensus among the AI agent set for the update.

* * * * *